(12) United States Patent
Hong

(10) Patent No.: US 12,736,313 B2
(45) Date of Patent: Sep. 15, 2026

(54) METHOD FOR PROVIDING DART GAME IMAGE

(71) Applicant: Phoenixdarts Co., Ltd., Seoul (KR)

(72) Inventor: Sang Uk Hong, Seoul (KR)

(73) Assignee: PHOENIXDARTS CO., LTD., Seoul (KR)

(*) Notice: Subject to any disclaimer, the term of this patent is extended or adjusted under 35 U.S.C. 154(b) by 132 days.

(21) Appl. No.: 18/573,828

(22) PCT Filed: Jun. 23, 2022

(86) PCT No.: PCT/KR2022/008982

§ 371 (c)(1),
(2) Date: Dec. 22, 2023

(87) PCT Pub. No.: WO2022/270955

PCT Pub. Date: Dec. 29, 2022

(65) Prior Publication Data

US 2024/0295389 A1 Sep. 5, 2024

(30) Foreign Application Priority Data

Jun. 25, 2021 (KR) ........................ 10-2021-0083418
Sep. 24, 2021 (JP) ................................ 2021-155534

(51) Int. Cl.
*F41J 5/00* (2006.01)
*A63F 13/426* (2014.01)
(Continued)

(52) U.S. Cl.
CPC ............... *F41J 5/00* (2013.01); *A63F 13/426* (2014.09); *A63F 13/46* (2014.09); *A63F 13/798* (2014.09);
(Continued)

(58) Field of Classification Search
CPC ........ A63F 9/0204; A63F 9/02; A63F 13/426; A63F 13/46; A63F 13/837; A63F 13/213;
(Continued)

(56) References Cited

U.S. PATENT DOCUMENTS 4,824,121 A * 4/1989 Beall ..................... A63F 9/0208
273/DIG. 26
5,540,445 A * 7/1996 Lee ........................... F41J 3/02
D21/325
(Continued)

FOREIGN PATENT DOCUMENTS

JP 2010220784 A 10/2010
JP 2018535705 A 12/2018
(Continued)

OTHER PUBLICATIONS

Extended European Search Report for Internationa Application No. PCT/KR2022/008982 dated: Jun. 2, 2025, 12 pages.

*Primary Examiner* — William H Mcculloch, Jr.
(74) *Attorney, Agent, or Firm* — Umberg Zipser LLP

(57) ABSTRACT

Disclosed is a method of providing a dart game image performed by a dart game device participating in a play session which imposes a play time constraint to two or more devices. The method may include: displaying, on a display unit, a first object displaying first information related to a first device among two or more devices participating in the play session and a second object displaying second information related to a second device; receiving play-related data of devices participating in the play session; and determining, based on the received play-related data, whether to change a relative position of the first object and the second object.

13 Claims, 15 Drawing Sheets

(51) Int. Cl.

| | |
|---|---|
| ***A63F 13/46*** | (2014.01) |
| ***A63F 13/798*** | (2014.01) |
| ***A63F 13/837*** | (2014.01) |
| ***F41J 3/00*** | (2006.01) |
| ***F41J 3/02*** | (2006.01) |
| ***F41J 5/04*** | (2006.01) |
| *A63F 9/02* | (2006.01) |
| *A63F 13/213* | (2014.01) |
| *F41J 5/02* | (2006.01) |
| *F41J 5/14* | (2006.01) |

(52) U.S. Cl.

CPC ........... *A63F 13/837* (2014.09); *F41J 3/0009* (2013.01); *F41J 3/0028* (2013.01); *F41J 3/02* (2013.01); *F41J 5/04* (2013.01); *A63F 2009/0221* (2013.01); *A63F 13/213* (2014.09); *F41J 3/00* (2013.01); *F41J 5/02* (2013.01); *F41J 5/14* (2013.01)

(58) Field of Classification Search

CPC ............ A63F 13/798; A63F 2009/0221; A63F 11/0051; F41J 3/0009; F41J 3/0028; F41J 3/02; F41J 3/00; F41J 5/14; F41J 5/00; F41J 5/02; F41J 5/04

See application file for complete search history.

(56) References Cited

U.S. PATENT DOCUMENTS

| | | | | |
|---|---|---|---|---|
| 5,857,912 | A * | 1/1999 | Freitag | G07F 17/32 273/371 |
| 5,954,339 | A * | 9/1999 | Yiu | F41J 3/00 273/408 |
| 8,622,794 | B2 * | 1/2014 | Hong | A63F 13/792 463/52 |
| 9,072,975 | B2 * | 7/2015 | Hong | A63F 13/80 |
| 10,507,392 | B2 * | 12/2019 | Hong | A63F 13/428 |
| 10,762,800 | B2 * | 9/2020 | Hong | F41J 3/0014 |
| 10,905,941 | B2 * | 2/2021 | Hong | A63F 13/837 |
| 11,150,057 | B2 * | 10/2021 | Hong | A63F 13/79 |
| 11,280,592 | B2 * | 3/2022 | Hong | F41J 3/0014 |
| 11,898,826 | B2 * | 2/2024 | Hong | F41J 3/0009 |
| 12,366,435 | B2 * | 7/2025 | Hong | F41J 3/0014 |
| 12,392,585 | B2 * | 8/2025 | Lee | F41J 5/056 |
| 12,392,586 | B2 * | 8/2025 | Hong | F41J 3/02 |
| 12,589,289 | B2 * | 3/2026 | Hong | A63F 11/0051 |
| 2005/0075153 | A1 * | 4/2005 | Valero Moreno | G07F 17/3202 463/1 |
| 2009/0218769 | A1 * | 9/2009 | Krzewicki | F41J 5/14 273/374 |
| 2012/0242043 | A1 * | 9/2012 | Hong | F41J 5/24 273/348 |
| 2012/0258788 | A1 * | 10/2012 | Hong | A63F 13/79 473/578 |
| 2014/0265130 | A1 * | 9/2014 | Layne, IV | F41J 5/00 273/358 |
| 2016/0364953 | A1 * | 12/2016 | Hong | G07F 17/3288 |
| 2018/0238662 | A1 | 8/2018 | Oh et al. | |
| 2019/0184274 | A1 | 6/2019 | Hong | |
| 2020/0035123 | A1 * | 1/2020 | Hong | F41J 3/0009 |
| 2022/0090885 | A1 * | 3/2022 | Hong | F41J 3/0009 |
| 2022/0221254 | A1 * | 7/2022 | Hong | F41J 3/0014 |
| 2022/0381539 | A1 * | 12/2022 | Lee | F41J 3/0028 |
| 2024/0060752 | A1 * | 2/2024 | Lee | G06V 10/24 |
| 2024/0062409 | A1 * | 2/2024 | Lee | F41J 5/14 |
| 2024/0062418 | A1 * | 2/2024 | Lee | F41J 5/14 |
| 2024/0159504 | A1 * | 5/2024 | Lee | F41J 5/14 |
| 2024/0198209 | A1 * | 6/2024 | Hong | A63F 9/0208 |
| 2024/0286023 | A1 * | 8/2024 | Hong | A63F 13/46 |
| 2024/0295389 | A1 * | 9/2024 | Hong | A63F 13/837 |
| 2024/0307782 | A1 * | 9/2024 | Hong | A63F 13/49 |
| 2024/0316449 | A1 * | 9/2024 | Hong | A63F 13/213 |
| 2024/0382827 | A1 * | 11/2024 | Hong | A63F 9/0208 |
| 2024/0393090 | A1 * | 11/2024 | Hong | F41J 3/00 |

FOREIGN PATENT DOCUMENTS

| | | | |
|---|---|---|---|
| KR | 1020020007093 | A | 1/2002 |
| KR | 101142136 | B1 | 5/2012 |
| KR | 1020180006232 | A | 1/2018 |
| KR | 1020190043111 | A | 4/2019 |
| KR | 1020190079010 | A | 7/2019 |
| KR | 1020200042119 | A | 4/2020 |
| KR | 102113362 | B1 | 5/2020 |
| KR | 102136813 | B1 | 7/2020 |
| KR | 102387187 | B1 | 5/2022 |

* cited by examiner

METHOD FOR PROVIDING DART GAME IMAGE

TECHNICAL FIELD

The present disclosure relates to a dart game device, and particularly to, an online dart game device capable of performing an online dart game in real time.

BACKGROUND ART

In general, a dart means a "little arrow" and is a game of throwing arrow-shaped darts at a centrifugal target labeled with numbers to score points. The dart game has the advantage that anyone can play at any time when arrow-head-shaped darts and a dart game device are provided. In recent years, the dart game has developed into a global leisure activity with the development of various competition methods and the organization of scoring methods, and people of all ages easily enjoy the game.

In general, the game rule of the dart game is that a first player throws a few darts, scores are tailed, the thrown darts are removed, and then a second player throws darts. Then, when the second player throws a few darts and scores are collected, the thrown darts are removed, and then the first player may throw the darts again. In this case, players must wait for other opponent players to play darts when it is not their turn in the same round.

In relation to this, Korean Patent No. 10-2136813 has been conceived.

DISCLOSURE

Technical Problem

The present disclosure is conceived in response to the foregoing background art, and provides a dart game device for providing a new concept of game rule.

The technical objects of the present disclosure are not limited to the foregoing technical objects, and other non-mentioned technical objects will be clearly understood by those skilled in the art from the description below.

Technical Solution

An exemplary embodiment of the present disclosure provides a method of providing a dart game image performed by a dart game device participating in a play session which imposes a play time constraint to two or more devices, the method including: displaying, on a display unit, a first object displaying first information related to a first device among two or more devices participating in the play session and a second object displaying second information related to a second device; receiving play-related data of devices participating in the play session; and determining, based on the received play-related data, whether to change a relative position of the first object and the second object, in which the first information includes an image related to a play of a player of the first device or an image generated based on dart game play result information of the first device, and the second information includes an image related to a play of a player of the second device or an image generated based on dart game play result information of the second device.

Further, the determining of whether to change the relative position of the first object and the second object may include determining, based on the received play-related data and play-related data related to the play session of the dart game device, whether to change the relative position of the first object and the second object.

Further, determining of whether to change the relative position of the first object and the second object may include: determining, based on the received play-related data, first proximity between play-related data related to the first object and play-related data of the dart game device, and second proximity between play-related data related to the second object and the play-related data of the dart game device; comparing the first proximity and the second proximity to determine whether there is a change in a superiority/inferiority relationship between the first proximity and the second proximity; and changing the relative positions of the first object and the second object when it is determined that there is a change in the superiority/inferiority relationship.

Further, the changing of the relative positions of the first object and the second object when it is determined that there is the change in the superiority/inferiority relationship may include performing a spinning operation in which the relative positions of the first object and the second object are repeatedly exchanged a predetermined number of times.

Further, the play session may include a time constraint for a round allowing N times of dart pin throwing, in which N is a natural number, and the determining of whether to change the relative position of the first object and the second object may include determining whether to change the relative positions of the first object and the second object, based on play-related data received in a unit of a round of the play session.

Further, the play session may include a time constraint for throwing dart pins; and the determining of whether to change the relative position of the first object and the second object may include determining whether to change the relative position of the first object and the second object based on play-related data received in a unit of a dart pin throwing action in the play session.

Further, the play session may include a time constraint on a set comprising K rounds, in which K is a natural number and the determining of whether to change the relative position of the first object and the second object may include determining whether to change the relative position of the first object and the second object based on play-related data received in a unit of a set of the play session.

Further, the play-related data may include resultant data that was played via two or more devices over a time period that at least partially overlaps based on time constraints imposed by the play session.

Further, each of the first object and the second object may include a predetermined display attribute, and the display attribute may include a first attribute indicating an area in which each of the objects is to be displayed, a second attribute indicating a position in which each of the objects is to be displayed, a third attribute indicating a display size for each of the objects, a fourth attribute indicating whether each of the objects is to be displayed, and a fifth attribute indicating a shape of each of the objects to be displayed.

Further, the displaying of, on the display unit, the first object displaying first information related to the first device among two or more devices participating in the play session and the second object displaying second information related to the second device may include displaying the first object in a first area of the display unit, and displaying the first object and the second object in a second area different from the first area of the display unit.

Further, the first object displayed in the first area may be displayed in a first form, and the first object displayed in the second area may be displayed in a second form that is different from the first form.

Further, a first position of the first object displayed in the second area may be determined based on at least one of a score or ranking related to the first object and the second object.

Further, a position of the first object displayed in the second area may be changed based on play-related data received in a unit of a round or a set of the play session, and as the position of the first object is changed, a position of the second object displayed in the second area may be changed in conjunction with the changed position of the first object.

Another exemplary embodiment of the present disclosure provides a dart game device including: a display unit for displaying, among two or more devices participating in a play session which imposes a play time constraint to two or more devices, a first object displaying first information related to a first device and a second object displaying second information related to a second device; a network communication unit for receiving play-related data of devices participating in the play session; and a control unit for determining, based on the received play-related data, whether to change a relative position of the first object and the second object, in which the first information includes an image related to a play of a player of the first device or an image generated based on dart game play result information of the first device, and the second information includes an image related to a play of a player of the second device or an image generated based on dart game play result information of the second device.

Still another exemplary embodiment of the present disclosure provides a non-transitory computer readable storage medium including a computer program, the computer program performing following operations for providing a dart game when being executed in one or more control units, the operations including: an operation of displaying, among two or more devices participating in a play session which imposes a play time constraint to two or more devices, a first object displaying first information related to a first device and a second object displaying second information related to a second device; an operation of receiving play-related data of devices participating in the play session; and an operation of determining, based on the received play-related data, whether to change a relative position of the first object and the second object.

The technical solutions obtainable from the present disclosure are not limited to the foregoing solutions, and other non-mentioned solution means will be clearly understood by those skilled in the art from the description below.

Advantageous Effects

According to some exemplary embodiments of the present disclosure, it is possible to inspire dart game users' interest.

The effects of the present disclosure are not limited to the foregoing effects, and other non-mentioned effects will be clearly understood by those skilled in the art from the description below.

DESCRIPTION OF DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters. In other examples, well-known structures and devices are illustrated in a block diagram in order to facilitate describing one or more aspects.

BEST MODE

Figure 1:
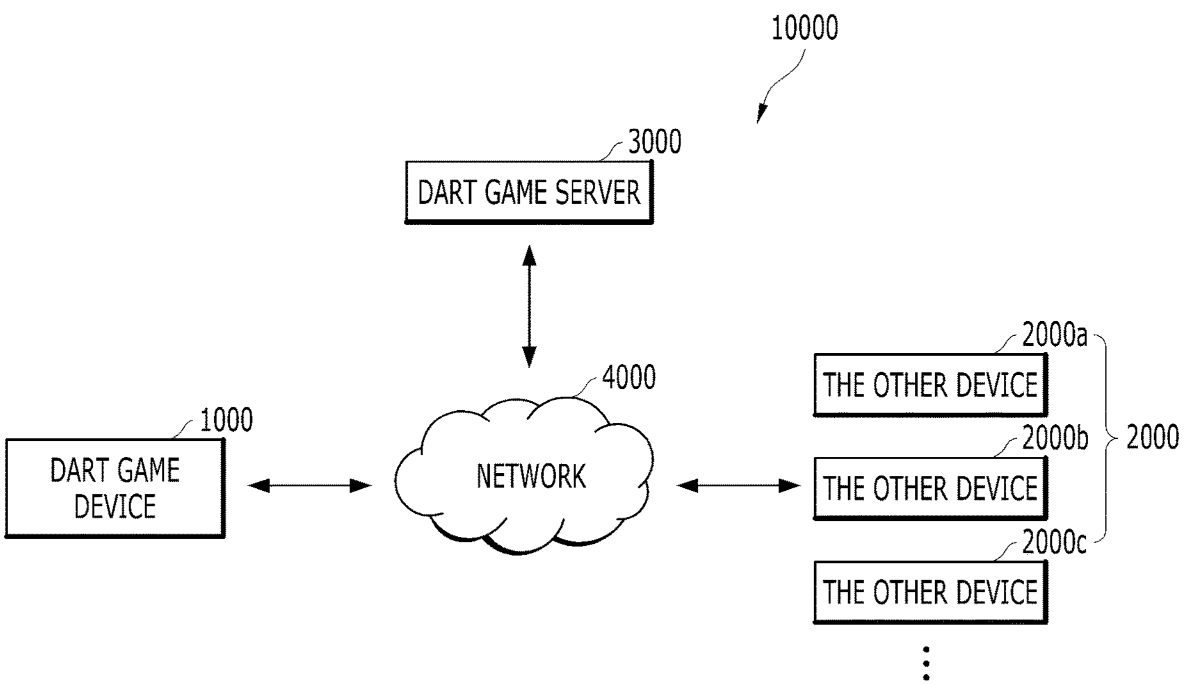
FIG. 1 is a block diagram for illustrating an example of a dart game system according to some exemplary embodiments of the present disclosure.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include all of the aspects and the equivalents thereof. In particular, an "exemplary embodiment", an "example", an "aspect", an "illustration" and the like used in the present specification may not be construed to be better or have an advantage compared to a predetermined described aspect, an aspect having a different design, or designs.

Hereinafter, the same or similar component is denoted by the same reference numeral regardless of a reference numeral, and a repeated description thereof will be omitted. Further, in describing the exemplary embodiment disclosed in the present specification, when it is determined that a detailed description relating to well-known functions or configurations may make the subject matter of the exemplary embodiment disclosed in the present specification unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings.

Although first, second, and the like are used to describe various elements or components, it is a matter of course that the elements or components are not limited by these terms. The terms are used for discriminating one element or component from another element or component. Therefore, of course, the first element or component mentioned below may also be a second element or component within the technical spirit of the present disclosure.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined specially.

Further, a term "or" intends to mean comprehensive "or" not exclusive "or". That is, unless otherwise specified or when it is unclear in context, "X uses A or B" intends to mean one of the natural comprehensive substitutions. That is, in the case where X uses A; X uses B; or, X uses both A and B, "X uses A or B" may apply to either of these cases.

Further, a term "and/or" used in the present specification shall be understood to designate and include all of the possible combinations of one or more items among the listed relevant items.

Further, a term "include" and/or "including" shall be understood as meaning that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

In addition, terms "information" and "data" used in the present specification may be frequently used to be exchangeable with each other.

When an element or a layer is referred to as being "on" another element or layer, the element or the layer may be directly formed on another element or layer, or may be formed on another element or layer with another layer or element interposed therebetween. In contrast, when an element is referred to as being "directly on" another element, there are no intervening another element or layer present.

The spatially relative terms, "below", "beneath", "lower", "above", "upper", and the like may be used for easily describing the correlation of one element with other elements as illustrated in the drawings. The spatially relative terms should be understood as the terms including different directions of the elements when the elements are used or operated in addition to the direction illustrated in the drawing.

For example, when an element illustrated in the drawing is turned over, the element described as being "below" or "beneath" the other element may be placed "above" the other element. Accordingly, the illustrative term "below" or "beneath" may include both the directions below and above. The element may also be oriented in different directions, and in this case, the spatially relative terms may be interpreted according to the orientation.

It should be understood that when one constituent element referred to as being "coupled to" or "connected to" another constituent element, one constituent element can be directly coupled to or connected to the other constituent element, but intervening the other constituent elements may also be present. In contrast, when one constituent element is "directly coupled to" or "directly connected to" another constituent element, it should be understood that there are no intervening the other constituent element present.

Suffixes, "module" and "unit" for a constituent element used for the description below are given or mixed in consideration of only easiness of the writing of the specification, and the suffix itself does not have a discriminated meaning or role.

An object and effect of the present disclosure and technical configurations for achieving them will be apparent with reference to the exemplary embodiments described below in detail together with the accompanying drawings. In describing the present disclosure, when it is determined that detailed description of known function or configurations unnecessarily obscures the subject matter of the present disclosure, the detailed description may be omitted. Further, the terms used in the description are defined in consideration of the function in the present disclosure and may vary depending on an intention or usual practice of a user or operator.

However, the present disclosure is not limited to the exemplary embodiments disclosed below, but may be implemented in various different forms. However, the present exemplary embodiments are provided only to make the present disclosure complete, and to fully inform the scope of the present disclosure to those skilled in the art, and the present disclosure is only defined by the scope of the claims. Accordingly, the definition should be made based on the content throughout the present specification.

In the present disclosure, a player playing a dart game may participate in a play session that imposes a play time constraint by using a dart game device. Specifically, a play session may refer to a game unit that one or more devices can play together. In the exemplary embodiment, a play session may refer to a game unit involving two or more players who take turns playing by using a single device. In another exemplary embodiment, a play session may refer to a game unit involving two or more players who take turns playing by using two or more devices, respectively.

A game unit may mean the smallest unit of events for comparing the results of each player's game when two or more players participate in a dart game. In the exemplary embodiment, a game unit may mean a unit of events for determining winning or losing of a game played by two or more players.

In a dart game system according to an exemplary embodiment of the present disclosure, a play session may be given a time constraint. A time constraint may refer to a time condition under which two or more players participating in the same play session must perform a specific play within a dart game. In the exemplary embodiment, a time constraint may refer to a time condition for two or more players participating in the same play session to play a single dart game. For example, a play session may include a time constraint that requires two or more darts players to play from 10:00 a.m. to 10:10 a.m. on Oct. 1, 2021.

In the exemplary embodiment, the time constraint may be commonly applied to all players participating in the same play session. Specifically, all players may participate in a time-constrained play session that includes the same play session start time and end time as time conditions. For example, there may be a play session that requires all players to play from 10:00 a.m. to 10:10 a.m. on Oct. 1, 2021.

In another exemplary embodiment, the time constraint may impose different time conditions on at least two or more players participating in the same play session. For example, Player A, who is part of the same play session, participates in a time-constrained play session that includes a time condition to play from 10:00 a.m. to 10:10 a.m. on Oct. 1, 2021, and Player B may participate in a time-constrained play session that includes a time condition to play from 10:05 a.m. to 10:15 a.m. on Oct. 1, 2021. The time condition given to each participant included in the same play session may be set to have the same duration, or may be set to have different durations. When time conditions are set to have different durations, the time conditions may be determined by various factors. For example, a time condition may be set based on the relative or absolute skill rating of a player participating in a play session. In another example, a time condition may be set so that players participating in a play session have different time periods based on information about the just before play result of a player participating in the play session or information about the player's past play history.

In a dart game system according to an exemplary embodiment of the present disclosure, in the case where different time constraints are imposed on at least some of the players participating in the same play session, the dart game system may set the time constraints such that the different time constraints at least partially overlap.

In the dart game system according to the exemplary embodiment of the present disclosure, the specific plays that are time constrained within a play session may be variously set. In one example, a specific play may be set to the smallest game unit in which winning or losing is determined by the rules of a dart game. For example, the start to end time of a game, such as Count Up Game and Cricket Game, may be set as a specific play. In other examples, a specific play may be a unit with a lower granularity than this. For example, a specific play may be set to a round of play within a game. In another example, a specific play may be set to a dart throw that constitutes each of a plurality of rounds within a single game. For example, a specific play may be set to each of a plurality of rounds that constitutes a count-up play. Alternatively, a specific play may be set with three times of dart throwing, which constitute each round constituting a count-up play.

In the dart game system according to the exemplary embodiment of the present disclosure, when a specific play is set up as one round, two or more players participating in a play session may be required to play one round under the time condition. For example, players may be required to complete the fifth round of an ongoing count-up in the same play session for 30 seconds starting at 10:01 on Oct. 1, 2021. As another example, when a specific play is set to one dart throw, for example, players may be required to complete the first dart throw of the fifth round of an ongoing count-up in the same play session for 10 seconds starting at 10:05 on Oct. 1, 2021. This is illustrative, and players participating in the same play session may be given time constraints in which start time or time periods for a time condition to complete a specific play are different.

The foregoing description illustrates some of various exemplary embodiments for constituting the time constraint included in the play session in the dart game system according to the exemplary embodiment of the present disclosure, and the dart game system according to the present disclosure is not limited by the foregoing example.

In the meantime, in the present disclosure, a player participating in a play session through online may independently play a dart game regardless of a throw of a dart pin by another player through another dart game device. For example, according to the rules of the dart game play in the related art, when a first player throws several dart pins and then scores are collected, an opportunity to throw a dart pin may be provided to a second player. However, according to the play rules in the related art, the players need to wait when it's not their turn. In addition, the play rules in the related art of the dart game have led to a longer game time. On the other hand, players participating in a play session of the present disclosure may throw their own dart pins independently of the throwing of other players' dart pins. That is, players on dart game devices participating in the same play session may play their own dart game within the play session without having to wait for an opponent to throw. Through the play session, players who are remotely located from each other may, for example, enjoy a real-time dart game play without having to wait for other players to play within the same round.

Hereinafter, with reference to FIGS. 1 to 18, a dart game device, a dart game system, and a dart game method utilizing the dart game device according to the present disclosure will be described. In the meantime, in the present disclosure, for convenience of description, a player playing a dart game and a dart game device playing a dart game are used interchangeably without distinguishing between them, and the accompanying drawings are intended only to facilitate an understanding of the exemplary embodiments disclosed in the present specification, and it is to be understood that the technical spirits disclosed in the present specification are not limited by the accompanying drawings and include all modifications, equivalents, or substitutions that are within the spirit and the technical range of the present disclosure.

FIG. 1 is a block diagram for illustrating an example of a dart game system according to some exemplary embodiments of the present disclosure.

Referring to FIG. 1, a dart game system 10000 may include a dart game device 1000, at least one the other device 2000, a dart game server 3000, and a network 400. However, the components described above are not essential to implementing the dart game system 10000, and the dart game system 10000 may have more or fewer components than those listed above.

The dart game device 1000 may provide a dart game to players participating in a play session. Herein, a play session may refer to a game unit in which one or more devices can play together, as described above. In other words, by participating in a play session through the dart game device 1000, a player may play a real-time online dart game with players on a plurality of the other devices within the same time period. However, the dart game device 1000 does not only provide online dart games to players, but may also provide offline dart games. Hereinafter, an example of the dart game device 1000 according to the present disclosure will be described with reference to FIGS. 2 to 7.

The other devices 2000 may be at least one of devices related to players other than the dart game device 1000. For example, the other device 2000 may be a dart game device other than the dart game device 1000, a mobile device related to the dart game device 1000 (for example, a user's smartphone with dart game-related software installed), or a server.

For example, the other device 2000*a* may be at least one dart game device that is participating in the same play session as the dart game device 1000, or is waiting to participate in the same play session.

In another example, the other device 2000*b* may be a mobile device in conjunction with the dart game device 1000 for presenting information regarding a play session in which the dart game device 1000 participates to a player.

In another example, the other device 2000*c* may be a server for providing the same play session to a plurality of dart game devices. The server herein may be the same device as the dart game server 3000 illustrated in FIG. 1, or may be a physically separate different server. However, the present disclosure is not limited thereto.

The dart game server 3000 may include, for example, any type of computer system or computer device, such as, a microprocessor, a mainframe computer, a digital processor, a handheld device, or a device controller.

In the present disclosure, the dart game server 3000 may determine a dart game player to participate in a play session.

Specifically, the dart game server 3000 may receive first play result information from a plurality of devices participating in a first play session that took place during a first time period. Based on the first play result information, the dart game server 3000 may determine a plurality of players to participate in a second play session during a second time period, which is after the first time period. Here, the play result information may be information about the result of the dart game that is generated as the players participating in the play session progress the dart game. The play result information may include any form of result information generated by the play of the dart game.

For example, the play result information may include at least one of information about a ranking related to the result of the dart game for each of the players, information about a score related to the result of the dart game for each of the players, information about an image of the players playing the dart game, information about a pre-stored image representing the player, information about a time at which each of the players ended the dart game, or identification information for each of the players participating in the play session. However, the present disclosure is not limited thereto.

For example, the dart game server 3000 may determine a plurality of players having a predetermined ranking as players to participate in the second play session based on information about the ranking included in the first play result information. However, the present disclosure is not limited thereto. Hereinafter, one example of a method of determining, by the dart game server 3000, a dart game player to participate in a play session according to the present disclosure will be described with reference to FIGS. 8 to 11.

In the present disclosure, the dart game server 3000 may be plural. And, each of the plurality of dart game servers may distribute at least one play session to each of the dart game devices 1000 or the other devices 2000.

Specifically, in a tournament-system dart play, the dart game server 3000 may provide a first-1 play session to a first-8 play session. Here, 8 players may participate in each of the first-1 to first-8 play sessions. The first-1 play session to the first-8 play session may be sub-sessions of the first play session. The first play session may include the first-1 play session to the first-8 play session. The first-1 to first-8 play sessions may impose a corresponding play time constraint on each of two or more devices. In this case, the dart game server 3000 may determine a plurality of players to participate in the second play session based on the play result information of the first play session.

The dart game system 10000 formed of the single dart game server 3000 may be difficult to provide a pleasant dart game to players due to limitations in a network, and the like. Thus, in the exemplary embodiment of the present disclosure, the plurality of dart game servers 3000 may be provided. Each of the plurality of dart game servers may distribute at least one play session or at least one sub-session to players. However, the present disclosure is not limited thereto.

The network 4000 may be configured regardless of its communication mode, such as a wired mode and a wireless mode, and may be configured of various communication networks, such as a Local Area Network (LAN) and a Wide Area Network (WAN).

In the present disclosure, the network 4000 or the dart game server 3000 may be a cloud-based system. Here, the cloud-based system is a system in which users (dart game device) share network resources, and may be a computing environment which a user rents as much as needed and is used via the network at a desired time. The cloud-based system may include deployment models, such as public cloud, private cloud, hybrid cloud, community cloud, or service models, such as Infrastructure as a Service (IaaS), Platform as a Service (PaaS), or Software as a Service (SaaS). However, the network 4000 or the dart game server 3000 of the present disclosure is not limited to the cloud-based system, and a centralized or edge computing-type network 4000 or the dart game server 3000 may also be implemented according to the exemplary embodiment of the present disclosure.

In the present disclosure, a play session may also be generated by the dart game device 1000. Further, the other devices 2000 may participate in the play session generated by the dart game device 1000. In addition, play result information of the play participating in a play session generated by the dart game device 1000 may be collected by the dart game server 3000. Play result information may be transmitted to the dart game server 3000 by at least one of the dart game device 1000 or the other devices 2000. However, it may be appropriate for the dart game device 1000 and the other devices 2000 to transmit play result information to the dart game server 3000 for verification of the play result information. In this case, the load of traffic or resources that the dart game server 3000 is burdened with to create play sessions may be reduced.

According to the configurations described above, the dart game system 10000 may include the dart game device 1000, the other devices 2000, and the dart game server 3000 to provide a real-time dart game to a plurality of players participating in a play session.

On the other hand, the dart game device 1000 or the other devices 2000 may include components that enable a player to play a dart game. Hereinafter, components of the dart game device 1000 according to the present disclosure will be described with reference to FIGS. 2 and 3.

Figure 2:
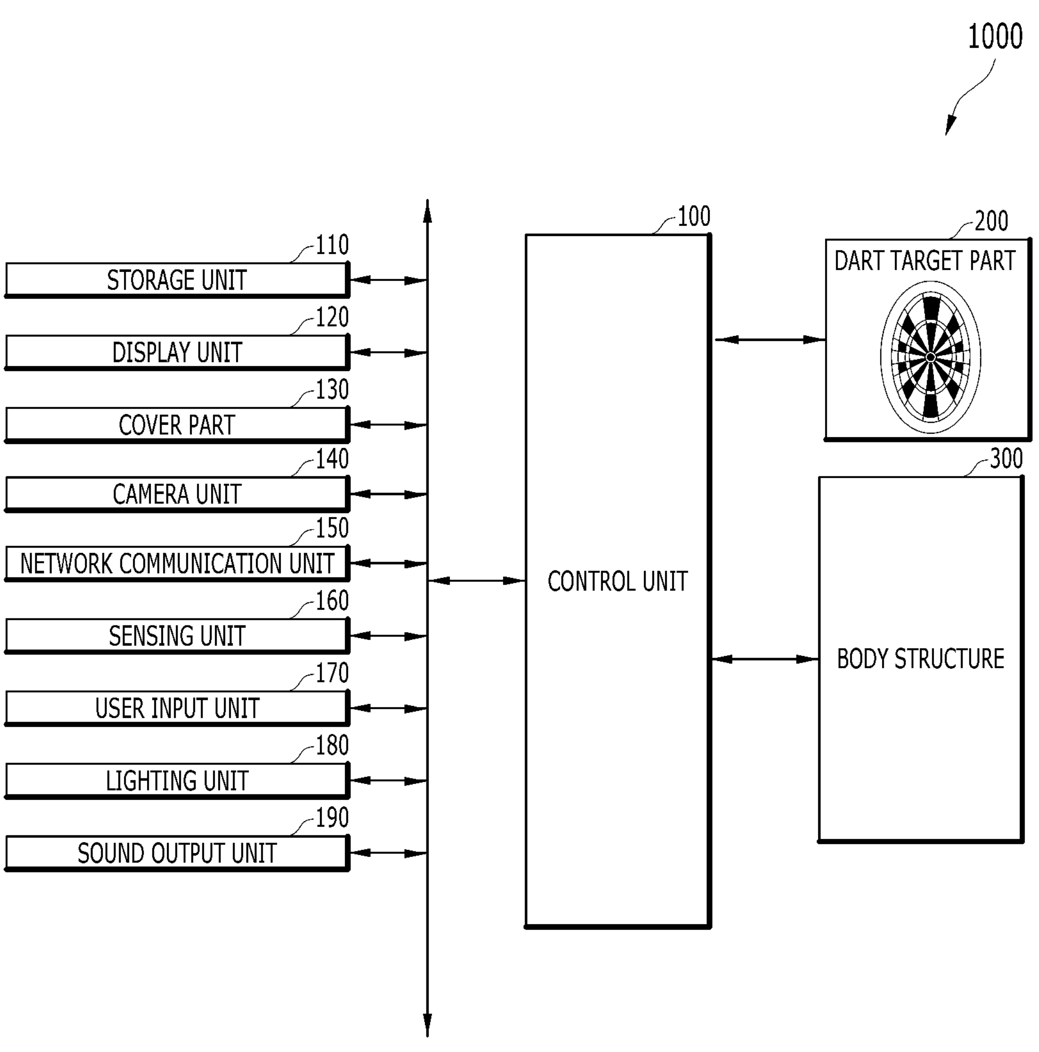
FIG. 2 is a block diagram for illustrating an example of a dart game device according to some exemplary embodiments of the present disclosure.
Figure 3:
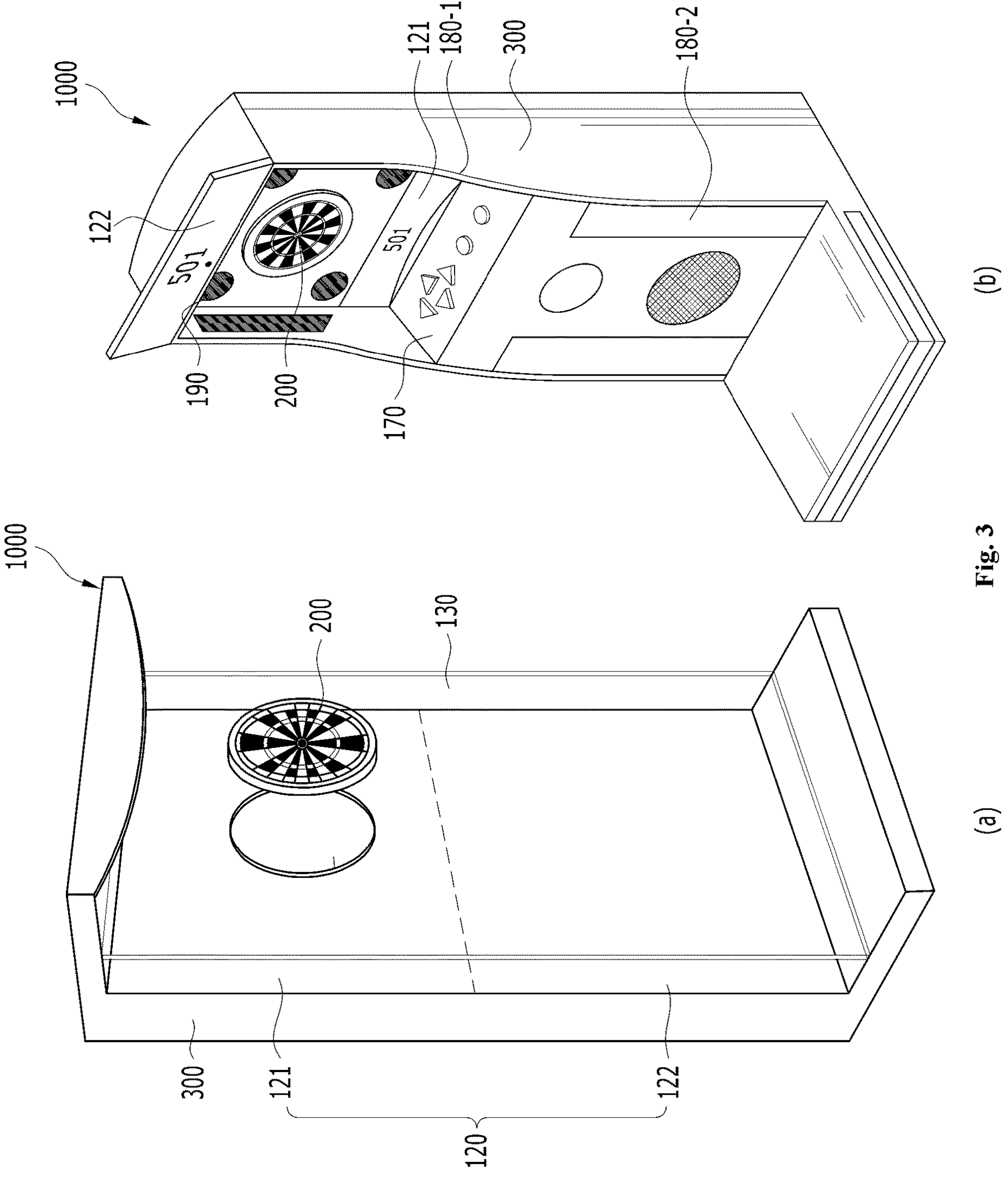
FIG. 3 is a diagram for illustrating an example of a dart game device according to some exemplary embodiments of the present disclosure.

FIG. 2 is a block diagram for illustrating an example of a dart game device according to some exemplary embodiments of the present disclosure. FIG. 3 is a diagram for illustrating an example of a dart game device according to some exemplary embodiments of the present disclosure.

Referring to FIG. 2, the dart game device 1000 may include at least one of a control unit 100, a display unit 120, a storage unit 110, a cover unit 130, a camera unit 140, a network communication unit 150, a sensing unit 160, a user input unit 170, a lighting unit 180, a sound output unit 190, a dart target part 200, and a body structure 300. However, the present disclosure is not limited thereto.

The control unit 100 may generally process the overall operation of the dart game device 1000. The control unit 100 may process signals, data, information, and the like that are input or output through the components of the dart game device 1000, or drive an application program stored in the storage unit 230, to provide or process appropriate information or functionality to the user.

For example, in the case of a dart game, the control unit 100 may determine a score for a player's throw of a dart pin detected by the sensing unit 160. Further, the control unit 100 may transmit the determined score to the other devices 2000 via the network communication unit 150. In addition, the control unit 100 may receive play-related data, including scores related to the dart game, from the other devices 2000 via the network communication unit 150. Further, the control unit 100 may control the display unit 120 to display information related to the play session on the display unit 120 based on play-related data including scores of other players and scores determined by the dart game device. In this context, the play-related data may be data that includes any information that is generated as players participating in a play session progress through a dart game, or that may be used to participate in a play session.

For example, the play-related data may include at least one of identification information for each player participating in a play session, information about the ranking related to each player's dart game participating in the play session, information about the image of the player playing the dart game, play result data for the dart game of each player participating in the play session, information about a pre-stored image representing players, and information about the scores related to the dart game of each of the players participating in the play session.

The storage unit 110 may include a memory and/or a persistent storage medium. The memory may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The storage unit 110 may pre-store at least one image related to the dart game. In this case, in response to receiving the play-related data from the other devices 2000 via the network communication unit 150, the control unit 100 may determine a display image related to the play-related data among at least one pre-stored image. Then, the display unit 120 may display the determined display image.

Specifically, information related to a play session displayed on the display unit 120 may be play-related images of the players on the other devices 2000. When the network communication unit 150 directly receives the images taken via the camera unit from the other devices 2000, the display unit 120 may display the received images.

However, depending on traffic conditions between the dart game device 1000 and the other devices 2000, the network communication unit 150 may only receive play-related data from the other devices 2000 that do not include play-related images. In this case, the control unit 100 may determine the display image related to the play-related data among at least one image pre-stored in the storage unit 110 as the display image to be displayed on the display unit 120.

For example, the control unit 100 may determine that a player on the other device 2000 has hit a score corresponding to the triple area based on the play-related data from the other device 2000 received via the network communication unit 150. In this case, the control unit 100 may determine a display image related to the triple among the plurality of display images pre-stored in the storage unit 110 as the display image to be displayed on the display unit 120. Hereinafter, an example of a method of determining, by the control unit 100, a display image based on play-related data of the other device 2000 according to the present disclosure will be described with reference to FIG. 4.

The display unit 120 may display (output) information processed by the dart game device 1000.

For example, the display unit 120 may display information related to a play session based on play-related data from the other device 2000 received via the network communication unit 150. Here, the information related to the play session may be the image related to the play by the player of the other device 2000, or the image generated based on information about the result of the dart game play on the other device 2000. Hereinafter, information related to a play session displayed on the display unit 120 will be described with reference to FIGS. 11 to 13.

The display unit 120 may be provided on the front surface of the dart game device 1000.

For example, referring to (a) of FIG. 3, the display unit 120 may be provided on the front surface of the dart game device 1000 to display information related to a play session.

In the present disclosure, the display unit 120 may include a plurality of display areas. For example, the display unit 120 may include a first display area 121 and a second display area 122. Each of the first display area 121 and the second display area 122 may be independently controlled by the control unit 100. Alternatively, each of the first display area 121 and the second display area 122 may be controlled by the control unit 100 such that a single image is implemented across the first display area 121 and the second display area 122. For example, the first display area 121 and the second display area 122 may operate in the form of display modules that are independent of each other. As another example, the first display area 121 and the second display area 122 may be one module rather than separate, independent modules.

Referring to (b) of FIG. 3, the display unit 120 may be implemented as at least one display unit. Further, each of at least one display unit may be independently controlled by the control unit 100.

For example, the display unit 120 may include a first display unit located at a lower portion of the dart target part 200 and having a first display area 121 and a second display unit located at an upper portion of the dart target part 200 and having a second display area 122. Further, each of the first display unit and the second display unit may be independently controlled by the control unit 100.

The cover part 130 may be provided adjacent to the display unit 120 to protect the display unit 120.

For example, referring to (a) of FIG. 3, the cover part 130 may be positioned between a virtual side extending upwardly from a throw line and the display unit 120. In this case, the cover part 130 may be located adjacent to the display unit 120, thereby reducing the risk of breakage of the display unit 120.

Referring again to FIG. 2, the camera unit 140 may include one or more cameras. The image frames processed by the camera unit 140 may be stored in the storage unit 110 or transmitted to the outside via the network communication unit 150. The camera unit 140 may be equipped with two or more cameras depending on the usage environment.

In the present disclosure, the control unit 100 of the dart game device 1000 may accept or reject a player's login request to the dart game device 1000 based on the image, including the player, taken through the camera unit 140.

For example, the control unit 100 may receive input from a player to log in the dart game device 1000 via the user input unit 170. In this case, the control unit 100 may control the camera unit 140 to photograph an image that includes the player currently operating the user input unit 170. The control unit 100 may accept or reject a player's login request based on a comparison between facial information included in the pre-stored player's identification information and facial information recognized from the photographed image.

In another example, the control unit 100 may request a user's login input via the display unit 120. The display unit 120 may, under the control of the control unit 100, output information necessary for the user to proceed with the login through the photograph taken by the camera or the login via the user input unit 170.

As another example, the control unit 100 may also allow user login to the dart game device 1000 via communication with the other device 2000. In this case, the control unit 100 may control the network communication unit 150 to transmit and receive information for user authentication with the other device 2000.

In the present disclosure, the control unit 100 may compare the facial information recognized from the photographed image with the facial information included in the pre-stored player's identification information after the time of the player's initial login operation.

Specifically, the control unit 100 may photograph a play image through the camera unit 140 in order to transmit a play image related to a player of the dart game device 1000 to the other device 2000. The control unit 100 may compare facial information recognized from the newly photographed play image with the facial information included in the identification information used to the login. Based on the result of the comparison, the control unit 100 may determine whether the current player is the same player as the player at the time of login. In this case, cheating may be prevented, such as the presence of surrogate players, which may occur as the dart game device 1000 and the other devices 2000 participate in a play session online. Here, the surrogate player may be a player other than the player logged in the dart game device 1000. Hereinafter, one example of the method of using the facial information by the control unit 100 according to the present disclosure will be described with reference to FIG. 16.

In another example, the control unit 100 may determine whether a player of the dart game is cheating by comparing the pre-stored play image that includes the player's play action with a current play image of the player. For example, when difference between a dart pin throwing image of a player included in the current play image and a past dart pin throwing image of the corresponding player is equal to or greater than a predetermined threshold, the control unit 100 may determine that the current dart pin throwing image has a high probability of cheating. A predetermined deep learning algorithm related to image processing or image analysis may be used to compare two or more images.

The network communication unit 150 may be configured regardless of its communication mode, such as a wired mode and a wireless mode, and may be configured of various communication networks, such as a Local Area Network (LAN) and a Wide Area Network (WAN).

The network communication unit 150 may detect the connection state of the network with the other devices 2000 or the dart game server 3000, and the transmission and reception speed of the network. However, without limitation, traffic information related to the transmission and reception speed of the network and the like may also be received from the dart game server 3000.

Data received via the network communication unit 150 may be displayed on the display unit 120, or transmitted to the other devices 2000.

For example, when the network communication unit 150 receives data related to a play session from the other devices 2000 or the dart game server 3000, the network communication unit 150 may transmit the received data to the other device, such as a mobile device. A dart game providing method according to the present disclosure may allow two or more devices to participate in the same play session. Accordingly, a player of the dart game device 1000 may need to wait for one, two, or more plurality of players to participate in the same play session. Thus, the network communication unit 150 may transmit data related to the play session to the player's mobile device or the like. In this case, the player may check whether he/she has matched with another player through the mobile device while taking a break.

According to some exemplary embodiments of the present disclosure, the control unit 100 may provide an offline dart game to a player of the dart game device 1000 when the number of players participating in a play session is not met and the player is waiting for another player.

Specifically, the control unit 100 may receive input from a player to participate in a play session via the user input unit 170. In this case, the control unit 100 may create a play session or participate in one of a plurality of pre-existing play sessions. However, when the number of players of the other devices 2000 is insufficient, the player on the dart game device 1000 may have to wait for a match to be made. In this case, the control unit 100 may provide an offline dart game to the player of the dart game device 1000 in conjunction with searching for other players so that a match is made with another player.

According to some exemplary embodiments of the present disclosure, a dummy player may be generated by the dart game server 3000 when the number of players to participate in the play session is insufficient. Here, the dummy player may be a virtual player rather than a real player. The dart game server 3000 may then make the generated dummy player participate in at least one play session in which the number of players is insufficient. For example, a dummy player may be generated based on play result data of a real player, the dummy player may perform the play in the similar form with a predetermined actual player as if the real player playing with the dummy player plays a real-time dart game with a real opponent player. Hereinafter, an example of the method of generating, by the dart game server 3000, the dummy player according to the present disclosure will be described with reference to FIG. 10.

The sensing unit 160 may detect a player's play executed against the dart target part 200. For example, the sensing unit 160 may detect a hit position of the dart pin. The sensing unit 160 may electrically convert a score corresponding to the area hit by the dart and transmit the converted score to the control unit 100. Further, the sensing unit 160 may transmit information about the area hit by the dart pin to the control unit 100, and the control unit 100 may obtain a score based on the information about the hit position on the dart obtained from the sensing unit 160.

The user input unit 170 may receive user input for controlling the dart game device 1000.

For example, referring to (b) of FIG. 3, the user input unit 170 may be implemented as at least one of a keypad, a dome switch, a touch pad (capacitive/static), a jog wheel, and a jog switch. However, the present disclosure is not limited thereto.

Additionally, the user input unit 170 may include a local area communication unit (not illustrated). If the user input unit 170 includes a local area communication unit of the network communication unit 150, the user input unit 170 may be configured to receive user input entered by an external console device. As short range communication technology, Bluetooth, Radio Frequency Identification (RFID), Infrared Data Association (IrDA), Ultra Wideband (UWB), ZigBee, and the like may be used.

The lighting unit 180 may be disposed on various portions of the dart game device 1000 to deliver a visual effect to the player of the dart game device 1000.

For example, referring to (a) of FIG. 3, a first lighting unit 180-1 may be formed extending in a vertical direction along a frontward projection of the body structure 300. Further, a second lighting unit 180-2 may be disposed at a front lower portion of the body structure 300. Further, the first lighting unit 180-1 and the second lighting unit 180-2 may output signals to indicate the occurrence of an event in the dart game device 1000. Examples of the event occurring in the dart game device 1000 may include identifying a dart game player, hitting a dart, changing a dart game player, and ending a game.

In addition, the lighting units 180-1 and 180-2 may include a Light Emitting Diode (LED), so that a user may be notified of the occurrence of an event by flashing the LED. Additionally, the lighting unit 180 may vary and output the form of light emitted, the intensity of light emitted, or the frequency of flashes depending on the position where the dart pin reaches on the dart target part.

Additionally, the lighting units 180-1 and 180-2 may output a preset pattern of lighting in conjunction with the acceptance of the player's login request determined by the control unit 100. Here, the lighting of the preset pattern may be predetermined from the player of the dart game device 1000.

Referring again to FIG. 2, the sound output unit 190 may output audio data stored in the storage unit 110, such as game sound effects, game action instructions, and game method descriptions. Additionally, the sound output unit 190 may output sound signals related to functions performed in the dart game device 1000 (for example, game sound effects). The sound output unit 190 may include a receiver, a speaker, a buzzer, and the like. Additionally, the sound output unit 190 may vary and output volume/type of music depending on the position where the dart pin has reached the dart target.

In the present disclosure, the sound output unit 190 may output a sound, music, or voice that corresponds to the play-related data among a plurality of pre-stored sounds, music, or voices, based on the dart game play-related data of the player of the dart game device 1000.

Specifically, the control unit 100 of the dart game device 1000 may recognize data related to the player's previous play when the player's login request is accepted. The control unit 100 may control the sound output unit 190 to output a preset sound or the like based on the previous play-related data. Alternatively, when the control unit 100 accepts the player's login request, the control unit 100 may determine, based on the identification information of the player, whether a pre-stored sound, music, or voice message or the like exists. Further, when it is determined that at least one of the pre-stored sounds, music, or voice messages is present, the control unit 100 may control the sound output unit 190 to output a corresponding sound or the like.

Additionally, the control unit 100 of the dart game device 1000 may generate an instruction message personalized to the player based on history information related to the result of the dart game play by the player when the player's login is completed. For example, when the previous play time of a player is a week ago, the control unit 100 may generate a prompt that reads, "You're logging in after a week, nice to see you." In another example, if a player has a history of winning dart game tournaments, the control unit 100 may generate a guidance message, "Welcome to the winner of XX tournament". In this way, the control unit 100 may generate personalized messages appropriate for the player from the player's history information to provide the player with a more entertaining effect.

The dart target part 200 may include a scoreboard with a bull's eye in the center, and areas (segments) separated by concentric circles centered on the bull's eye and straight lines extending radially from the bull's eye, each with an individual score. A plurality of receiving grooves may be formed on the scoreboard into which the tip of the dart may be inserted. In this case, the scoring arrangement of the dart target part 200 and the shape of the scored areas may be varied. Additionally, the dart target part 200 may be implemented in the form of a touchscreen.

The body structure 300 may be formed to extend in a direction perpendicular to the ground to form the appearance of the dart game device 1000. Further, the body structure 300 may include the display unit 120, the user input unit 170, the dart target part 200, and other components described above. However, the present disclosure is not limited thereto.

Figures 4, 5:
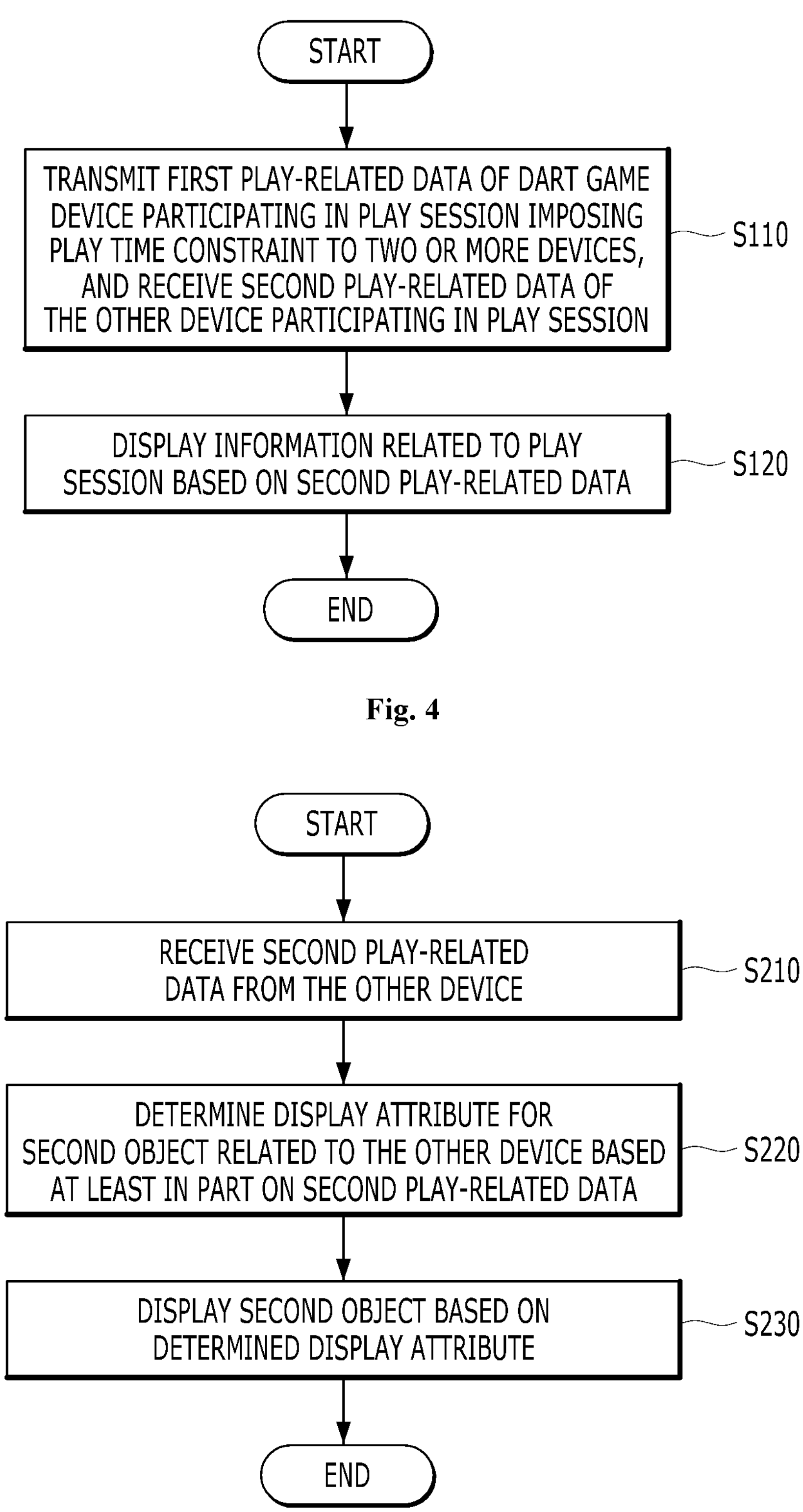
FIG. 4 is a flow diagram for illustrating an example of a method of displaying, by the dart game device, information related to a play session according to some exemplary embodiments of the present disclosure.
FIG. 5 is a flow diagram for illustrating an example of a method of determining, by the dart game device, a display attribute for an object according to some exemplary embodiments of the present disclosure.

The display unit 120, provided on the front surface of the body structure 300, may display information related to the play session. Here, information related to the play session may include images of other players' play, images generated based on data related to the play of other players, or information related to play time constraints. Referring now to FIG. 4, an example of the method of generating, by the control unit 100 of the dart game device 1000, information related to a play session according to the present disclosure will be described.

FIG. 4 is a flow diagram for illustrating an example of a method of displaying, by the dart game device, information related to a play session according to some exemplary embodiments of the present disclosure.

Referring to FIG. 4, the network communication unit 150 of the dart game device 1000 may transmit first play-related data of the dart game device 1000 participating in a play session to the other devices 2000 or the dart game server 3000. Additionally, the network communication unit 150 may receive second play-related data of the other device 2000 participating in the play session from the other device 2000 or the dart game server 3000 (S110).

According to the exemplary embodiment of the present disclosure, a play session may refer to a game unit that one or more devices may play together. In the exemplary embodiment, a play session may refer to a game unit in which two or more players participate while taking turns playing by using a single device. In another exemplary embodiment, a play session may refer to a game unit in which two or more players participate while taking turns playing by using two or more devices, respectively. By assigning a play session to one or more devices, the dart game device 1000 and the other devices 2000 participating in the same play session may allow a plurality of players to play a dart game in real time at the same time.

In the dart game system according to the exemplary embodiment of the present disclosure, a play session may be given a time constraint. A time constraint may refer to a time condition under which two or more players participating in the same play session must perform a specific play within a dart game. In the exemplary embodiment, a time constraint may refer to a time condition for two or more players participating in the same play session to play a single dart game.

A play session may include a plurality of sub play sessions. Each of the plurality of sub play sessions may be given a time constraint. In one example, the play session may include at least one of a first sub-play session, a second sub-play session, and a third sub-play session, each of which may include a time constraint.

The first sub-play session may include a time constraint for throwing dart pins. Further, the second sub-play session may include a time constraint for the round that allows N times of dart pin throwing. Further, the third sub-play session may include a time constraint for a set including K rounds. Herein, N and K may be natural numbers. Thus, a play session may impose time constraints for each dart pin throw, round, and set on a plurality of players participating in a dart game. In this case, a plurality of players may participate in a dart game with the same time constraint in real time by using their respective dart game devices 1000.

In the exemplary embodiment, the time constraint may be commonly applied to all players participating in the same play session or the same sub-play session. Specifically, all players may participate in a time-constrained play session that includes the same play session start time and end time as time conditions.

For example, there may be a play session that requires all players to play from 10:00 a.m. to 10:10 a.m. on Oct. 1, 2021. In this case, the play session may include a first sub-play session in which all players must throw one dart pin from 10:00 a.m. to 10:00:10 a.m. on Oct. 1, 2021. Alternatively, the play session may include a second sub-play session in which all players must throw three dart pins to end the round between 10:00 a.m. and 10:00:30 a.m. on Oct. 1, 2021. Alternatively, the play session may include a third sub-play session in which all players must play 10 rounds from 10:00 a.m. to 10:10 a.m. on Oct. 1, 2021, to complete one set. Accordingly, the play session and each of at least one sub-play session included in the play session may impose the same time constraints on all players.

In other exemplary embodiments, the time constraint may impose different time conditions on at least two of the players participating in the same play session. Specifically, at least one player may participate in a time-constrained play session that includes at least one of a different play session start time or a different play session end time as a time condition.

For example, there may be a play session in which a first player on the dart game device 1000 needs to play from 10:00 a.m. to 10:10 a.m. on Oct. 1, 2021, and a second player on the other device 2000 needs to play from 09:50 a.m. to 10:10 a.m. on Oct. 1, 2021. In another example, there may be a play session in which a first player on the dart game device 1000 needs to play from 10:00 a.m. to 10:10 a.m. on Oct. 1, 2021, and a second player on the other device 2000 needs to play from 10:00 a.m. to 10:20 a.m. on Oct. 1, 2021. In another example, there may be a play session in which a first player on the dart game device 1000 needs to play from 10:00 a.m. to 10:10 a.m. on Oct. 1, 2021, and a second player on the other device 2000 needs to play from 09:50 a.m. to 10:20 a.m. on Oct. 1, 2021.

According to the exemplary embodiment, a time-constrained play session that includes different play session start times as time conditions may include time-constrained sub-play sessions that include different sub-play session start times as time conditions. That is, the sub-play sessions included in the play session may impose different time constraints on players.

For example, the play session may include a first sub-play session in which a first player needs to throw one dart pin from 10:00 a.m. to 10:00:10 a.m. on Oct. 1, 2021, and a second player needs to throw one dart pin from 09:50 a.m. to 09:50:10 a.m. on Oct. 1, 2021. In another example, the play session may include a first sub-play session in which a first player needs to throw one dart pin from 10:00 a.m. to 10:00:10 a.m. on Oct. 1, 2021, and a second player needs to throw one dart pin from 09:50 a.m. to 09:50:20 a.m. on Oct. 1, 2021. In another example, the play session may include a first sub-play session in which a first player needs to throw one dart pin from 10:00 a.m. to 10:00:10 a.m. on Oct. 1, 2021, and a second player needs to throw one dart pin from 10:00 a.m. to 10:00:20 a.m. on Oct. 1, 2021.

While the foregoing examples describe throwing a single dart pin in a sub-play session, exemplary embodiments in which a single round is ended in the sub-play session or a single dart game play is ended in the sub-play session are also within the scope of the present disclosure.

In accordance with the exemplary embodiment of the present disclosure, when the time condition is set to have different durations, the time conditions may be determined by various factors. In the exemplary embodiment, the time condition may be set based on a relative or absolute skill rating of the players participating in the play session.

For example, when the dart game device 1000 creates a play session, a second player on the other device 2000 may participate in the play session created by the dart game device 1000. As the second player participates in the play session, the network communication unit 150 may receive second prior play-related data of the second player from the other device 2000. In the exemplary embodiment, the second prior play-related data of the second player may be data related to the first player of the dart game device 1000. For example, the second prior play-related data may be data related to the results of the dart game in a prior play session in which the first player and the second player participated together. In this case, the second prior play-related data may include, for example, the dart game rating, score, or the like in the prior play session. Based on the second prior play-related data of the second player and the first prior play-related data of the first player of the dart game device 1000, the control unit 100 may determine a difference in the relative skill ratings of the first player and the second player. The control unit 100 may set a time condition for the play session such that the first player and the second player have different time durations, based on the difference in the determined skill rating.

In other exemplary embodiments, the second prior play-related data of the second player may include information about a rating that is accumulated and generated as the second player participates in the play sessions and performs the dart game. Here, ratings may be an absolute indicator of a player's skill in the dart game. For example, a rating may be an evaluation index of the absolute skill of players in a dart game, determined based on the Elo rating system and the like. In this case, the control unit 100 may, based on the information about the ratings of the first player and the second player, set a time condition for the play session such that the first player and the second player have different time durations.

According to some exemplary embodiments of the present disclosure, the first play-related data of the first player and the second play-related data of the second player may include result data of the play played during at least partially overlapping time periods according to the time constraints imposed by the play session. Here, the overlap may be the same portion of the time period of the dart game played by the first player and the time period of the dart game played by the second player. Thus, a time period that at least partially overlaps may mean that a portion of the time period of the dart game played by the first player and a portion of the time period of the dart game played by the second player were played in the same time period. In other words, the time period of the first player's dart game and the time period of the second player's dart game may overlap at least partially.

Specifically, according to the exemplary embodiment of the present disclosure, the players participating in the same play session may be given different time constraints. For example, when a play session is created by the dart game server 3000, the dart game server 3000 may assign different time constraints to players participating in the same play session based on relative or absolute skill ratings of the players participating in the play session. For example, the dart game server 3000 may impose a time constraint that the first player needs to play from 10:00 a.m. to 10:10 a.m. on Oct. 1, 2021, on the first player participating in the play session. For example, the dart game server 3000 may impose a time constraint that the second player needs to play from 10:00 a.m. to 10:20 a.m. on Oct. 1, 2021, on the second player participating in the same play session. That is, the dart game server 3000 may impose a time constraint on the first player and the second player such that the time period from 10:00 a.m. to 10:10 a.m. on Oct. 1, 2021 overlaps. Accordingly, the first play-related data and the second play-related data generated according to the participation in the same play session of the first player and the second player may include result data of the play played during a time period that at least partially overlaps. Further, the dart game server 3000 may determine a player to proceed with the next play session and/or store said result data by using the result data.

According to the existing dart game system, in online match play, the first player's three dart pin throws must be followed by the second player's three dart pin throws in the same round. Similarly, in the existing dart game system, players using different and remotely located dart game devices have to wait for other players to play in a single round, so that there is a possibility that the progress of the dart game is somewhat slow and boring. The online dart game system 10000 according to the exemplary embodiment of the present disclosure enables real-time online play by allocating play sessions to a plurality of devices during the course of an online dart game.

As players play real-time online play, the dart game device 1000 may display information related to play time constraints for the play session on the display unit 120. Here, the information related to the play time constraint may be information to indicate the time constraint imposed on the player for the play session.

In the exemplary embodiment, a time constraint may refer to a time condition under which two or more players participating in the same play session must perform a specific play in a dart game. Specifically, players may all participate in a time-constrained play session that includes the same play session start time and end time as time conditions. For example, there may be a play session that requires all players to play from 10:00 a.m. to 10:10 a.m. on Oct. 1, 2021. In this case, the control unit 100 may display information related to the play time constraint for the play session start time and the play session end time. For example, the control unit 100 may display the time from the start time to the end time of a game, such as a count-up game or a cricket game.

Further, time constraints may also exist for units with lower granularity, as well as constraints on play session start times and play session end times. For example, a time constraint may include a time constraint in a smaller unit than a play session unit, such as a time constraint for throwing a dart pin. In this case, the information related to the play time constraint may include a time constraint with lower granularity, and the display unit 120 may display the information related thereto.

Specifically, the information related to the play time constraint may include at least one of a first play constraint time period including a time constraint for throwing dart pins, a second play constraint time period including a time constraint for a round allowing N times of dart pin throwing, a third play constraint time period including a time constraint for a set including K rounds, or a preset waiting time period between two sets. That is, the dart game device 1000 may display information about the time constraints for each of the dart pin throws, rounds, and sets, and the waiting times between sets, that are imposed equally on the plurality of players participating in the dart game on the display unit 120.

The dart game device 1000 may also cause information related to the play time constraints of the play session to be displayed on the other device 2000*a* as players play real-time online play. Here, the other device 2000*a* may be a mobile device for presenting information regarding a play session in which the dart game device 1000 is participating to the player in conjunction with the dart game device 1000.

The information related to play time constraints may further include information about the time remaining before the play session starts. For example, a first player of the dart game device 1000 may participate in a 10-minute play session beginning at 10:00 a.m. on Oct. 1, 2021, from 9:55 a.m. on Oct. 1, 2021. In this case, the dart game device 1000 may display information about the time remaining until the play session begins on the display unit 120. The dart game device 1000 may also cause information about the time remaining until the play session begins to be displayed on the other device 2000*a*.

The control unit 100 of the dart game device 1000 may control the sound output unit 190 to output a pre-stored sound or voice based on information related to a play time constraint.

Specifically, the control unit 100 may control the sound output unit 190 to output a pre-stored sound or voice based on a comparison between the data related to the play of the first player of the dart game device 1000 and at least one time constraint period included in the information related to the play time constraint.

For example, the time constraint for throwing a dart pin set in the first play constraint time period included in the information related to play time constraints may be 10 seconds. Based on the data related to the first player's play, the control unit 100 may determine that five seconds or less remain in the time constraint for the first player to throw the dart pin. In this case, the control unit 100 may control the sound output unit 190 or the display unit 120 to output a pre-stored voice, such as "5 seconds, 4 seconds, 3 seconds, 2 seconds, 1 second", or a pre-stored image.

As another example, the time constraint for a round set in the first play constraint time period included in the information related to the play time constraint may be one minute. Based on the data related to the first player's play, the control unit 100 may control the voice or image output to indicate the remaining time until the end of the first player's round or the remaining number of times of dart pin throwing.

As another example, the time constraint for ending a dart game set in the first play constraint time period included in the information related to the play time constraint may be 5 minutes. Based on the data related to the first player's play, the control unit 100 may control the remaining time until the end of the first player's dart game, or the number of rounds remaining, or the number of times of dart pin throwing remained to be output in the form of a voice or an image.

Further, the control unit 100 may determine to transmit information related to the aforementioned play time constraints to an external device including a user's terminal or the like via the network communication unit 150. Accordingly, the information related to play time constraints may be output via the user terminal, and further, information related to play time constraints of one or more other players participating in the play session may also be determined by the dart game device 1000.

The control unit 100 of the dart game device 1000 may also cause a pre-stored sound or voice to be output from the other device 2000*a* based on the information related to play time constraints.

Specifically, the control unit 100 may cause the pre-stored sound or voice to be output from the other device 2000*a* based on a comparison between the data related to the play of the first player of the dart game device 1000 and the at least one constraint time period included in the information related to the play time constraint.

For example, the control unit 100 may cause a pre-stored sound or voice to be output from the other device 2000*a* when it is determined that the start time of the next set is close, based on information about the wait time imposed between the sets.

The control unit 100 of the dart game device 1000 may cause the other device 2000*a* to vibrate in a preset pattern based on the information related to the play time constraint.

For example, the control unit 100 may cause a preset pattern of vibrations to be output from the other device 2000*a* when it is determined that the start time of the next set is close based on the information about the wait time imposed between the sets.

In the present disclosure, the network communication unit 150 of the dart game device 1000 may transmit a first play image of a first player of the dart game device 100 and first play-related data including first play result data in transmitting the first play-related data to the other devices 2000. Here, the first play image may be an image photographed by the dart game device 1000 via the camera unit 140. For example, the first play image may be an image of the first player throwing a dart pin during a time period included in the play session.

The first play result data may be data generated as the first player progresses through the dart game. The first play result data may include at least one of information about the score earned by the first player participating in a play session for throwing dart pins, information about the score earned in a round that allows N times of dart pin throwing, information about the time at which the round that allowed N times of dart pin throwing ended, information about the score earned in a set including K rounds, and information about the time of the end of a set including K rounds.

The first play-related data may be data that includes both information related to the first player and information related to the dart game device 1000. Further, the first play-related data may include at least one of the first play image and the first play result data. Further, the first play-related data may include at least one of identification information of the first player, information about a pre-stored image representing the first player, information about a predetermined character for identifying the first player, information about a predetermined text for identifying the first player, information about a score related to a dart game of the first player participating in the play session, information about a ranking related to a dart game of the first player participating in the play session, information about an image of a player playing a dart game, and information about network traffic. Here, the network traffic information may include any form of factor that affects the performance or speed of a network, such as the amount of data flowing through a network device for a specific time, network bandwidth, and hardware information that affects network speed.

According to some exemplary embodiments of the present disclosure, the control unit 100 of the dart game device 1000 may also determine whether to transmit the first play image based on a result of a comparison between the previous play and the current play.

Specifically, the control unit 100 may compare the first play image with a previous play image of the first player pre-stored in the storage unit 110 when the first play image is photographed by the camera unit 140. Then, based on the comparison result, the control unit 100 may determine whether to transmit the first play image.

For example, when a difference between the first play image and the previous play image of the first player pre-stored in the storage unit 110 is greater than a predetermined threshold as a result of the comparison, the control unit 100 may determine to transmit the first play image. As an example, when the first play image is photographed via the camera unit 140, the control unit 100 may compare the first play image with the previous play image of the first player pre-stored in the storage unit 110 to generate a difference value indicating the difference between the first play image and the previous play image. The control unit 100 may determine to transmit the first play image when the difference value generated as a result of the comparison is greater than a preset threshold. In other words, the control unit 100 may determine to transmit the newly photographed first play image only when the first play image and the previous play image are different enough to have a difference greater than the preset threshold.

According to some other exemplary embodiments of the present disclosure, the control unit 100 of the dart game device 1000 may determine whether to transmit the first play image based on the first play-related data of the first player. That is, the control unit 100 may determine whether to transmit the first play image by using data, not the play image.

Specifically, the control unit 100 may compare the first play-related data with the previous play-related data of the first player pre-stored in the storage unit 110 when the first play image is photographed via the camera unit 140. Further, based on the comparison result, the control unit 100 may determine whether to transmit the first play image.

For example, when a difference between the pre-stored first player's previous play-related data and the first play data is greater than a preset threshold as a result of the comparison, the control unit 100 may determine to transmit the first play image. In a specific example, the control unit 100 may compare the first play-related data with the first player's previous play-related data pre-stored in the storage unit 110 to generate a difference value indicative of the difference. When the difference value generated as the result of the comparison between the first play data and the pre-stored first player's previous play-related data is greater than the preset threshold, the control unit 100 may determine to transmit the first play image. The control unit 100 may determine to transmit the newly photographed first play image only when the first play-related data and the previous play-related data are different enough to have a difference greater than the preset threshold.

If the network communication unit 150 transmits the play image every time the play image is photographed by the camera unit 140, the load of network traffic may increase. Therefore, the control unit 100 may compare the previous play-related data with the current play-related data, or compare the previous play image with the current play image, to determine whether to transmit the current play image. In this way, the network load may be reduced, and real-time dart game play that enhances the user experience may be implemented.

The display unit 120 may display information related to the play session based on the second play-related data (S120).

The information related to the play session may include a second play image of a second player on the other device 2000 throwing a dart pin during a time period included in the play session. Here, the second play image may be an image photographed by the camera unit 140 of the other device 2000.

The information related to the play session may be an image generated based on the dart game play result information of the other device 2000. Specifically, when the control unit 100 receives the second play-related data of the other device 2000 via the network communication unit 150, the control unit 100 may determine a display image related to the second play-related data among at least one pre-stored image. Here, the display image may include at least one of a pre-stored image of the second player throwing a dart pin, a pre-determined character image for identifying the second player, and a pre-determined text for identifying the second player. Then, the display unit 120 may display the determined display image.

The information related to the play session may include a second play image of the second player of the other device 2000 throwing a dart pin during a time period included in the play session, and an actual image of a dart pin thrown by the second player of the other device 2000 hitting a dart target part. Specifically, the network communication unit 150 may receive a second play image from the other device 2000 and an actual image of a dart pin thrown by a second player of the other device 2000 hitting a dart target part. Here, the actual image may be the image photographed by the camera unit of the other device 2000. In response to receiving the second play image and the actual image, the control unit 100 may control the display unit 120 to display information related to the play session including the second play image and the actual image.

The information related to the play session may include the second play image of the second player of the other device 2000 throwing a dart pin during the time period included in the play session, and a pre-stored virtual image of the dart target part corresponding to the second play-related data. Specifically, the network communication unit 150 may only receive the second play image from the other device 2000, and may not receive the actual image of the dart pin being thrown by the second player of the other device 2000 hitting the dart target part, based on the determination of the control unit 100. For example, the control unit 100 may determine a network rating for the other device 2000 based on traffic information of a network including the devices participating in the play session. Based on the determined network rating, the network communication unit 150 may only receive the second play image from the other device 2000 and may not receive the actual image from the dart target perspective of the dart pin hitting the dart target part. In this case, the control unit 100 may determine a pre-stored dart target part-related virtual image corresponding to the second play-related data. For example, the control unit 100 may recognize, based on the second play-related data, that the second player has scored 20 points. In this case, the control unit 100 may determine an image of the dart pin reaching the 20-point area among at least one image pre-stored in the storage unit 110. The dart game device or dart game server may store images of the dart pin reaching each segment of the dart target part. As the dart target part-related virtual image is determined, the display unit 120 may display information related to the play session including the dart target part-related virtual image and the second play image.

The information related to the play session may include a display image related to the second play-related data among at least one pre-stored image and the actual image of a dart pin thrown by the second player of the other device 2000 hitting the dart target part. Specifically, the network communication unit 150 may, based on the determination of the control unit 100, receive only the actual image of a dart pin thrown by the second player of the other device 2000 hitting the dart target part, and may not receive the second play image of the second player throwing the dart pin. In this case, the control unit 100 may determine the display image based on the second play-related data from at least one pre-stored image (for example, a predetermined type of image of a dart pin being thrown). As the display image is determined, the display unit 120 may display information related to the play session including the actual image and the display image.

The information related to the play session may include a display image related to the second play-related data of the at least one pre-stored image, and a virtual image related to the pre-stored dart target part corresponding to the second play-related data. Specifically, the network communication unit 150 may not receive the second play image from the other device 2000 and the actual image of a dart pin thrown by the second player of the other device 2000 hitting the dart target part, based on a determination of the control unit 100, and may only receive the second play-related data. In this case, the control unit 100 may determine, based on the second play-related data, a pre-stored dart target part-related virtual image and a display image corresponding to the second play-related data. Then, the display unit 120 may display information related to the play session including the virtual image and the display image.

The control unit 100 of the dart game device 1000 may determine that the information related to the play session includes one between the pre-stored dart target part-related virtual image corresponding to the second play-related data and the actual image of a dart pin thrown by the second player of the other device 2000 hitting the dart target part.

Specifically, the control unit 100 may determine, based on communication network information or hardware information of the dart game device, that one between the virtual image and the actual image is included in the information related to the play session. Here, the communication network information may include, for example, the amount of data flowing via the network equipment during a particular time or the network bandwidth. The hardware information may include information about Network Interface Card (NIC), ethernet card, and local area network (LAN) card that affects network speed. The network communication unit 150 may receive the actual image when the control unit 100 determines that the actual image is included in the information related to the play session. Alternatively, when the control unit 100 determines that the pre-stored dart target part-related virtual image is included in the information related to the play session, the network communication unit 150 may receive the play result data of the second player. Further, the display unit 120 may display information related to the play session such that the network communication unit 150 determines that the image determined by the control unit 100 is included in the information related to the play session.

The control unit 100 of the dart game device 1000 may determine a network rating for the other devices 2000 based on traffic information on the network including the devices participating in the play session. The network traffic information may include any form of factors that affect the performance or speed of the network, such as the amount of data flowing via the network equipment during a particular time, network bandwidth, hardware information that affects network speed, and the like. A network rating may refer to a quantitative index that indicates the performance or speed of a network.

Based on the determined network rating, the network communication unit 150 may receive the second play image of the second player throwing the dart pin from the other device 2000 having a first rating. Alternatively, the network communication unit 150 may receive, based on the determined network rating, at least one of the second play image and the actual image of the dart pin thrown by the second player hitting the dart target part from the other device 2000 having the first rating. The network communication unit 150 may receive the image photographed by the camera unit of the other device 2000 directly from the other device 2000 having a higher network rating. The network communication unit 150 may receive second play-related data that does not include the second play image from the other device 2000 having a second rating. In other words, the network communication unit 150 may receive only the second play result data of the second player from the other device 2000 having the second rating. In this case, the control unit 100 may determine, based on the second play-related data, a display image related to the second play-related data among at least one pre-stored image. The network communication unit 150 may only receive play result data that is relatively smaller in size than the play-related image from the other device 2000 having a lower network rating. In this case, the control unit 100 may determine the appropriate image based on traffic on the network including the devices participating in the play session and provide the determined image to the player. Hereinafter, an example of a method of determining, by the control unit 100, the network rating for the other device 2000 based on traffic information according to the present disclosure will be described with reference to FIG. 7.

According to some exemplary embodiments of the present disclosure, when the display unit 120 of the dart game device 1000 displays information related to a play session, the display unit 120 may additionally display information related to a play time constraint.

Here, the information related to the play time constraints may include at least one of a first play constraint time period including a time constraint for a dart pin throw, a second play constraint time period including a time constraint for a round that allows N times of dart pin throwing, a third play constraint time period including a time constraint for a set including K rounds, or a preset waiting time period between two sets. Thus, the display unit 120 may display time constraints for each of the dart pin throws, rounds, and sets given to the plurality of players participating in the dart game, and time constraints for waiting times given between the sets.

To describe more about play time constraints, a play time constraint may be the time constraint equally given to multiple players participating in the same play session.

Specifically, the first player and the second player participating in the first play session may be given the same time constraint for throwing dart pins.

For example, when the first player is given a time constraint of 5 seconds to throw a dart pin, the second player may also be given a time constraint of 5 seconds to throw a dart pin. However, the present disclosure is not limited thereto.

In the present disclosure, a player may be penalized for exceeding a time constraint for throwing a dart pin.

For example, when it is determined that the first player has exceeded the time constraint for throwing the dart pin, the control unit 100 of the dart game device 1000 may discard an opportunity for the first player to throw a dart pin. As a concrete example, a dart game may be played mainly with a 01 game (zero one game), a cricket game, or a count-up game. Further, each game may have three opportunities to throw dart pins in one round. In this case, the control unit 100 may discard any of the three dart pin throwing opportunities that exceed the time constraint.

In another example, when it is determined that the first player has exceeded the time constraint for throwing the dart pin, the control unit 100 of the dart game device 1000 may deduct some of the points earned for throwing the dart pins. As a concrete example, a dart pin thrown by a player who has exceeded the time constraint for throwing opportunities may reach the 20-point area. In this case, the control unit 100 may subtract some of the 20 points and determine that the player earned 18 points for that dart pin throwing opportunity. However, the present disclosure is not limited thereto.

Further, in the present disclosure, a player may be penalized for exceeding the time constraint for a round that allows N times of dart pin throwing.

For example, in a round that allows three times of dart pin throwing, the control unit 100 of the dart game device 1000 may discard the opportunity for third dart pin throwing when the throwing of the third dart pin is not recognized and the time constraint for the round has been exceeded.

In another example, the control unit 100 of the dart game device 1000 may discard points earned for a corresponding round when the throwing of the third dart pin is not recognized and the time constraint for the round has been exceeded.

In another example, the control unit 100 of the dart game device 1000 may further increase the time constraint given to the next round when the time constraint for the round is exceeded, so that the time given to the player in the next round may be shorter.

Further, in the present disclosure, a player may be penalized for exceeding a time constraint for a set including N rounds.

For example, when the time constraint for a set is exceeded, the control unit 100 of the dart game device 1000 may further increase the time constraint given for the next set, so that the time given to the player for the next set is shorter.

When the display unit 120 of the dart game device 1000 displays the information related to the play session based on the second play-related data, the control unit 100 may determine a display method for the second play-related data.

Specifically, the network communication unit 150 may receive the second play-related data of the second player on the other device 2000. In this case, the control unit 100 may compare the second play-related data with the second player's previous play-related data pre-stored in the storage unit 110. Further, based on the comparison of the previous play-related data and the second play-related data, the control unit 100 may determine whether to display the second play image of the second player, and/or determine a display method of the second play-related data.

The information related to the play session being displayed on the display unit 120 may be a second play image of the second player throwing a dart pin, determined based on the previous play-related data. When the control unit 100 generates information related to the play session each time the second play-related data is received via the network communication unit 150, the load on the control unit 100 may increase. Thus, the control unit 100 may compare the previous play-related data with the second play-related data. Then, based on the comparison results, the control unit 100 may determine whether to display the second play image of the second player, and/or determine a method of displaying the second play-related data.

For example, the control unit 100 may display the second play image of the second player when the control unit 100 determines that a significant change in the second player's score has occurred, based on the comparison of the previous play result data and the second play result data. For example, a significant change may mean a difference between the previous score and the current score that is greater than a predetermined threshold reference.

In another example, the control unit 100 may determine that a significant change in the second player's score did not occur, based on the comparison of the previous play result data and the second play result data. In this case, the control unit 100 may determine that the currently displayed image, such as a character related to the second player, is maintained.

In another example, the control unit 100 may determine, based on the previous play result data, that a significant change has occurred when the second player who had earned only low scores, such as 1 to 5 points, earns 20 points. In this case, the control unit 100 may determine that the pre-stored image related to the acquisition of the 20 points is displayed. However, the present disclosure is not limited thereto.

According to some exemplary embodiments of the present disclosure, the network communication unit 150 of the dart game device 1000 may receive third play-related data of the other device 2000 that is participating in a play session other than the play session in which the dart game device 1000 is participating. In this case, the display unit 120 may further display the third play-related data.

Specifically, the dart game device 1000 may be participating in one of a plurality of play sessions in a tournament-style dart game. Additionally, there may be players or specific players preset by the player in a play session other than the play session in which the dart game device 1000 is participating. In this case, the network communication unit 150 may receive third play-related data from a preset player or from the other device 2000 of a specific player. The display unit 120 may further display the third play-related data. However, the present disclosure is not limited thereto.

According to the configurations described above, the dart game device 1000 may provide a real-time online dart game to players by participating in a play session that imposes a play time constraint on two or more devices. In addition, the dart game device 1000 may display information related to a play session in which the dart game device 1000 is participating on the display unit 120. Thus, the dart game device 1000 may increase the interest of a player participating in the dart game.

According to some exemplary embodiments of the present disclosure, the information related to the play session may include an object that displays information related to the other device 2000. In this case, the control unit 100 of the dart game device 1000 may determine a display attribute for the object to be displayed on the display unit 120. Here, the object may refer to any form of information displayed on the dart game device 1000 or the other device 2000. The display attribute may include information about the area in which the object is to be displayed, a position at which the object is to be displayed, or the size at which the object is to be displayed. Referring now to FIG. 5, it will be described a method of determining, by the control unit 100, a display attribute for an object according to the present disclosure.

FIG. 5 is a flow diagram for illustrating an example of a method of determining, by the dart game device, a display attribute for an object according to some exemplary embodiments of the present disclosure.

Referring to FIG. 5, the network communication unit 150 of the dart game device 1000 may receive second play-related data from the other device 2000 (S210). Here, the other device 2000 may be a device that is participating in the same play session as the dart game device 1000.

Additionally, the network communication unit 150 may also receive third play-related data from the other device 2000 that is participating in a play session other than the play session in which the dart game device 1000 is participating.

According to some exemplary embodiments of the present disclosure, the second play-related data may include resultant data of the play that was played via two or more devices over a time period that at least partially overlaps based on time constraints imposed by the play session.

Specifically, the dart game device 1000 and the other device 2000 may participate in a play session that imposes a play time constraint on the two or more devices to allow for real-time dart game play. Accordingly, in a dart game played during a play session or at least one sub play session included in a play session, the first player and the second player may have played the dart game for the time period that at least partially overlaps. Accordingly, the second play-related data may include result data of the play that was played during the time period that at least partially overlaps with the first play-related data. However, the present disclosure is not limited thereto.

The control unit 100 of the dart game device 1000 may determine a display attribute for an object related to the other device 2000, based at least in part on the second play-related data (S220).

Here, the object related to the other device 2000 may include at least one of an image of the second player of the other device 2000 throwing a dart pin within a time period included in the play session, an image of a predetermined character for identifying the second player, a predetermined text for identifying the second player, and an image related to the dart target part of the second player. However, the present disclosure is not limited thereto. Hereinafter, an additional exemplary embodiment of the object related to the other device 2000 will be described with reference to FIG. 11.

The display attribute may be a property or characteristic of an object that is determined by the control unit 100 to allow the object related to the other device 2000 to be displayed on the display unit 120. In the exemplary embodiment, the display attributes may include a first attribute, a second attribute, a third attribute, a fourth attribute, and a fifth attribute related to the object.

The first attribute may be an attribute indicating an area in which the object is to be displayed.

Specifically, the display unit 120 of the dart game device 1000 may include a first area and a second area disposed in an area different from the first area. For example, the first area may be an area more proximate to the dart target part 200 of the dart game device 1000 than the second area. Due to the characteristic of the dart game, players may have a relatively high visual focus on the dart target part 200 and the periphery of the dart target part 200 compared to other areas. Furthermore, the first area and the second area may be limited in physical space. Accordingly, the control unit 100 may determine, based on the second play-related data, a first attribute indicative of whether the object is to be displayed in the first area or the second area.

Further, the second attribute may be an attribute indicating a position where the object is to be displayed.

Specifically, when the first attribute for the area in which the object is to be displayed is determined, the control unit 100 may determine a second attribute for a position within the determined area in which the object is to be displayed.

For example, the first area may display objects related to eight different devices 2000. In this case, the control unit 100 may determine a second attribute for a position where each of the eight objects is to be displayed within the first area. However, the present disclosure is not limited thereto.

Further, the third attribute may be an attribute indicating a display size for the object.

Specifically, the first area and the second area may have different sizes. Accordingly, the control unit 100 may determine a third attribute indicative of a display size for the object to match the size of the respective area.

Further, the dart game device 1000 may have different sizes of the display areas 121 and 122 depending on the exemplary embodiment. In this case, the first area may have a different size, and the second area may have a different size, depending on the dart game device 1000. Accordingly, the control unit 100 may determine a third attribute for the object to fit the size of the respective display areas 121 and 121.

Additionally, according to the exemplary embodiment, the display size for the object may also be determined based on information other than the display areas 121 and 122.

For example, the control unit 100 may determine, from a plurality of objects related to a plurality of different devices, an object related to a predetermined player as the object to be displayed on the display unit 120. The control unit 100 may determine the size of the object related to the predetermined player to be larger than the size of the other plurality of objects. Hereinafter, an example of the size of an object displayed on the display unit 120 will be described with reference to FIG. 12.

The fourth attribute may be an attribute indicating whether the object is to be displayed.

For example, the control unit 100 may determine the fourth attribute such that, among the plurality of objects, objects related to the other devices 2000 that are less relevant to the first player of the dart game device 1000 are not displayed. Alternatively, the control unit 100 may determine the fourth attribute such that, among the plurality of objects, objects related to the other devices 2000 that are more relevant to the first player are displayed.

In another example, the control unit 100 may also determine, based on traffic information from the network, a fourth attribute indicating whether an object related to the other device 2000 is to be displayed.

Further, the fifth attribute may be an attribute indicative of the shape of the object being displayed.

Specifically, objects related to the other devices 2000 may have different shapes, depending on the area in which the objects are displayed.

For example, the control unit 100 may determine the fifth property such that objects displayed in the first area and objects displayed in the second area have different shapes. However, the present disclosure is not limited thereto. Hereinafter, the exemplary embodiment of the object according to the present disclosure will be described with reference to FIGS. 11 to 13. The display unit 120 of the dart game device 1000 may display objects related to the other devices 2000 based on the determined display attributes (S230).

For example, the display unit 120 may display the object related to the other device 2000 in the determined area based on the first attribute. In another example, the display unit 120 may display the object related to the other device 2000 at the determined position based on the second attribute. However, the present disclosure is not limited thereto.

According to some exemplary embodiments of the present disclosure, the control unit 100 of the dart game device 1000 may further determine, based on the first play-related data of the dart game device 1000, a display attribute for the object related to the other device 2000.

Specifically, by comparing the first play-related data of the dart game device 1000 with the second play-related data of the other device 2000, the control unit 100 may determine a display attribute for the object related to the other device 2000.

For example, the control unit 100 may compare first ranking information included in the first play-related data with second ranking information included in the second play-related data. Further, the control unit 100 may determine a display attribute for the object related to the other device 2000 based on the proximity between the first ranking and the second ranking. Here, proximity may refer to how close the first and second ranks are.

For example, the control unit 100 may determine a first attribute such that the object related to the other device 2000 that is determined to have high proximity is displayed in the first area of the display unit 120. Further, the control unit 100 may determine a first attribute such that the object related to the other device 2000 that is determined to have relatively low proximity is displayed in the second area of the display unit 120.

According to some exemplary embodiments of the present disclosure, the control unit 100 of the dart game device 1000 may compare the first play-related data of the dart game device 1000 with the second play-related data of the other device 2000. Further, based on the result of the comparison, the control unit 100 may determine objects which are related to the predetermined number of devices among the plurality of the other devices participating in the play session. In this case, the display unit 120 may display the determined objects.

Specifically, the control unit 100 may determine proximity between the first ranking information included in the first play-related data and the second ranking information included in the second play-related data within a time period included in the play session. The control unit 100 may then determine objects related to the predetermined number of devices based on the determined proximity as objects to be displayed on the display unit 120.

For example, the control unit 100 may determine objects related to the predetermined number of devices with high proximity as objects to be displayed on the display unit 120 based on the proximity between the first ranking information and the second ranking information. In this case, objects related to the predetermined number of the other devices 2000 among the plurality of the other devices having a ranking proximate to that of the dart game device 1000, regardless of whether the other devices 2000 have a higher or lower ranking than the dart game device 1000, may be determined as objects to be displayed on the display unit 120.

For example, the first player of the dart game device 1000 may be ranked 50th in the play session. In this case, an object related to each of the other devices 2000 of the second players who ranked $46^{th}$ to $49^{th}$ and $51^{st}$ to $54^{th}$ among the plurality of the other devices may be determined as an object to be displayed on the display unit 120.

For example, in a specific example, when the first player is ranked $50^{th}$ in the play session, the control unit 100 may determine the second players ranked $49^{th}$ and $51^{st}$ that are closest to the $50^{th}$ ranking. The control unit 100 may determine the second players ranked $48^{th}$ and $52^{nd}$ that are the second highest proximity to the ranking of the first player. In this way, the control unit 100 may determine the predetermined number of eight second players ranked $46^{th}$ to $49^{th}$ and $51^{st}$ to $54^{th}$. When the second players ranked $46^{th}$ to $49^{th}$ and $51^{st}$ to $54^{th}$ are determined, the control unit 100 may determine objects related to each of the second players as objects to be displayed in the first area of the display unit 120. Then, the control unit 100 may determine objects related to each of the remaining players, other than the players ranked $46^{th}$ to $49^{th}$ and $51^{st}$ to $54^{th}$, as objects to be displayed in the second area of the display unit 120. Here, the first area may be an area more proximate to the dart target part 200 of the dart game device 1000 than the second area. Due to the characteristic of the dart game, players may have a relatively high visual focus on the dart target part 200 and the periphery of the dart target part 200 compared to other areas. Accordingly, the control unit 100 may determine that the objects related to the second players ranked $46^{th}$ to $49^{th}$ and $51^{st}$ to $54^{th}$ are to be displayed in the first area adjacent to the dart target part 200.

When the second players are determined, the control unit 100 of the dart game device 1000 may also display objects related to each of the second players in the second area of the display unit 120. The information displayed in the second area may be information related to the overall rankings of the play session in which the players on the dart game device 1000 and the other devices 2000 are participating. Thus, the control unit 100 may also determine that objects related to the second players are to be displayed in the second area in addition to the first area. The control unit 100 may determine that the objects related to the second players that are displayed in the second area are displayed in a different form from the objects related to the remaining players that are displayed in the second area. For example, the control unit 100 may highlight the objects related to the second player such that the objects related to the second player are highlighted compared to the objects related to the remaining players. In another example, the objects related to the remaining players other than the second player that are being displayed in the second area may be displayed in a textual format that includes identification information. In this case, the control unit 100 may display the objects related to the second players in a form that does not display any information, but only occupies a position within the second area. In this case, the position within the second area where the objects related to the second player need to be displayed may be blank. In a specific example, in the second area, the identification information of each of the 100 players is displayed in a textual form based on the ranking, and the ranking of the first player of the dart game device 1000 may be 50. In this case, the control unit 100 may determine that the objects related to the second players ranked $46^{th}$ to $49^{th}$ and $51^{st}$ to $54^{th}$ are displayed as blank within the second area. The dart game device 1000 or the dart game system 10000 according to the present disclosure may allow numerous players to simultaneously perform a dart game in the same play session. Accordingly, it may be difficult for a first player of the dart game device 1000 to determine the position where the objects related to the first player are being displayed in the second area. Thus, when the second players with high proximity to the first player of the dart game device 1000 are determined, the control unit 100 may determine that objects related to the second players are emphasized.

According to some exemplary embodiments of the present disclosure, the control unit 100 may determine, based on the first ranking information and the second ranking information, a high-level device among the plurality of the other devices that has a higher ranking than the ranking of the dart game device 1000. Based on the second ranking information of the high-level device and the first ranking information of the dart game device 1000, the control unit 100 may determine objects related to the predetermined number of devices with high proximity as objects to be displayed on the display unit 120. In this case, the predetermined number of devices from the ranking immediately above the ranking of the dart game device 1000 may be determined as objects to be displayed on the display unit 120.

In a specific example, the ranking of the first player of the dart game device 1000 may be 50 within the play session. In this case, an object related to each of the other devices 2000 of the second players ranked $42^{nd}$ to $49^{th}$ among the plurality of the other devices may be determined as an object to be displayed on the display unit 120. However, the present disclosure is not limited thereto.

In another example, the control unit 100 may determine, based on the first ranking information and the second ranking information, a high-level device among the plurality of the other devices that has a higher ranking than the ranking of the dart game device 1000. Based on the second ranking information of the high-level device and the first ranking information of the dart game device 1000, the control unit 100 may determine objects related to the predetermined number of devices with low proximity as objects to be displayed on the display unit 120. In this case, the predetermined number of devices from the highest ranking of the dart game device 1000 may be determined as objects to be displayed on the display unit 120.

In a specific example, the ranking of the first player of the dart game device 1000 may be 50 within the play session. In this case, the ranking having the lowest proximity to ranking 50 among the high-level devices may be 1. Thus, an object related to each of the other devices 2000 of the second players ranked $1^{st}$ to $8^{th}$ among the plurality of the other devices may be determined as an object to be displayed on the display unit 120. However, the present disclosure is not limited thereto.

In another example, the control unit 100 may determine, based on the first ranking information and the second ranking information, a low-level device among the plurality of the other devices that has a lower ranking than the ranking of the dart game device 1000. Based on the second ranking information of the low-level device and the first ranking information of the dart game device 1000, the control unit 100 may determine objects related to the predetermined number of devices with high proximity as objects to be displayed on the display unit 120. In this case, the predetermined number of devices from the ranking immediately below the ranking of the dart game device 1000 may be determined as objects to be displayed on the display unit 120.

In a specific example, the ranking of the first player of the dart game device 1000 may be 50 within the play session. In this case, an object related to each of the other devices 2000 of the second players ranked $51^{st}$ to $59^{th}$ among the plurality of the other devices may be determined as an object to be displayed on the display unit 120. However, the present disclosure is not limited thereto.

In another example, the control unit 100 may determine, based on the first ranking information and the second ranking information, a low-level device among the plurality of the other devices that has a lower ranking than the ranking of the dart game device 1000. Based on the second ranking information of the low-level device and the first ranking information of the dart game device 1000, the control unit 100 may determine objects related to the predetermined number of devices with low proximity as objects to be displayed on the display unit 120. In this case, the predetermined number of devices from the lowest ranking may be determined as objects to be displayed on the display unit 120.

In a specific example, the ranking of the first player of the dart game device 1000 may be 50 within the play session. In this case, the ranking with the lowest proximity to ranking 50 among the low-level devices may be 100. Thus, an object related to each of the other devices 2000 of the second players ranked $93^{rd}$ to $100^{th}$ among the plurality of the other devices may be determined as an object to be displayed on the display unit 120. However, the present disclosure is not limited thereto.

According to some exemplary embodiments of the present disclosure, the control unit 100 of the dart game device 1000 may predetermine the number of objects to be displayed on the display unit 120 based on traffic information related to the transmission and reception speed of the network.

For example, the control unit 100 may recognize the network transmission and reception speed of the dart game device 1000 to and from the plurality of the other devices or the dart game server 3000 based on the traffic information. Based on the recognized speed, the control unit 100 may determine the number of objects related to the other device 2000 to be displayed on the display unit 120. However, the present disclosure is not limited thereto. Hereinafter, an example of a method in which the control unit 100 predetermines the number of objects related to the other device 2000 to be displayed on the display unit 120 based on the traffic information will be described with reference to FIG. 7.

When the objects related to the predetermined number of devices are determined, the control unit 100 of the dart game device 1000 may determine display attributes of the determined objects.

For example, the control unit 100 may determine that the objects related to the predetermined number of devices are to be displayed in a first form. The control unit 100 may determine that objects related to a device other than the predetermined number of devices among the plurality of the other devices participating in the play session are to be displayed in a second form that is different from the first form. Here, the first form may include at least one of an image of the second player throwing a dart pin, an image of a predetermined character for identifying the second player, or a predetermined text for identifying the second player. Further, the second form may include identification information of the second player.

Specifically, the objects related to the predetermined number of devices may be important information for the first player of the dart game device 1000. Thus, the objects related to the predetermined number of devices may be determined to be displayed in the first form. Further, the objects related to devices other than the predetermined number of devices may be displayed in the second form.

However, without limitation, the control unit 100 may also display objects related to devices other than the predetermined number of devices in the first form when the size of the display unit 120, available resources, or network traffic is sufficient.

The control unit 100 may determine that the objects related to the predetermined number of devices are to be displayed in the first area when the objects related to the predetermined number of devices are determined. Further, the control unit 100 may determine that objects related to a device other than the predetermined number of devices among the plurality of the other devices participating in the play session are to be displayed in the second area that is different from the first area. Here, the first area may be an area more proximate to the dart target part 200 of the dart game device 1000 than the second area.

In particular, due to the characteristic of the dart game, players may have a relatively high visual focus on the dart target part 200 and the periphery of the dart target part 200 compared to other areas. Thus, the control unit 100 may determine that the objects related to the predetermined number of devices are to be displayed in the first area adjacent to the dart target part 200.

Furthermore, the objects displayed in the first area may be displayed in the second area in a different display form than the display form displayed in the first area.

Specifically, the control unit 100 may determine that the objects displayed in the first area are in the first form that includes an image of dart pin throwing. The objects displayed in the second area may be determined to be in the second form that includes identification information of the player. The information displayed in the second area may be information related to the rankings of the play session in which the player on the dart game device 1000 and the players of the other devices 2000 are participating. Accordingly, the objects displayed in the first area may also be displayed in the second area in the second form that includes the identification information of the player. However, the present disclosure is not limited thereto. Hereinafter, an example of the first form and the second form will be described with reference to FIG. 13.

The control unit 100 of the dart game device 1000 may determine the size of the objects related to the predetermined number of devices displayed in the first area. Further, the control unit 100 may determine that the size of the objects related to devices other than the predetermined number of devices displayed in the second area is smaller than the size of the objects displayed in the first area. However, the present disclosure is not limited thereto.

According to some exemplary embodiments of the present disclosure, the control unit 100 of the dart game device 1000 may determine not to display objects related to devices other than the predetermined number of devices.

Specifically, the control unit 100 may determine that the objects related to the predetermined number of devices are to be displayed when the objects related to the predetermined number of devices are determined. Here, the area in which the objects related to the predetermined number of devices are displayed may be the first area, or may be the second area. Alternatively, the objects related to the predetermined number of devices may be displayed in both the first area and the second area. Further, the control unit 100 may determine that objects related to devices other than the predetermined number of devices among the plurality of the other devices participating in the play session are not to be displayed.

According to some exemplary embodiments of the present disclosure, the control unit 100 of the dart game device 1000 may determine a display attribute for an object related to the dart game device 1000 based on the first play-related data of the dart game device 1000. That is, the control unit 100 may determine display attributes for objects related to the first player of the dart game device 1000. The display unit 120 may display the objects related to the dart game device 1000 based on the determined display attributes. The area in which the objects related to the dart game device 1000 are displayed may be different from the area in which objects related to the other devices 2000 are displayed.

For example, the control unit 100 may determine that the display unit 120 displays objects related to the plurality of the other devices in the first area and the second area. Further, the control unit 100 may determine that objects related to the dart game device 1000 are displayed in a third area that is different from the first area and the second area, such that the objects related to the plurality of the other devices may be displayed separately from the objects related to the plurality of the other devices.

The control unit 100 of the dart game device 1000 may display the objects related to the dart game device 1000 in the second area in a display form that is different from the display form of the objects displayed in the third area. In this case, the player may also be able to determine his/her ranking through the object displayed within the second area where the information relating to the ranking in the play session is being displayed.

The control unit 100 of the dart game device 1000 may also display the objects related to the dart game device 1000 in a third form that is different from the second form of the objects of the other devices 2000 that are being displayed in the second area.

Specifically, the third form may be a highlighted form in which the object related to the dart game device 1000 is highlighted, or alternatively, the object may be in a position within the second area, with no identification information displayed.

For example, the dart game device 1000 or the dart game system 10000 according to the present disclosure may allow numerous players to simultaneously perform a dart game in the same play session. In this case, it may be difficult for a player to check a position where the objects related to him or her are being displayed in the second area where information related to the ranking in the play session in which the dart game device 1000 is participating is being displayed. Therefore, the control unit 100 may also determine the form of the object related to the dart game device 1000 in a third form that is different from the forms of the objects related to the plurality of the other devices so that the object related to the dart game device 1000 is highlighted.

According to some exemplary embodiments of the present disclosure, the control unit 100 of the dart game device 1000 may also determine the number of objects to be displayed in the second area based on the number of plurality of the other devices participating in the play session.

According to the foregoing configuration, the control unit 100 of the dart game device 1000 may determine a display attribute for the object related to the other device 2000 through various methods. Further, the display unit 120 may display the object related to the other device 2000 based on the determined display attribute. Accordingly, the dart game device 1000 may effectively provide the players with information related to the other device 2000.

According to some exemplary embodiments of the present disclosure, the control unit 100 of the dart game device 1000 may also change a relative position of the plurality of objects based on the play-related data of the other device 2000. Hereinafter, an example of a method of changing, by the control unit, the relative position of the plurality of objects according to the present disclosure will be described with reference to FIG. 6.

Figure 6:
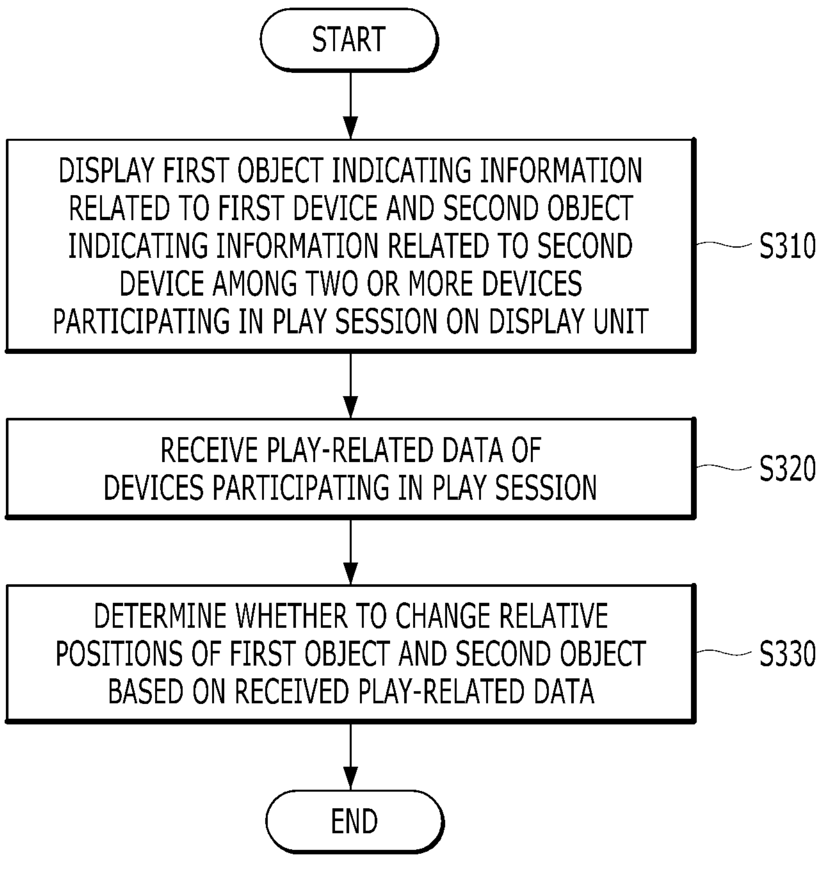
FIG. 6 is a diagram for illustrating an example of a method of changing, by the dart game device, relative positions of a first object and a second object according to some exemplary embodiments of the present disclosure.

FIG. 6 is a diagram for illustrating an example of a method of changing, by the dart game device, relative positions of a first object and a second object according to some exemplary embodiments of the present disclosure.

Referring to FIG. 6, the display unit 120 of the dart game device 1000 may display a first object indicating information related to a first device and a second object indicating information related to a second device among two or more devices participating in the play session (S310). Here, the first device and the second device may be devices 2000 other than the dart game device 1000.

Specifically, the control unit 100 may determine a display attribute for each of the first object and the second object based on previous play-related data related to the first device and the second device received via the network communication unit 150. Further, the display unit 120 may display the first object and the second object based on the determined display attribute.

The network communication unit 150 of the dart game device 1000 may receive play-related data of devices participating in the play session (S320).

Specifically, the network communication unit 150 may receive play-related data related to each of the first device and the second device from each of the first device and the second device. Alternatively, the network communication unit 150 may receive play-related data related to each of the first device and the second device from the dart game server 3000.

The control unit 100 of the dart game device 1000 may determine whether to change the relative positions of the first object and the second object based on the play-related data received via the network communication unit 150 (S330).

Specifically, the control unit 100 may determine whether to change the relative positions of the first object and the second object based on the received play-related data and play-related data related to the play session of the dart game device 1000. Here, the change in the relative position may mean an operation in which the positions of the first object and the second object are exchanged.

Figure 13:
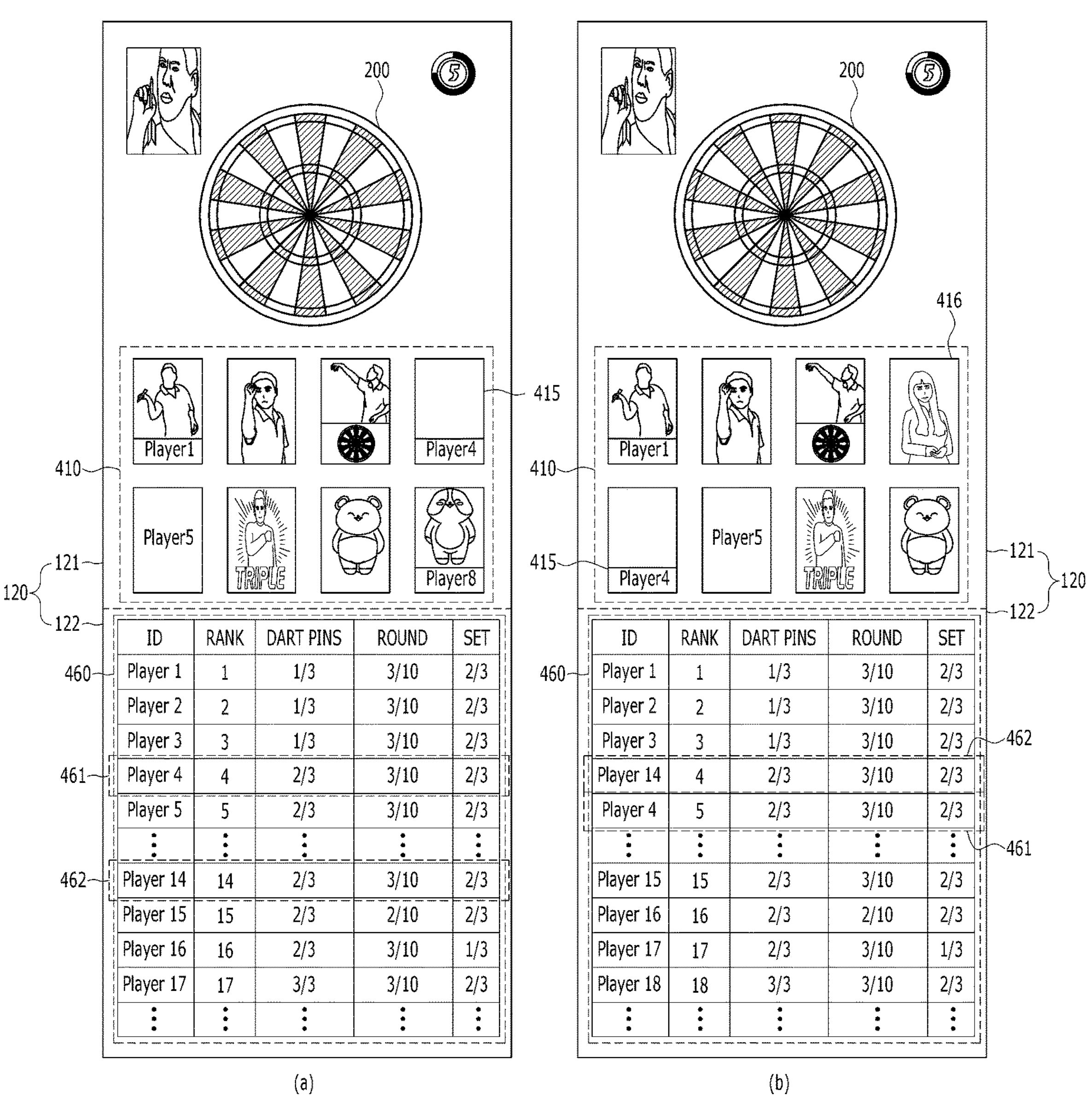
FIG. 13 is a diagram for illustrating an example of a method of changing, by the dart game device, a relative position of each of the plurality of objects according to some exemplary embodiments of the present disclosure.

For example, referring to (a) of FIG. 13, a first object 415 having a first form may be displayed in a first area 410 of the display unit 120. A second object 462 having a second form different from the first form may be displayed in a second area 460 of the display unit 120. In this case, the control unit 100 may determine whether to change the relative positions of the first object 411 located in the first area 410 and the second object 412 located in the second area 460.

For another example, a first object 461 having a second form may be displayed in the second area 460 of the display unit 120. Additionally, a second object 462 having a second form may be displayed in the second area 460 of the display unit 120. In this case, the control unit 100 may determine whether to change the relative positions of the first object 461 and the second object 412 based on the received play-related data and play-related data related to the play session of the dart game device 1000. However, the present disclosure is not limited thereto.

For another example, both the first object and the second object may be objects located within the first area 410 of the display unit 120. Further, the control unit 100 may determine whether to change the relative positions of the first object and the other second object based on the received play-related data and play-related data related to the play session of the dart game device 1000.

Referring again to FIG. 6, according to some exemplary embodiments of the present disclosure, the control unit 100 of the dart game device 1000 may change the relative positions of the first object and the second object in determining whether to change the relative positions of the first object and the second object based on proximity. Here, the proximity may indicate how close the ranking of the other device is to the ranking of the dart game device 1000.

Specifically, the control unit 100 may determine first proximity between the play-related data related to the first object and the play-related data of the dart game device 1000, based on the received play-related data. Here, the first proximity may indicate how close the ranking of the player of the dart game device 1000 is to the ranking of the player related to the first object. Additionally, the control unit 100 may determine second proximity between the play-related data related to the second object and the play-related data of the dart game device 1000. Here, the second proximity may indicate how close the ranking of the player of the dart game device 1000 is to the ranking of the player related to the second object. When the first proximity and the second proximity are determined, the control unit 100 may determine whether there is a change in the superiority/inferiority relationship between the first proximity and the second proximity by comparing the first proximity and the second proximity. Additionally, when it is determined that there is a change in the superiority/inferiority relationship between the first proximity and the second proximity, the control unit 100 may change the relative positions of the first object and the second object.

For example, the ranking of the player of the dart game device 1000 may be 50 out of 50 players within the play session. Further, in operation S310, the ranking of the first player related to the first object determined based on the previous play-related data used to display the first object on the display unit may be the first ranking. Further, the ranking of the second player related to the second object determined based on the previous play-related data used to display the second object on the display unit may be the second ranking. In this case, the first proximity between the ranking of the player of the dart game device 1000 and the ranking of the first player may be relatively lower than the second proximity between the ranking of the player of the dart game device 1000 and the ranking of the second player. Thereafter, the superiority/inferiority relationship between the first proximity and the second proximity determined based on play-related data newly received by the control unit 100 of the dart game device 1000 via the network communication unit 150 may be changed. That is, the control unit 100 may determine that the first proximity is relatively higher than the second proximity as a result of determining the first proximity and the second proximity based on the newly received play-related data. In this case, the control unit 100 may change the relative positions of the first object and the second object. In this way, the dart game device 1000 may provide the player with a visual effect in which the rankings of the plurality of the other devices change in real time. Accordingly, the interest in the dart game of the players using the dart game device 1000 may be increased.

According to some exemplary embodiments of the present disclosure, the control unit 100 of the dart game device 1000 may perform a spinning operation to repeatedly exchange the relative positions of the first object and the second object by a preset number of times. Here, the spinning operation may be an operation in which the relative positions of the first object and the second object are exchanged, such as rotating. For example, under the control of the control unit 100, the first object may move to the position where the second object was displayed while moving in a clockwise direction. In conjunction with this, the second object may move to the position where the first object was displayed while moving in a clockwise direction. For another example, under the control of the control unit 100, the first object may move to the position where the second object was displayed while moving in a counterclockwise direction. In conjunction with this, the second object may move to the position where the first object was displayed while moving in a counterclockwise direction.

When it is determined that there is a change in the superiority/inferiority relationship between the first object and the second object, the control unit 100 of the dart game device 1000 may exchange the relative positions of the first object and the second object. Additionally, the control unit 100 may exchange the positions of the first object and the second object whose relative positions have been exchanged again. The number of times the positions of the first object and the second object are repeatedly exchanged may be an odd preset number of times. Accordingly, the control unit 100 may repeatedly exchange the relative positions of the first object and the second object the preset number of times, but ultimately display the relative positions of the first object and the second object in a changed state. However, the present disclosure is not limited thereto.

According to some exemplary embodiments of the present disclosure, the control unit 100 of the dart game device 1000 may determine whether to change the relative positions of the first object and the second object based on play-related data received in units of sub-play sessions included in the play session.

For example, the control unit 100 may determine whether to change the relative positions of the first object and the second object based on play-related data received in the unit of round of the play session.

As another example, the control unit 100 may determine whether to change the relative positions of the first object and the second object based on play-related data received in the unit of dart pin throwing action of the play session.

As another example, the control unit 100 may determine whether to change the relative positions of the first object and the second object based on play-related data received in the unit of set of the play session.

According to some exemplary embodiments of the present disclosure, the control unit 100 of the dart game device 1000 displays the first object in the first area of the display unit 120 and displays the first object and the second object in the second area different from the first area. The control unit 100 may determine that the first object displayed in the first area is displayed in a first form, and the first object displayed in the second area is displayed in a second form that is different from the first form. Here, the first form may include at least one of an image of the first player of the first device throwing a dart pin, a predetermined character image for identifying the first player, and predetermined text for identifying the second player. Further, the second form may include identification information of the first player. Additionally, when determining the position of the first object displayed in the second area, the control unit 100 may determine the position of the first object based on at least one of scores and ranking related to the first object and the second object. However, the present disclosure is not limited thereto.

When the first object is displayed in the second area, the control unit 100 of the dart game device 1000 may change the position of the first object displayed in the second area based on the play-related data received in the unit of round or set of the play session.

Specifically, the control unit 100 may change the position of the first object within the second area based on the change in the first proximity related to the first object. As the position of the first object changes, the control unit 100 may determine that the position of the second object displayed in the second area changes in conjunction with the changed position of the first object.

According to the above-described configuration, the control unit 100 of the dart game device 1000 may change the relative positions of the first object and the second object based on the play-related data. In this case, the dart game device 1000 may provide the player with a visual effect in which the ranking of the plurality of the other devices change in real time.

According to some exemplary embodiments of the present disclosure, the network communication unit 150 of the dart game device 1000 may receive second play-related data or receive a second play image from the other device 2000 based on the network rating. Hereinafter, a method of receiving, by the network communication unit 150, at least one play-related data based on the network rating according to the present disclosure will be described with reference to FIG. 7.

Figures 7, 8:
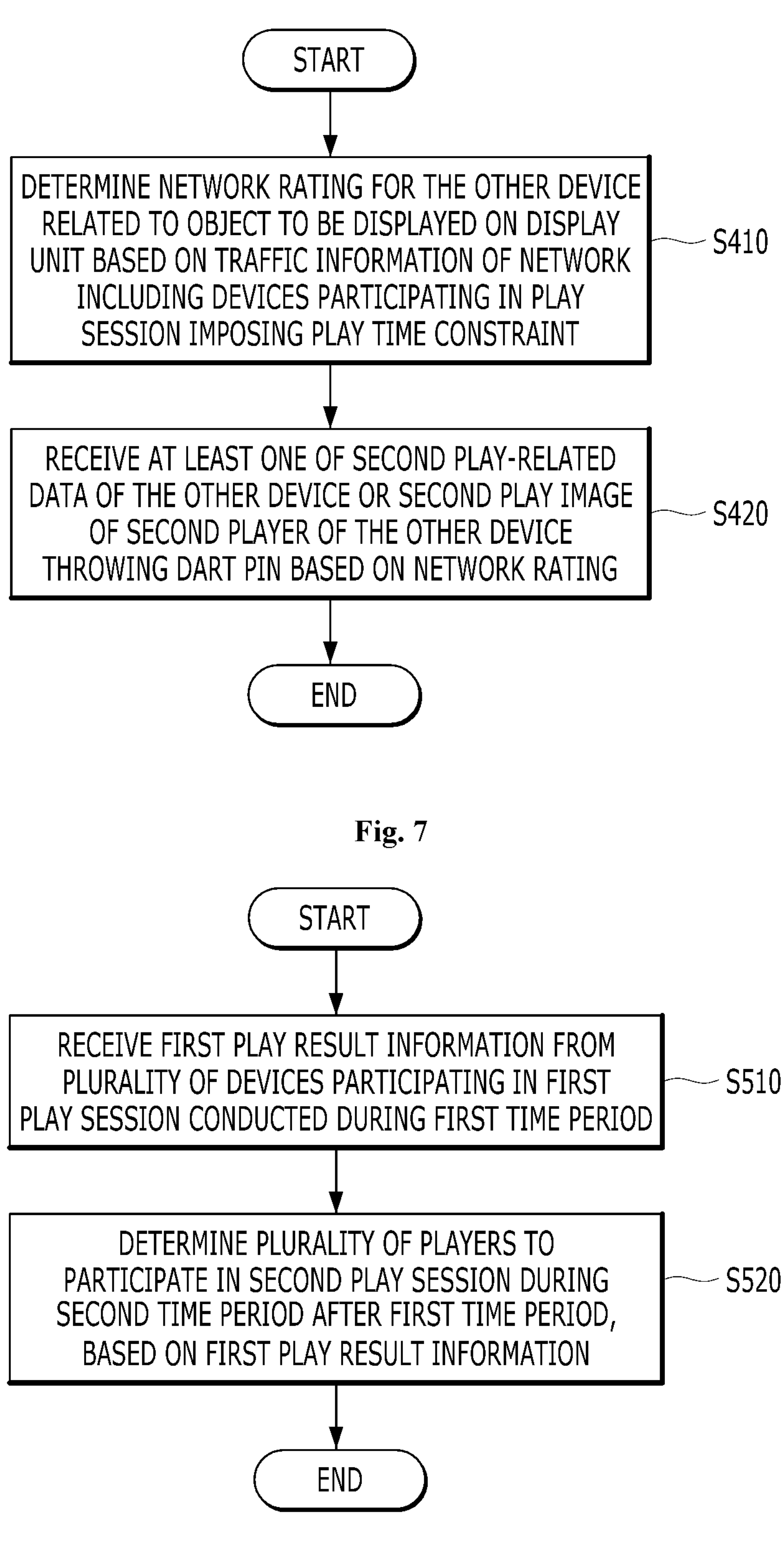
FIG. 7 is a diagram for illustrating an example of a method of receiving, by the dart game device, at least one of second play-related data from the other device and a second play image of a second player of the other device throwing a dart pin according to some exemplary embodiments of the present disclosure.
FIG. 8 is a flow diagram for illustrating an example of a method of determining, by a dart game server, a plurality of players to participate in a second play session to be held after a first time period according to the present disclosure.

FIG. 7 is a diagram for illustrating an example of a method of receiving, by the dart game device, at least one of second play-related data from the other device and a second play image of a second player of the other device throwing a dart pin according to some exemplary embodiments of the present disclosure.

Referring to FIG. 7, the control unit 100 of the dart game device 1000 may recognize traffic information of a network including devices participating in a play session that imposes play time constraints. The control unit 100 may determine a network rating for the other device 2000 related to an object to be displayed on the display unit 120 based on traffic information (S410). Here, the traffic information may be information about the transmission and reception speed of the network between the dart game device 1000 and the other device 2000 or the dart game device 1000 and the dart game server 3000. Additionally, this traffic information may be received from the dart game server 3000 via the network communication unit 150. Alternatively, traffic information may be determined based on latency calculated by transmitting and receiving packets with the other device 2000 by the network communication unit 150. However, the present disclosure is not limited thereto.

The network rating may be a rating that the control unit 100 determines according to preset conditions so that the network communication unit 150 is capable of receiving different play-related data depending on the rating. The network rating may include any form of numerical value that can quantitatively express the communication capabilities of the dart game device, server, and/or network related therewith.

Specifically, based on traffic information, the control unit 100 may determine the network rating for the other device 2000 having traffic less than preset traffic as the first rating.

The control unit 100 may determine the network rating for the other device 2000 having traffic equal to or greater than the preset traffic as the second rating. That is, the control unit 100 may determine the network rating of the other device 2000 with good network transmission and reception speed as the first rating. Additionally, the control unit 100 may determine the network rating of the other device 2000 of which a network transmission and reception speed is relatively lower than that of the first rating as the second rating. However, the present disclosure is not limited thereto.

Based on the network rating, the network communication unit 150 of the dart game device 1000 may receive at least one of second play result data of the other device 2000 or a second play image of the second player of the other device 2000 throwing a dart pin (S420).

Specifically, the network communication unit 150 may receive second play-related data including a second play image and second play result data from the other device 2000 having the first rating. Additionally, the network communication unit 150 may receive second play-related data including second play result data from the other device 2000 having the second rating. In other words, the network communication unit 150 may transmit the second play-related data that does not include the second play image from the other device 2000 having the second rating.

Generally, the capacity of the play image photographed by the camera unit of the other device 2000 may be larger than that of the play result data, which includes information about scores earned by throwing dart pins of the other device 2000, information about scores earned in a round allowing N times of dart pin throwing, and the like. Accordingly, when the network communication unit 150 receives a play image from the other device 2000 having the second rating, it may take a long time. Accordingly, the network communication unit 150 may receive second play-related data including the second play image only from the other device 2000 having the first rating. Additionally, the network communication unit 150 may not receive the second play image from the other device 2000 having the second rating, but may receive the second play related data including only the second play result data. However, the present disclosure is not limited thereto.

According to some exemplary embodiments of the present disclosure, the network communication unit 150 of the dart game device 1000 may not receive the second play image from the other device 2000 having the second rating. In this case, the control unit 100 may determine a display image related to the second play-related data among at least one pre-stored image. Further, the display unit 120 may display the display image determined by the control unit 100. Here, the display image may include at least one of a pre-stored image of the second player throwing a dart pin, a pre-determined character image for identifying the second player, and a pre-determined text for identifying the second player. Then, the display unit 120 may display the determined display image. Accordingly, even when the network communication unit 150 does not receive the second play image from the other device 2000 having the second rating, the display unit 120 may display the display image related to the second play-related data. In this case, compared to displaying only the identification information of the other device 2000 based on the second play-related data, a visual effect that may increase the player's interest in the game may be provided.

According to some exemplary embodiments of the present disclosure, an object displayed on the display unit 120 of the dart game device 1000 may include a plurality of images. For example, the object may include at least one of an image of the second player on the other device 2000 throwing a dart pin within a time period included in a play session; a predetermined character image to identify a second player; predetermined text to identify the second player, and an image related to the dart target part of the second player. In this case, the network communication unit 150 may also receive only at least one image from the other device 2000 with the first rating.

Specifically, the control unit 100 may determine that an object including the image of the second player of the other device 2000 throwing a dart pin and the image related to the dart target part of the second player is to be displayed. However, the network communication unit 150 may only receive an image of the second player of the other device 2000 throwing a dart pin. In this case, the control unit 100 may determine a pre-stored image corresponding to the image related to the dart target part of the second player based on the second play-related data. Additionally, the control unit 100 may determine that an object including the image of the second player throwing a dart pin and the pre-stored image is to be displayed.

For example, the control unit 100 may recognize that the second player has scored 20 points based on the second play-related data that includes only the second play result data. The image related to the dart target part of the second player that the network communication unit 150 has not received may be an image of the second player's dart pin reaching the 20-point area. In this case, the control unit 100 may determine an image of the dart pin reaching the 20-point area among at least one image pre-stored in the storage unit 110. Additionally, the control unit 100 may determine that an object including the image of the second player throwing a dart pin and the image of the dart pin reaching the 20-point area is to be displayed. However, the present disclosure is not limited thereto.

According to some exemplary embodiments of the present disclosure, the network communication unit 150 of the dart game device 1000 may not receive the second play image from the other device 2000 having the second rating. In this case, the control unit 100 may compare the pre-stored previous play-related data of the other device 2000 with the second play-related data. Further, the control unit 100 may determine whether to re-determine the network rating based on the comparison result.

Specifically, when a difference between the previous play-related data and the second play-related data is greater than a preset threshold as a result of the comparison, the control unit 100 may determine to re-determine the network rating.

For example, the control unit 100 may compare the second play-related data received from the other device 2000 determined to be of the second rating with the previous play-related data. When the difference is greater than the preset threshold as the result of comparison, the control unit 100 may re-determine the network rating of the other device 2000 to the first rating. By way of illustration, the control unit 100 may compare the second play-related data with the previous play-related data of the other device 2000 pre-stored in the storage unit 110. The control unit 100 may generate a difference value indicating the difference between the previous play-related data and the second play-related data based on the comparison result. Additionally, when the difference value generated as the result of the comparison is greater than a preset threshold, the control unit 100 may determine to re-determine the network rating of the other device 2000 to the first rating. In this case, the network communication unit 150 may receive the second play image from the other device 2000. However, the present disclosure is not limited thereto.

According to some exemplary embodiments of the present disclosure, the control unit 100 of the dart game device 1000 may additionally determine the number of objects to be displayed on the display unit 120 based on at least one of traffic information and display unit information. Here, the display unit information may include at least one of information about the size of the display unit 120, information about the number of display units 120, and information about the display area of the display unit 120. However, the present disclosure is not limited thereto.

Specifically, the control unit 100 may recognize network transmission and reception speeds between the dart game device 1000 and the plurality of the other devices or the dart game server 3000 based on the traffic information. Additionally, the control unit 100 may determine the number of objects related to the other device 2000 to be displayed on the display unit 120 based on the recognized speed.

For example, the control unit 100 may determine that the higher the recognized network transmission/reception speed is, the more objects related to the other devices 2000 are to be displayed on the display unit 120. However, the present disclosure is not limited thereto.

Additionally, the control unit 100 may determine the number of objects related to the other devices 2000 to be displayed on the display unit 120 based on the display unit information.

For example, the control unit 100 may determine that the larger the size of the display unit 120 is, the more objects related to the other devices 2000 are to be displayed based on the display unit information. Alternatively, the control unit 100 may determine that the more the display units 120 are, the more objects related to the other devices 2000 are to be displayed based on the display unit information. However, the present disclosure is not limited thereto.

Additionally, the control unit 100 may determine the number of objects to be displayed on the display unit 120 based on both traffic information and display unit information.

According to the above description, the control unit 100 of the dart game device 1000 may determine a network rating for the other device 2000 related to an object to be displayed on the display unit 120 based on network traffic information. In this case, the network communication unit 150 may receive appropriate play-related data from the other device 2000 based on the network rating determined by the control unit 100. When the network communication unit 150 receives a play image not based on the network rating as in the present disclosure, the time required to receive a play image may take longer than expected. In this case, real-time reception of the object related to the other devices 2000 to be displayed on the display unit 120 may be degraded. On the other hand, according to the present disclosure, the network communication unit 150 may receive appropriate play-related data from the other device 2000 based on the rating of the network determined by the control unit 100. Therefore, in the present disclosure, cases such as the above-mentioned situation may be prevented and real-time display of objects related to the other devices 2000 may be guaranteed.

According to some exemplary embodiments of the present disclosure, the network communication unit 150 of the dart game device 1000 may determine play-related data related to the dart game device 1000 to be transmitted to the other device 2000 or the dart game server 3000 based on the network rating.

Specifically, based on the network rating, the network communication unit 150 may transmit at least one of the first play result data of the dart game device 1000 or the first play image of the first player of the dart game device 1000 throwing a dart pin.

For example, the network communication unit 150 may transmit first play-related data including the first play image and the first play result data to the other device 2000 having the first rating. Additionally, the network communication unit 150 may transmit first play-related data including the first play result data to the other device 2000 having the second rating. In other words, the network communication unit 150 may transmit first play-related data that does not include the first play image to the other device 2000 having the second rating.

According to some exemplary embodiments of the present disclosure, the control unit 100 of the dart game device 1000 may determine whether to re-determine the network rating for the other device 2000.

Specifically, when the first play image of the first player is photographed by the camera unit 140, the control unit 100 may recognize the first play image and the previous play image of the first player pre-stored in the storage unit 110. In this case, the control unit 100 may determine whether to re-determine the network rating based on comparison between the previous play image and the first play image.

For example, when a difference between the previous play-related image and the first play image is greater than a preset threshold as a result of the comparison, the control unit 100 may determine to re-determine the network rating for the other device 2000. For example, when the first play image is photographed by the camera unit 140, the control unit 100 may compare the first play image with the previous play image of the first player pre-stored in the storage unit 110 and generate a difference value that represents the difference between two images. When the difference value generated as a result of the comparison is greater than a preset threshold, the control unit 100 may determine to re-determine the network rating for the other device 2000. Further, the network communication unit 150 may transmit the first play image to the other device 2000 based on the re-determined network rating. In this case, the first play image photographed when the first player obtains a significantly higher score than the previous play or when a specific event occurs may be displayed on the display unit 120 of the other device 2000.

According to some exemplary embodiments of the present disclosure, the control unit 100 of the dart game device 1000 may also determine whether to re-determine the network rating for the other device 2000 based on the play-related data of the first player.

Specifically, the control unit 100 may determine whether to re-determine the network rating based on a comparison between the first play-related data and the previous play-related data of the first player pre-stored in the storage unit 110.

For example, the control unit 100 may determine to re-determine the network rating when a difference between the previous play-related data and the first play-related data is greater than a preset threshold as a result of the comparison. For example, the control unit 100 may compare the first play-related data with the previous play-related data of the first player stored in the storage unit 110. The control unit 100 may generate a difference value indicating the difference between the previous play-related data and the first play-related data based on the comparison result. Additionally, when the difference value generated as the result of comparison is greater than the preset threshold, the control unit 100 may determine to re-determine the network rating for the other device 2000. Further, the network communication unit 150 may transmit the first play image to the other device 2000 based on the re-determined network rating. In this case, the first play image photographed when the first player obtains a significantly higher score than the previous play or when a specific event occurs may be displayed on the display unit 120 of the other device 2000.

As described above, the network communication unit 150 of the dart game device 1000 may transmit appropriate play-related data to the other device 2000 or the dart game server 3000 based on the rating of the network determined by the control unit 100. When the network communication unit 150 transmits a play image not based on the network rating as in the present disclosure, the time required to transmit the play image may take longer than expected. In this case, real-time reception of the object related to the dart game device 1000 to be displayed on the display unit of the other device 2000 may be degraded. On the other hand, according to the present disclosure, the network communication unit 150 may transmit appropriate play-related data to the other device 2000 based on the rating of the network determined by the control unit 100. Accordingly, in the present disclosure, situations such as the foregoing situation may be prevented. In addition, when data to be transmitted by the network communication unit 150 to the other device 2000 is delayed, the reception speed of data to be received by the network communication unit 150 may also be affected. Accordingly, the network communication unit 150 may appropriately transmit and receive play-related data based on the network rating determined by the control unit 100.

According to some exemplary embodiments of the present disclosure, the dart game server 3000 may determine a plurality of players to participate in a play session to be held after a first time period based on the play result information of the plurality of devices progressed during the first time period. Hereinafter, with reference to FIG. 8, a method of determining, by the dart game server 3000, a plurality of players to participate in a play session to be held after a first time period according to the present disclosure will be described.

FIG. 8 is a flow diagram for illustrating an example of a method of determining, by the dart game server, a plurality of players to participate in a second play session to be held after a first time period according to the present disclosure.

Referring to FIG. 8, the dart game server 3000 may receive first play result information from a plurality of devices participating in a first play session conducted during a first time period (S510). Here, the first play result information may be information about the result generated as the first play session ends. The first play result information may include identification information for each of the plurality of devices participating in the first play session, information about the scores for each player determined according to the end of the first play session, or information about the ranking for each player determined according to the end of the first play session.

According to some exemplary embodiments of the present disclosure, the first play result information may include result data of the play played by the players of the plurality of devices during a first time period that at least partially overlaps according to time constraints imposed by the first play session.

Specifically, the first player who participated in the first play session, which had a time constraint of 10 minutes starting at 10:00 a.m. on Oct. 1, 2021, would have participated in the dart game for 10 minutes starting at 10:00 a.m. on Oct. 1, 2021. Then, the second player may have participated in the dart game for 8 minutes starting at 10:00 a.m. on Oct. 1, 2021. In this case, the first play result information may include result data of the play played by the first player and result data of the play played by the second player that overlap for at least 8 minutes.

For another example, the first player who participated in the first play session, which had a time constraint of 10 minutes starting at 10:00 a.m. on Oct. 1, 2021, would have participated in the dart game for 10 minutes starting at 10:00 a.m. on Oct. 1, 2021. Then, the second player may have participated in the dart game for 8 minutes starting at 10:00 a.m. on Oct. 1, 2021. Since the time constraint of the play session is from 10:00 a.m. to 10:10 a.m. on Oct. 1, 2021, both the 10 minutes of play of the first player and the 8 minutes of play of the second player will be recognized as play result data.

The dart game server 3000 may determine a plurality of players to participate in the second play session during a second time period after the first time period, based on the first play result information (S520). Here, the second time period of the second play session may have the same duration as the first time period, but may be a time period that proceeds from a second time after the first time. For example, the first play session and the second play session may be given the same time constraint of 10 minutes for the dart game to be played. If the first play session begins at 10:00 a.m. on Oct. 1, 2021, the second play session may begin after 10:10 a.m. on Oct. 1, 2021, such as at 10:10 a.m. on Oct. 1, 2021, or 10:15 a.m. on Oct. 1, 2021. However, it is not limited to this, and the second play session and the first play session may have different periods of time. For example, the first play session may last 10 minutes and the second play session may last 15 minutes.

According to some exemplary embodiments of the present disclosure, the dart game server 3000 may determine a plurality of players corresponding to a preset ranking as players to participate in the second play session, based on the ranking included in the first play result information.

For example, the dart game server 3000 may determine players ranked $1^{st}$ and $2^{nd}$ in the first play session as players to participate in the second play session, based on the first play result information. That is, the dart game server 3000 may determine a plurality of players with preset rankings in the first play session as players to participate in the second play session.

For another example, the dart game server 3000 may determine, based on the first play result information, the odd ranked players, such as first, third, and fifth, in the first play session, as players to participate in the second play session. However, the present disclosure is not limited thereto.

According to some other exemplary embodiments of the present disclosure, the dart game server 3000 may determine players whose rankings included in the first play result information is equal to or higher than a preset ranking as players to participate in the second play session.

For example, based on the first play result information, the dart game server 3000 may determine two players who ranked $2^{nd}$ or higher in the first play session as players to participate in the second play session. However, the present disclosure is not limited thereto.

According to some other exemplary embodiments of the present disclosure, the dart game server 3000 may receive first play result information for each of sub-sessions within the first play session that progressed during the first time period. Additionally, the dart game server 3000 may determine a plurality of players with the same ranking in each of the sub-sessions as players to participate together in the second play session. Here, the sub-session may be a play session held during the same time period as the first play session.

For example, based on the first play result information, the dart game server 3000 determine the player ranked $1^{st}$ in the first-1 play session and the player ranked $1^{st}$ in the first-2 play session in the first play session as players to participate together in the second play session. That is, the dart game server 3000 may determine a plurality of players with the same ranking in the first play session as players to participate in the second play session. However, the present disclosure is not limited thereto.

According to some other exemplary embodiments of the present disclosure, the dart game server 3000 may receive first play result information for each of the sub-sessions within the first play session that held during the first time period. Additionally, the dart game server 3000 may determine players whose rankings included in the first play result information are equal to or higher than a preset ranking as players to participate in the second play session.

For example, based on the first play result information, the dart game server 3000 may determine two players who ranked $2^{nd}$ or higher in the first-1 play session among the first play session as players to participate in the second play session. Additionally, the dart game server 3000 may determine two players ranked $2^{nd}$ or higher in the first-2 play session as players to participate in the second play session. In other words, the dart game server 3000 may determine players ranked $2^{nd}$ or higher in each sub-session within the first play session as players to participate in the second play session. However, the present disclosure is not limited thereto.

According to some other exemplary embodiments of the present disclosure, the dart game server 3000 may receive first play result information for each of the sub-sessions within the first play session that held during the first time period. Additionally, the dart game server 3000 may determine a plurality of players with different rankings in each of the sub-sessions as players to participate together in the second play session.

For example, based on the first play result information, the dart game server 3000 may determine the player ranked $1^{st}$ in the first-1 play session and the player ranked $2^{nd}$ in the first-2 play session in the first play session as the player to participate in the second play session. That is, the dart game server 3000 may determine a plurality of players with different rankings in the first play session as players to participate in the second play session. However, the present disclosure is not limited thereto.

According to some exemplary embodiments of the present disclosure, when the plurality of players are determined, the dart game server 3000 may transmit a first signal related to the second play session to the device related to each of the determined plurality of players. Here, the first signal may be a signal for checking whether to participate in the second play session. Additionally, when the dart game server 3000 transmits the first signal, the dart game server 3000 may also transmit the information related to the second play session. Specifically, the dart game server 3000 may also transmit information related to the time, date and time of the second play session, or the number of participants, and the like. After transmitting the first signal, the dart game server 3000 may receive at least one second signal corresponding to the first signal. In this case, the dart game server 3000 may determine the player to participate in the second play session based on at least one second signal.

For example, the first signal may be a signal for passively checking whether to participate in the second play session.

As a specific example, the first signal may be a signal containing text such as "Would you like to join the second play session?" In this case, the text may be displayed on the display unit of the plurality of devices that have received the first signal. Additionally, the dart game server 3000 may determine the player to participate in the second play session based on the second signal, which is a response signal to the first signal received from each of the plurality of devices.

As another example, the first signal may be a signal for actively checking whether to participate in the second play session.

As a specific example, the first signal may be a signal that includes text such as "The second play session will begin in a moment. If you do not wish to participate, please respond." In this case, the text may be displayed on the display unit of the plurality of devices that have received the first signal. Additionally, the dart game server 3000 may determine players related to each of the plurality of devices that have not received the second signal, which is a response signal to the first signal, as players to participate in the second play session. However, the present disclosure is not limited thereto.

According to some exemplary embodiments of the present disclosure, when the dart game server 3000 recognizes that the number of players participating in the second play session does not meet the preset number, the dart game server 300 may add a dummy player. Hereinafter, an example of a method of generating, by the dart game server 3000, a dummy player according to the present disclosure will be described with reference to FIG. 10.

According to some exemplary embodiments of the present disclosure, the dart game server 3000 may also determine a plurality of players to participate in a next play session from the plurality of devices that participated in a play session with a different time period.

Specifically, the dart game server 3000 may receive play result information from a plurality of devices that participated in a third play session progressed during a third time period and a fourth play session progressed during a fourth time period that is different from the third time period. Based on the play result information, the dart game server 3000 may determine a plurality of players to participate in a fifth play session during a fifth time period, which is after the third time period and the fourth time period. For example, in an international tournament, it may be difficult for all players to participate in the third play session progressed for the third time period in a sub-stage, such as a preliminary round. Therefore, the dart game server 3000 may receive play result information from a plurality of devices participating in each of the plurality of play sessions having different time periods in a sub-stage, such as a preliminary round. For example, the dart game server 3000 may receive play result information from a plurality of devices that participated in the third play session progressed for the third time period from 10:00 a.m. on Oct. 1, 2021 to 10:10 a.m. on Oct. 1, 2021, based on the Korean standard time. Further, the dart game server 3000 may receive play result information from a plurality of devices that participated in the fourth play session progressed for the fourth time period from 10:00 a.m. on Oct. 1, 2021, to 10:10 a.m. on Oct. 1, 2021, based on the standard time of the Central United States. This means that the fourth play session could have taken place during the time period from 8:00 PM on Sep. 30, 2021 to 8:10 PM on Sep. 30, 2021 based on the Korean standard time. In this case, the dart game server 3000 may receive play result information from the plurality of devices participating in the third play session and the fourth play session. Then, the dart game server 3000 may also determine a plurality of players to participate in a fifth play session that imposes the same time constraint, based on the play result information in the stage, such as the main competition. For example, the dart game server 3000 may determine a plurality of players to participate in the fifth play session to be held from 10:00 a.m. on Oct. 2, 2021 to 10:10 a.m. on Oct. 2, 2021 based on the Korean standard time. However, the present disclosure is not limited thereto.

According to the configurations described above, the dart game server 3000 may determine a plurality of players to participate in the second play session to be held after the first time period. In this case, the dart game server 3000 may induce the players to continuously play the game.

According to some other exemplary embodiments of the present disclosure, the dart game server 3000 may determine, by group, a plurality of players to participate in the second play session based on the ranking included in the first play result information. Hereinafter, another method of determining, by the dart game server 300, a plurality of players to participate in the second play session according to the present disclosure will be described with reference to FIG. 9.

Figure 9:
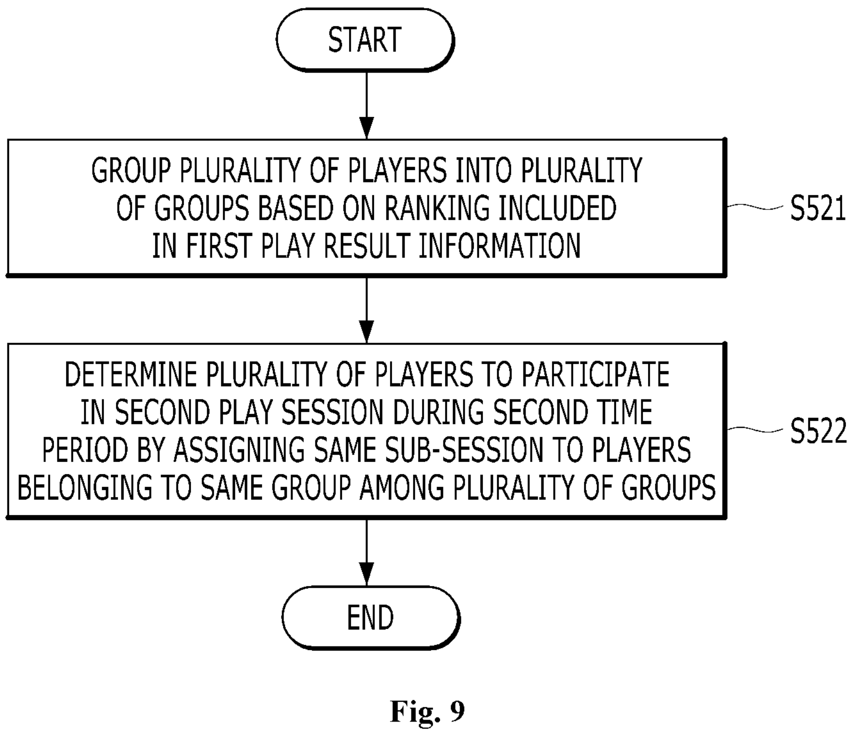
FIG. 9 is a flow diagram for illustrating an example of another method of determining, by a dart game server, a plurality of players to participate in a second play session to be held after a first time period according to the present disclosure.

FIG. 9 is a flow diagram for illustrating an example of another method of determining, by a dart game server, a plurality of players to participate in a second play session to be held after a first time period according to the present disclosure.

Referring to FIG. 9, the dart game server 3000 may group the plurality of players into a plurality of groups based on the ranking included in the first play result information (S521).

Specifically, the dart game server 3000 may group the plurality of players into the plurality of groups based on at least one of a first criterion and a fourth criterion.

The first criterion may be a criterion for grouping the plurality of players based on the proximity of the ranking value included in the first play result information.

For example, the dart game server 3000 may determine a first ranking and an eighth ranking in the first play session based on the first play result information. Here, the eighth ranking may be the lowest ranking, and the ranking having the lowest proximity to the first ranking in the first player session. In this case, the dart game server 3000 may group the second ranking to the fourth ranking, which have relatively higher proximity to the first ranking than the fifth ranking to the eighth ranking, into one group together with the first ranking. Further, the dart game server 3000 may group the fifth ranking to the seventh ranking, which have relatively higher proximity to the eighth ranking than the first ranking to the fourth ranking, into one group together with the eighth ranking. However, the present disclosure is not limited thereto.

Further, the second criterion may be a criterion for grouping players with the same ranking value included in the first play result information into the same group.

For example, the dart game server 3000 may group the player who has the first ranking in the first-1 play session and the player who has the first ranking in the second-2 play session in the first play session into the same group.

Further, the third criterion may be a criterion for grouping players with different ranking values included in the first play result information into the same group.

For example, the dart game server 3000 may group the player having the first ranking in the first-1 play session and the player having the second ranking in the first-2 play session in the first play session into the same group.

Further, the fourth criterion may be a criterion for grouping the plurality of players based on proximity of a score value included in the first play result information.

For example, the dart game server 3000 may determine, based on the first play result information, a player who earned the highest score and a player who earned the lowest score in the first play session. In this case, the dart game server 3000 may group the player who obtained the highest score and the player with high proximity into one group, and group the player who obtained the lowest score and the player with high proximity into one group. However, the present disclosure is not limited thereto.

The dart game server 3000 may determine the plurality of players to participate in the second play session during the second time period by assigning the same sub-session to the players belonging to the same group among the plurality of groups (S522).

Specifically, the dart game server 3000 may group the plurality of players into a first group and a second group based on at least one of the first to fourth criteria.

For example, the dart game server 3000 may group, based on the second criterion, a player having the first ranking in the first-1 play session and a player having the first ranking in the first-2 play session into a first group. Further, the dart game server 3000 may group the player having the second ranking in the first-1 play session and the player having the second ranking in the first-2 play session into a second group. The dart game server 3000 may assign a second-1 play session in the second play session to the players belonging to the first group, and assign the second-2 play session in the second play session to the players belonging to the second group. In this manner, the dart game server may determine a plurality of players to participate in the second play session during the second time period. Here, the second-1 play session and the second-2 play session may be sub-sessions of the second play session having the same time constraint as the second play session. However, the present disclosure is not limited thereto.

According to some other exemplary embodiments of the present disclosure, the dart game server 3000 may determine a plurality of players to participate in the second play session. Further, after the plurality of players is determined, the dart game server 3000 may group the determined plurality of players.

Specifically, the dart game server 3000 may group the determined plurality of players into a plurality of groups including a first group and a second group. For example, when the number of the determined plurality of players is eight, the dart game server 3000 may randomly select four of the eight players and group the extracted four players into a first group, and group the remaining four players into a second group. However, the present disclosure is not limited thereto, and the plurality of groups may also be determined based on the first play result information.

Further, the dart game server 3000 may match the second-1 play session in the second play session to the first group when the determined plurality of players is grouped into a plurality of groups. Further, the dart game server 3000 may match the second-2 play session in the second play session into the second group.

Further, the dart game server 3000 may determine to initiate a first dart game in which the players included in the first group participate in the second-1 play session. In conjunction with determining to initiate the first dart game, the dart game server 3000 may determine to initiate a second dart game in which the players included in the second group participate in a second-2 play session. However, the present disclosure is not limited thereto.

According to the configuration described above, the dart game server 3000 may group the plurality of players into a plurality of groups. Further, the dart game server 3000 may assign the same sub-session to each of the plurality of groups. In this case, the plurality of players may be matched for the next match with players of similar skill. Furthermore, since players to participate together in a next play session may be automatically determined according to the play result in each play session, players may continuously play the dart game with similarly skilled players without the hassle of selecting an opposing player.

According to some exemplary embodiments of the present disclosure, the dart game server 3000 may also generate a dummy player when the number of players to participate in a play session is insufficient. Here, the dummy player may be a virtual player rather than a real player. The dart game server 3000 may then make the generated dummy player participate in at least one play session in which the number of players is insufficient. Hereinafter, a method of generating, by the dart game server 3000, a dummy player will be described with reference to FIG. 10.

Figure 10:
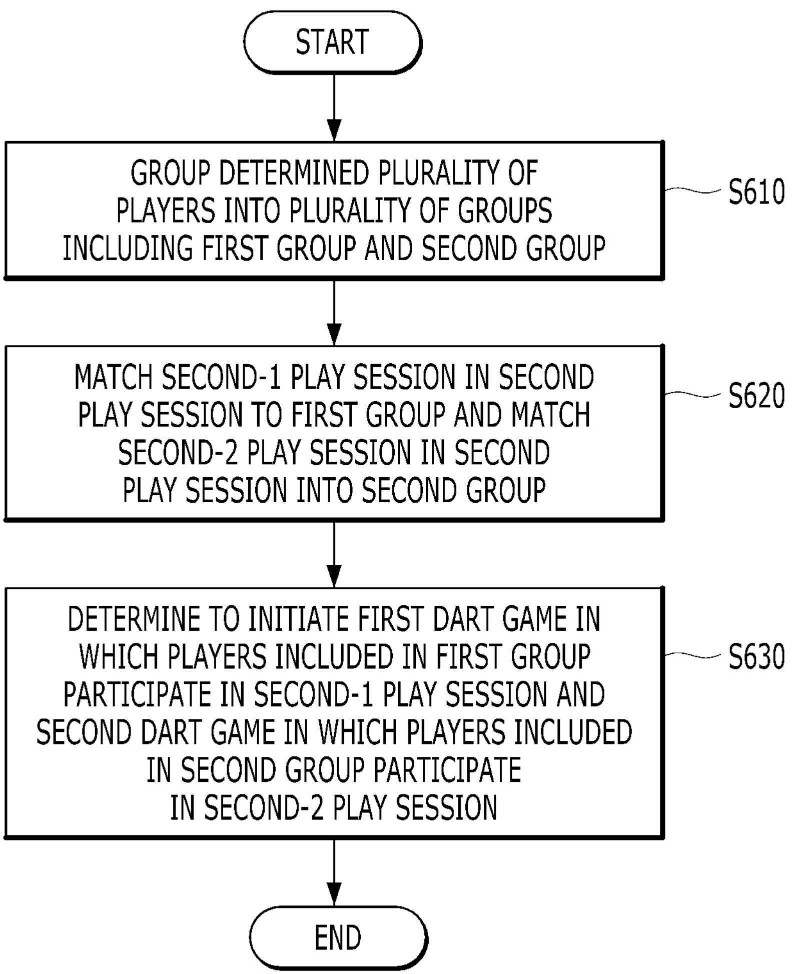
FIG. 10 is a flow diagram for illustrating an example of a method of generating, by the dart game server, a dummy player according to some exemplary embodiments of the present disclosure.

FIG. 10 is a flow diagram for illustrating an example of a method of generating, by the dart game server, a dummy player according to some exemplary embodiments of the present disclosure.

Referring to FIG. 10, the dart game server 3000 may determine a reserve player who will conduct the second play session during the second time period based on the first play result information (S610). Here, the spare player may be a player that the dart game server 3000 has determined as a reserve or temporary player before confirming the players who will proceed with the second play session.

For example, the dart game server 3000 may determine three players who ranked $1^{st}$ in the first-1 to first-3 play sessions of the first play session as reserve players to proceed with the second play session.

The dart game server 3000 may determine whether to generate a dummy player based on the number of reserve players (S620).

Specifically, when the dart game server 3000 may determine that the number of reserve players does not meet the number of players set for the second play session, the dart game server may determine to generate a dummy player. Here, the dummy player may be a virtual player rather than a real player.

For example, the second play session may be a dart game where two people must form a team. Accordingly, an even number of players, such as 4 or 6, may be required to proceed with the second play session. In this case, the dart game server 3000 may determine that the number of players set for the second play session is not met when the number of reserve players is odd. In this case, the control unit 100 may determine to generate a dummy player.

If the dart game server 3000 determines to generate a dummy player, the dart game server 3000 may add the dummy player to the players to participate in the second play session (S630). Additionally, the dart game server 3000 may determine that the number of players to proceed with the second play session has been met as the dummy player is added.

According to some exemplary embodiments of the present disclosure, the dart game server 3000 may generate a dummy player based on first play result information.

Specifically, the dart game server 3000 may generate a dummy player to imitate the play record of one player among the plurality of players who participated in the first play session, based on the first play result information. When a dummy player is generated to simply obtain repeated scores, the interest in the dart game of the players participating in the second play session may decrease. Accordingly, the dart game server 3000 may generate a dummy player to imitate the play record of one of the plurality of players participating in the first play session so that players' interest in the dart game may be stimulated.

According to some exemplary embodiments of the present disclosure, the dart game play performance ability of the dummy player may be determined in conjunction with the first play result information of the player included in the second play session in which the dummy player will participate.

Specifically, based on the first play result information, the dart game server 3000 may determine the players who ranked $1^{st}$ and $2^{nd}$ in the first play session as players who will participate in the second play session. If the dummy player's ability to play the dart game is significantly lower than the dart game play performance abilities of players participating in the second play session, the players participating in the second play session may lose interest in the dart game. Accordingly, the dart game server 3000 may determine the dart game play performance ability of the dummy player in conjunction with the first play result information of the players included in the second play session. However, the present disclosure is not limited thereto.

According to some exemplary embodiments of the present disclosure, when the dummy player is generated, the dart game server 3000 may allocate a pre-stored dart pin throwing image of the player to the dummy player. In this case, an image related to the dummy player may be output on a plurality of devices participating in the second play session.

According to the above-described configuration, the dart game server 3000 may prevent a situation in which players cannot proceed with the second play session due to a lack of players to participate in the second play session.

According to some exemplary embodiments of the present disclosure, a dummy player may be added to the first play session.

For example, in order to participate in the dart game, a player of the dart game device 1000 may generate a play session through the dart game device 1000 and then wait for other players to participate. At this time, the dart game server 3000 may recognize that no other players have participated even though the player has been waiting for a certain amount of time. In this case, the dart game server 3000 may generate a dummy player and allow the dummy player to participate in the play session generated by the player of the dart game device 1000. Accordingly, the dart game server 3000 may prevent players from spending a long time waiting for other players to participate.

According to some exemplary embodiments of the present disclosure, the dart game server 3000 may remove dummy players who participated in the first play session when the number of players to participate in the second play session is not insufficient.

Specifically, when determining a plurality of players to participate in the second play session, the dart game server 3000 may determine whether a dummy player exists among the plurality of players participating in the first play session. When it is determined that a dummy player exists, the dart game server 3000 may recognize the rankings of the remaining players included in the first play result information excluding the dummy player. Additionally, the dart game server 3000 may determine a plurality of players with preset rankings as players to participate in the second play session.

For example, the player who ranked $1^{st}$ in the first-1 play session in the first play session may be a dummy player. In this case, the dart game server 3000 may determine the player who ranked $1^{st}$ among players excluding the dummy player as the player to participate in the second play session. In general, players may prefer playing against a human directly rather than a dummy player. Accordingly, when the dart game server 3000 recognizes that the second play session can proceed without the dummy player, the dart game server 3000 may determine players other than the dummy player as players who will participate in the second play session.

According to the above-described configuration, the dart game server 3000 may prevent a situation in which players cannot proceed with the dart game due to a lack of players participating in the play session.

According to some exemplary embodiments of the present disclosure, information related to a play session may be displayed on the display unit 120 of the dart game device 1000 and the display unit of the other device 2000. Hereinafter, information related to a play session displayed on the display unit 120 according to the present disclosure will be described with reference to FIG. 11.

Figure 11:
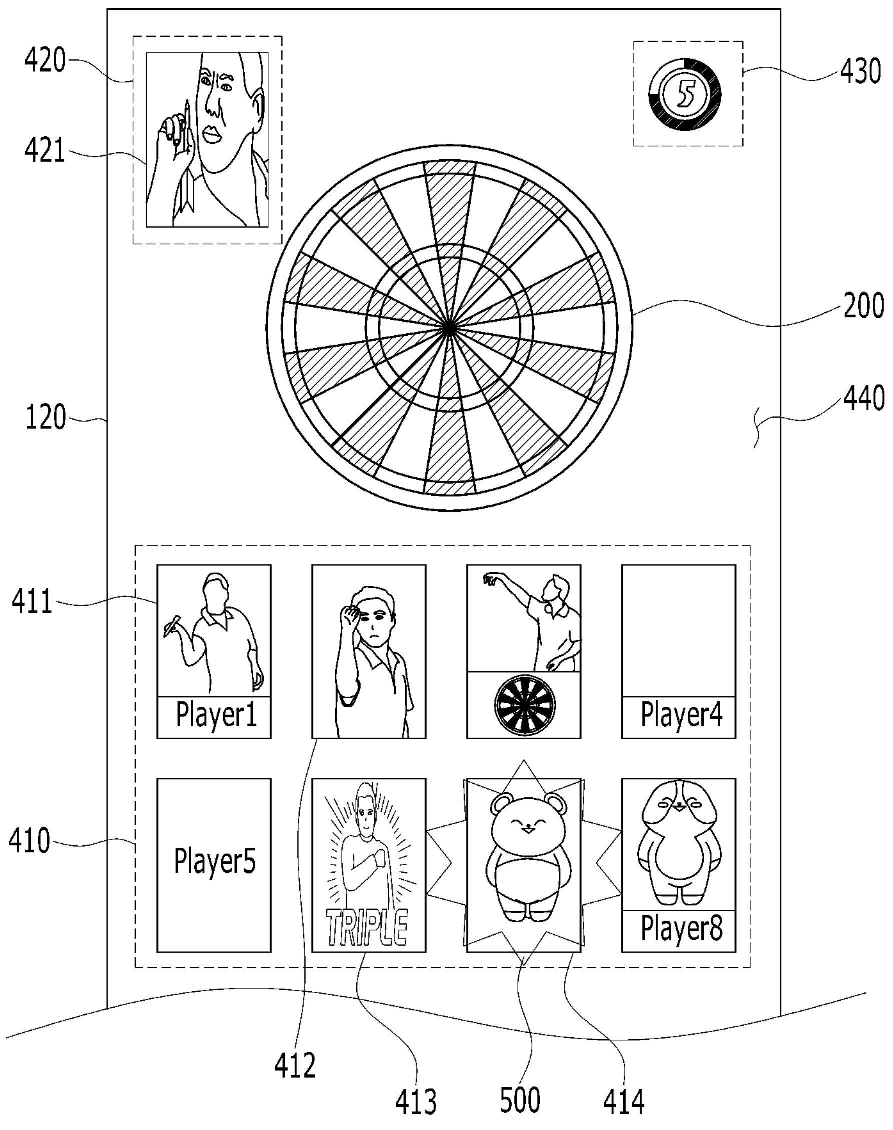
FIG. 11 is a diagram for illustrating an example of information related to a play session displayed on a display unit of the dart game device according to some exemplary embodiments of the present disclosure.

FIG. 11 is a diagram for illustrating an example of information related to a play session displayed on the display unit of the dart game device according to some exemplary embodiments of the present disclosure.

In FIG. 11, only the information displayed on the first display area 121 of the display unit 120 will be described. Additionally, first to fifth objects described in FIG. 11 are divided for convenience of explanation, and may be objects related to players that are different from the first and second objects described in FIG. 6.

Referring to FIG. 11, the display unit 120 may include a first area 410, a third area 420, a fourth area 430, and a background area 440. However, the present disclosure is not limited thereto.

Objects related to the other device 2000 may be displayed in the first area 410. Here, the object related to the other device 2000 displayed in the first area 410 may include at least one of an image of the player of the other device 2000 throwing a dart pin within a time period included in the play session, a predetermined character image for identifying the player of the other device 2000, and predetermined text for identifying the player of the other device 2000.

For example, the first object 411 displayed in the first area 410 may include an image of the player of the other device 2000 throwing a dart pin. Here, the image of the player of the other device 2000 throwing a dart pin may be a real-time play image photographed by the camera unit of the other device 2000. Additionally, the first object 411 may also include predetermined text for identifying the player of the other device 2000.

For another example, the second object 412 displayed in the first area 410 may include only an image of a player of the other device 2000 throwing a dart pin.

The third object 413 displayed in the first area 410 may include a display image pre-stored in the storage unit 110 of the dart game device 1000.

Specifically, the network communication unit 150 may not receive a play image from the other device 2000 related to the third object 413, but may receive play-related data including only play result data. In this case, the control unit 100 may determine a display image related to the play-related data among at least one image pre-stored in the storage unit 110 based on the received play-related data. Additionally, the display unit 120 may display the third object 413 including the pre-stored display image related to the other device 2000 according to the determination of the control unit 100.

The fourth object 414 displayed in the first area 410 may include only a predetermined character image for identifying a player of the other device 2000.

Investigating more closely the fourth object 414, a highlight effect 500 may be displayed around the fourth object 414. Here, the highlight effect 500 may be an effect to increase the player's interest in the dart game of the dart game device 1000.

For example, the control unit 100 may determine that the player of the other device 2000 related to the fourth object 414 is a player pre-stored by the player of the dart game device 1000. In this case, the control unit 100 may control the display unit 120 to display the highlight effect around the fourth object 414. However, the present disclosure is not limited thereto.

The control unit 100 may provide other highlight effects to objects in addition to the highlight effect illustrated in FIG. 11. For example, the control unit 100 may provide a visual effect so that an object related to the other device 2000 that has determined that a specific event has been satisfied is expressed as shaking. Alternatively, the control unit 100 may provide a visual effect such that an object related to the other device 2000 that has determined that a specific event has been satisfied is enlarged and then reduced. The control unit 100 may determine that only one object related to the other device 2000 that has determined that a specific event has been satisfied is displayed in the first area 410 and that the remaining objects are not displayed in the first area 410. The control unit 100 may cause a preset image to be output for an object related to the other device 2000 that has determined that a specific event has been satisfied. The control unit 100 may output a preset image around an object related to the other device 2000 that has determined that a specific event has been satisfied.

The control unit 100 may determine whether the player of the other device 2000 has satisfied a specific event based on play-related data of the other device 2000. Herein, the specific event may include an event where a certain score is obtained within a preset time, an event that occurs when the time constraint for dart pin throwing is exceeded, an event that occurs when a player fails to throw dart pins N times within the time constraint for the round, and an event that occurs when the player is confirmed to be ranked $1^{st}$ within a play session.

For example, the control unit 100 may determine that the player of the other device 2000 has obtained a specific score within a preset time based on the play-related data related to the other device 2000. In this case, the control unit 100 may apply a highlight effect to an object related to the other device 2000.

The control unit 100 may apply a highlight effect to a plurality of objects based on play-related data of a plurality of the other devices.

For example, based on the play-related data, the control unit 100 may determine whether the ranking of the player related to the fourth object 414 is an opportunity to reverse the ranking of the player related to the third object 413. In this case, the control unit 100 may allow a single highlight effect to be applied to the third object 413 and the fourth object 414.

In addition, investigating the objects displayed in the first area 410, objects including an image of a player of the other device 2000 throwing a dart pin and an image related to the dart target part of the other device 2000 are displayed in the first area 410. Additionally, an object containing only predetermined text for identifying a player of the other device 2000 may be displayed in the first area 410. Additionally, objects including a predetermined character image for identifying a player of the other device 2000 and predetermined text for identifying a player of the other device 2000 may be displayed in the first area 410.

According to some exemplary embodiments of the present disclosure, the object displayed in the first area 410 may be an object including one of an image related to the dart target part of the other device 2000 and an image of a player of the other device 2000 throwing a dart pin. Here, the image related to the dart target part of the other device 2000 may be one of a pre-stored virtual image related to the dart target part corresponding to play-related data of the other device 2000, and an actual image of a dart pin thrown by the second player of the other device 2000 hitting the dart target part.

Specifically, the control unit 100 may determine a network rating for the other device 2000 related to the object based on traffic information of the network including the devices participating in the play session. Based on the network rating, the control unit 100 may determine whether to display the object including the pre-stored virtual image related to the dart target part corresponding to the play-related data of the other device 2000, or whether to display the object including the actual image of a dart pin thrown by the second player of the other device 2000 hitting the dart target part.

For example, as the control unit 100 determines the network rating for the other device 2000 to be the second rating, the network communication unit 150 may receive play-related data including play result data from the other device 2000. In this case, the control unit 100 may determine that the image related to the dart target part pre-stored in the storage unit 110 is included in the object based on the received play-related data. For a specific example, the control unit 100 may recognize that a player of the other device 2000 has scored 20 points, based on the received play-related data. The control unit 100 may determine an image in which the dart pin reaches the 20-point area among at least one image pre-stored in the storage unit 110. The display unit 120 may display an object including an image of the dart pin reaching the 20-point area according to the determination of the control unit 100.

For another example, the control unit 100 may determine the network rating of the other device 2000 related to the object to be the first rating. As the control unit 100 determines the network rating for the other device 2000 to be the first rating, the network communication unit 150 may receive an image of a player of the other device 2000 throwing a dart pin. In this case, the display unit 120 may display an object including the image of the player of the other device 2000 throwing a dart pin.

The fifth object 421 displayed in the third area 420 may be an object related to the player of the dart game device 1000. However, the present disclosure is not limited thereto, and the object displayed in the third area 420 may be an object related to the other device 2000 depending on the exemplary embodiment.

Information related to the play time constraint of the play session may be displayed in the fourth area 430.

For example, information about a first play constraint time period including the time constraint for dart pin throwing may be displayed in the fourth area 430. Alternatively, information about a second play constraint time period including a time constraint for a round allowing N-times dart pin throwing may be displayed in the fourth area 430. Alternatively, information about a third play constraint time period including a time constraint for a set including K rounds may be displayed in the fourth area 430. Alternatively, information about a preset waiting time period between two sets may be displayed in the fourth area 430. However, the present disclosure is not limited thereto.

In the background area 440, information related to the play session, an image related to the play session, or an image predetermined by the player of the dart game device 1000 may be displayed. However, the present disclosure is not limited thereto.

According to some exemplary embodiments of the present disclosure, objects related to the other device 2000 may be displayed in the background area 440.

Specifically, the network communication unit 150 of the dart game device 1000 may receive play-related data from the other device 2000. In this case, the control unit 100 may obtain information about the position where the dart pin thrown by the player of the other device 2000 reaches the dart target part based on the play-related data of the other device 2000. The control unit 100 may display an object related to the other device 2000 in the background area 440 of the dart game device 1000 based on the position where the dart pin thrown by the player of the other device 2000 reaches the dart target part. Hereinafter, an example of an object related to the other device 2000 displayed in the background area 440 will be described with reference to FIG. 15.

According to the above-described configuration, the display unit 120 of the dart game device 1000 may display real-time information related to the play session in which the dart game device 1000 is participating. Accordingly, players of the dart game device 1000 may enjoy the dart game with interest while checking information related to various players participating in the dart game in real time.

According to some exemplary embodiments of the present disclosure, the control unit 100 may determine the size of each object displayed in the first area. Hereinafter, another example of an object displayed in the second area according to the present disclosure will be described with reference to FIG. 12.

Figure 12:
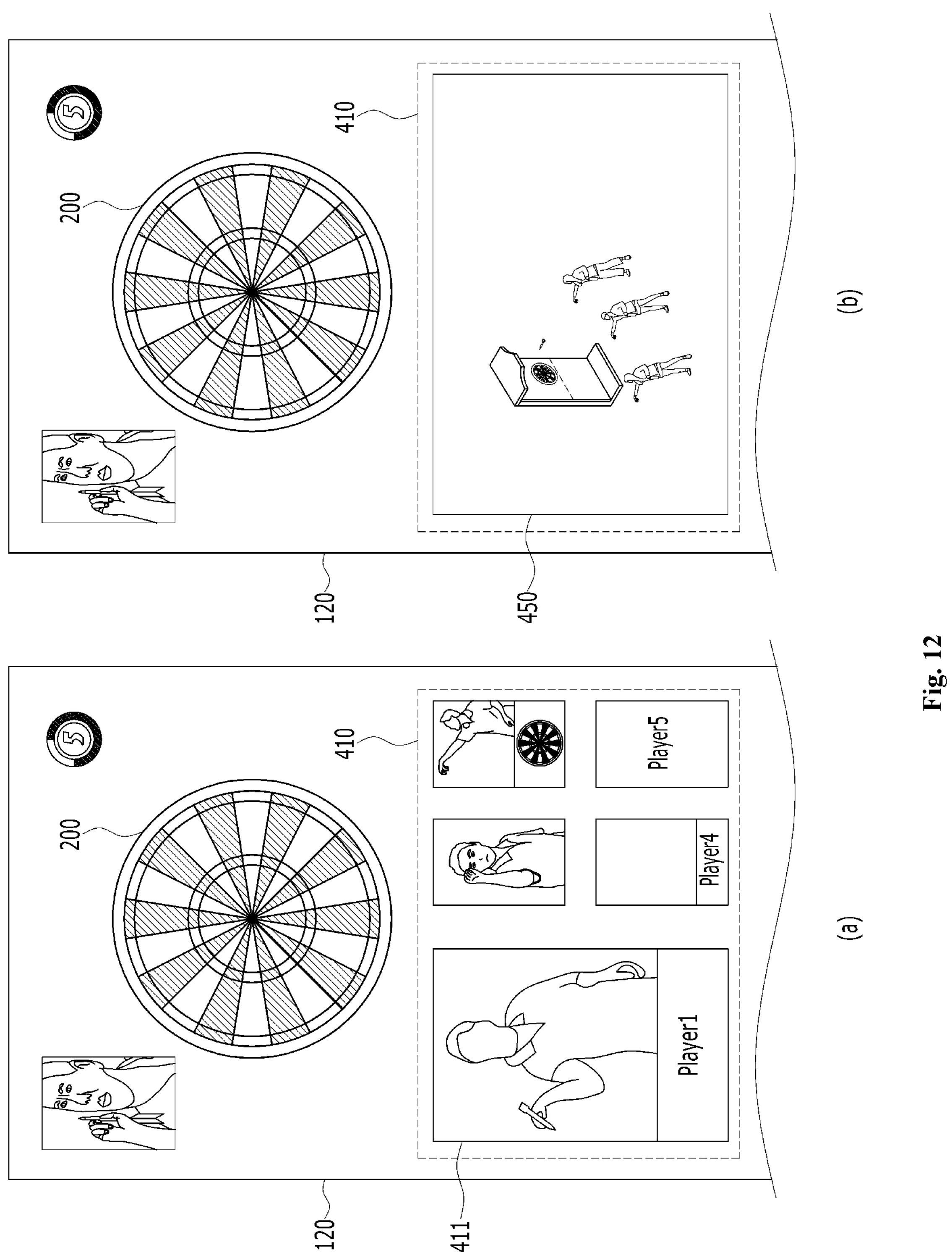
FIG. 12 is a diagram for illustrating another example of an object displayed in a first area according to some exemplary embodiments of the present disclosure.

FIG. 12 is a diagram for illustrating another example of an object displayed in the first area according to some exemplary embodiments of the present disclosure.

According to some exemplary embodiments of the present disclosure, the control unit 100 of the dart game device 1000 may determine a third attribute indicating a display size for a plurality of objects related to each of a plurality of the other devices. The control unit 100 may determine a third attribute such that at least one object among a plurality of objects related to a plurality of the other devices has a different size from the other objects. Additionally, as the control unit 100 determines the third attribute such that at least one object has a different size, the control unit 100 may determine a fourth attribute such that at least one other object is not displayed.

For example, referring to (a) of FIG. 12, the control unit 100 may determine the third attribute such that among the plurality of objects, the object 411 related to the player predetermined by the player of the dart game device 1000 has a larger size than the remaining objects. As the size of the object 411 related to the predetermined player increases, the area occupied in the first area 410 may expand. Accordingly, the control unit 100 may determine the fourth attribute of at least one other object so that at least one other object is not displayed in the first area 410.

When the control unit 100 determines that at least one object among the plurality of objects displayed in the first area 410 has a larger size than the remaining objects, the control unit 100 may determine that the remaining objects are to have sizes smaller than the sizes previously displayed.

For example, a plurality of objects displayed in the first area 410 may be displayed to have the same first size. The control unit 100 may determine that the object 411 related to the predetermined player exists in the first area 410. In this case, the control unit 100 may determine the third attribute so that the object 411 related to the predetermined player has a second size that is larger than the first size. The control unit 100 may determine the third attribute such that the remaining objects other than the predetermined player-related object 411 have a second size that is smaller than the first size.

As another example, the control unit 100 may set the third attribute so that the object 411 related to the player with the highest ranking among players participating in the same play session as the dart game device 1000 are to have a size larger than the remaining objects.

Referring to (b) of FIG. 12, the control unit 100 of the dart game device 1000 may determine to display a composite image 450 related to the play session in which the dart game device 1000 is participating. Herein, the composite image may be a composite image of the players related to the plurality of different devices.

For example, the composite image may be an image of the plurality of players related to the other device 2000 enjoying the dart game through one dart game device. In this case, since the image of one dart game device and the image of each of the plurality of players are synthesized and displayed, an image as if multiple players are playing together on one dart game device may be output. As another example, the composite image may be an image of the plurality of players related to the other device 2000 enjoying the dart game through a plurality of dart game devices. The dart game device 1000 and the other devices 2000 participating in the play session according to the exemplary embodiment of the present disclosure may be the same device. In this case, the coordinate values for the positions of the dart target part and the player photographed by the camera unit of each device may be constant within the image. Accordingly, the control unit 100 can quickly generate a composite image even when the control unit receives a play image from the plurality of the other devices.

Specifically, the network communication unit 150 may receive a plurality of play images photographed by the camera unit of each of the plurality of the other devices from each of the plurality of the other devices. When the plurality of play images is received, the control unit 100 may generate a composite image so that the plurality of received play images is displayed as one image. Additionally, the display unit 120 may display the generated composite image in the first area 410. In this case, the player of the dart game device 1000 may feel the realism of playing a dart game with multiple players.

According to some exemplary embodiments of the present disclosure, the control unit 100 of the dart game device 1000 may group a plurality of players to be included in the composite image. Additionally, the control unit 100 may generate a composite image based on a play image related to each of the plurality of grouped players.

Specifically, the control unit 100 may determine proximity between the first ranking information included in the first play-related data and the second ranking information included in the second play-related data within a time period included in the play session. Here, the first play-related data may be data related to a player of the dart game device 1000, and the second play-related data may be data related to a player of the other device 2000. The control unit 100 may group the predetermined number of devices according to the determined proximity.

For example, the ranking of the player of the dart game device 1000 may be 50 within the play session. In this case, the control unit 100 may group the plurality of players ranked $46^{th}$ to $49^{th}$ and $51^{st}$ to $54^{th}$ based on the determined proximity. Additionally, the control unit 100 may generate a composite image based on play images related to the plurality of grouped players. The display unit 120 may display the generated composite image in the first area 410.

The control unit 100 of the dart game device 1000 may control the display unit 120 to display the composite image and at least one object in the first area 410.

Specifically, the control unit 100 may determine proximity between the first ranking information included in the first play-related data and the second ranking information included in the second play-related data within a time period included in the play session. The control unit 100 may generate a composite image related to at least two players among the plurality of players based on the determined proximity. When the composite image is generated, the display unit 120 may display the composite image related to at least two players. Additionally, the control unit 100 may determine that information related to the remaining players, excluding at least two players, is to be displayed as an object.

For example, the ranking of the player of the dart game device 1000 may be 50 within the play session. Additionally, the control unit 100 may determine a plurality of players ranked $46^{th}$ to $49^{th}$ and $51^{st}$ to $54^{th}$ based on the proximity between first ranking information and second ranking information. The control unit 100 may determine that the plurality of objects related to players ranked $46^{th}$ to $49^{th}$ are displayed in the first area 410. Additionally, the control unit 100 may control the network communication unit 150 to receive the play image from the plurality of the other devices related to players ranked $51^{st}$ to $54^{th}$. When the play image is received from the plurality of the other devices, the control unit 100 may generate a composite image including the players ranked $51^{st}$ and $54^{th}$. In this case, the display unit 120 may display a plurality of objects related to the players ranked $46^{th}$ to $49^{th}$, and the composite image related to the players ranked $51^{st}$ and $54^{th}$ in the first area 410.

According to the above-described configuration, the display unit 120 of the dart game device 1000 may display at least one object or image in the first area 410 in various ways.

According to some exemplary embodiments of the present disclosure, the control unit 100 may determine whether to change the relative position of each of the plurality of objects based on the play-related data received via the network communication unit 150. Hereinafter, a method of determining, by the control unit 100, whether to change the relative position of each of a plurality of objects according to the present disclosure will be described with reference to FIG. 13.

FIG. 13 is a diagram for illustrating an example of a method of changing, by the dart game device, a relative position of each of the plurality of objects according to some exemplary embodiments of the present disclosure.

Prior to the description of FIG. 13, a first object in FIG. 13 may be an object related to the first device described in FIG. 6. Further, the second object may be an object related to the second device described in FIG. 6. That is, the first object and the second object in FIG. 13 may be objects related to a device different from the first object and the second object described in FIG. 11.

Referring to (a) of FIG. 13, the display unit 120 may include a first display area 121 and a second display area 122. Further, the first display area 121 may include a first area 410 and the second display area 122 may include a second area 460. However, the present disclosure is not limited thereto.

A plurality of objects having a first form may be displayed in the first area 410. Here, a plurality of objects included in the first area 410 may be objects related to a plurality of the other devices. Further, the first form may include at least one of an image of a player of the plurality of the other devices throwing a dart pin, a predetermined character image for identifying the player on the plurality of the other devices, predetermined text for identifying the player of the plurality of the other devices, or an image related to the dart target part of the plurality of the other devices. However, the present disclosure is not limited thereto.

For example, the first object 415 displayed in the first area 410 among the plurality of objects may be an object related to the first device. Further, the first object 415 may include predetermined text for identifying the player of the first device. Further, the first object 415 may include a space into which an image of the first player throwing a dart pin or a predetermined character image is inserted.

A plurality of objects having a second form may be displayed in the second area 460. And, the second form may include at least one of a predetermined text for identifying the player of each of the plurality of devices. Additionally, information indicated by the plurality of objects displayed in the second area 460 may be information related to the ranking in the play session in which the dart game device 1000 and the other devices 2000 are participating. Accordingly, the plurality of objects included in the first area 410 may also be included in the second area 460 in a second form that is different from the first form.

For example, the form of the first object 415 related to the first device displayed in the first area 410 may be the first form. Also, the form of the first object 461 related to the first device displayed in the second area 460 may be a second form different from the first form.

According to some exemplary embodiments of the present disclosure, the control unit 100 may change the relative position of the first object 415 displayed in the first area 410 and the second object 462 displayed in the second area 460 based on the play-related data received via the network communication unit 150.

Specifically, the control unit 100 may determine first proximity between the play-related data related to the first object 415 and the play-related data of the dart game device 1000 based on the received play-related data. Here, the first proximity may indicate how close the ranking of the player of the dart game device 1000 is to the ranking of the player related to the first object 415. Additionally, the control unit 100 may determine second proximity between the play-related data related to the second object 462 of the second device and the play-related data of the dart game device 1000. Here, the second proximity may indicate how close the ranking of the player of the dart game device 1000 is to the ranking of the player related to the second object 462. When the first proximity and the second proximity are determined, the control unit 100 may determine whether there is a change in the superiority/inferiority relationship between the first proximity and the second proximity by comparing the first proximity and the second proximity. Additionally, when it is determined that there is a change in the superiority/inferiority relationship between the first proximity and the second proximity, the control unit 100 may change the relative positions of the first object 415 and the second object 462.

For example, the control unit 100 may determine to change the relative positions of the first object 415 and the second object 462 displayed in the first area 410. In this case, referring to (b) of FIG. 13, the second object 416 related to the second device may be displayed at the position in the first area 410 where the first object 415 was displayed. Accordingly, the control unit 100 may determine to display the first object 415 at a different position in the first area 410. In this case, another position of the first object 415 displayed in the first area 410 may be determined based on at least one of a score and a ranking related to the first object 415.

In addition, referring again to (a) of FIG. 13, the control unit 100 may determine to change the relative positions of the first object 461 and the second object 462 displayed in the second area 460. In this case, referring to (b) of FIG. 13, the second object 462 related to the second device may be displayed at the position in the second area 460 where the first object 461 was displayed. Accordingly, the control unit 100 may determine to display the first object 461 at a different position in the second area 460. In this case, another position of the first object 461 displayed in the second area 460 may be determined based on at least one of scores and rankings related to the first object 415 and the second object. In addition, the control unit 100 may change positions of the other objects, in addition to the first object 461 and the second object 462 displayed in the second area, in conjunction with changing the relative positions of the first object 461 and the second object 462.

According to some exemplary embodiments of the present disclosure, the control unit 100 of the dart game device 1000 may perform a spinning operation in which the relative positions of the first object 415 displayed in the first area 410 and the second object 462 displayed in the second area 460 are repeatedly exchanged a preset number of times.

Specifically, when it is determined that there is a change in the superiority/inferiority relationship between the first object 415 and the second object 462, the control unit 100 may exchange the relative positions of the first object 415 and the second object 462. Additionally, the control unit 100 may exchange the positions of the first object 415 and the second object 462 whose relative positions have been exchanged. The number of times that the positions of the first object 415 and the second object 462 are repeatedly exchanged may be an odd preset number of times. Therefore, the control unit 100 repeatedly exchanges the relative positions of the first object 415 and the second object 462 a preset number of times, but may ultimately display the first object 415 and the second object 462 in the state where the relative positions of the first object 415 and the second object 462 are changed. However, the present disclosure is not limited thereto.

According to some other exemplary embodiments of the present disclosure, the control unit 100 of the dart game device 1000 may perform a spinning operation to repeatedly exchange the relative positions of the first object 415 displayed in the first area 410 and another object displayed in the first area 410 a preset number of times.

Specifically, when it is determined that there is a change in the superiority/inferiority relationship between the first object 415 and another object, the control unit 100 may exchange the relative positions of the first object 415 and another object. Additionally, the control unit 100 may re-exchange the positions of the first object 415 and other objects whose relative positions have been exchanged. However, the present disclosure is not limited thereto.

According to some exemplary embodiments of the present disclosure, objects related to the dart game device 1000 may be displayed in the second area 460. The control unit 100 may display the object related to the dart game device 1000 in the second area 460 in a third form that is different from the second form in which objects other than the object related to the dart game device 1000 are displayed.

For example, the third form may be a form in which an object related to the dart game device 1000 is highlighted so that the object is emphasized, or a form in which no identification information is displayed and which occupies a position in the second area. In this case, the player of the dart game device 1000 may easily recognize his or her ranking within the second area 460. However, the present disclosure is not limited thereto.

According to the above-described configuration, the control unit 100 of the dart game device 1000 may change the relative positions of the first object and the second object based on the play-related data. In this case, the dart game device 1000 may provide the player with a visual effect in which the ranking of the plurality of the other devices change in real time.

According to some exemplary embodiments of the present disclosure, the control unit 100 of the dart game device 1000 may compare the pre-stored previous play image of the player of the dart game device 1000 and the first play image photographed by the camera unit 140. Further, based on the comparison result, the control unit 100 may determine whether to transmit the first play image. Hereinafter, a method of determining, by the control unit 100, whether to transmit the first play image according to the present disclosure will be described with reference to FIG. 14.

Figure 14:
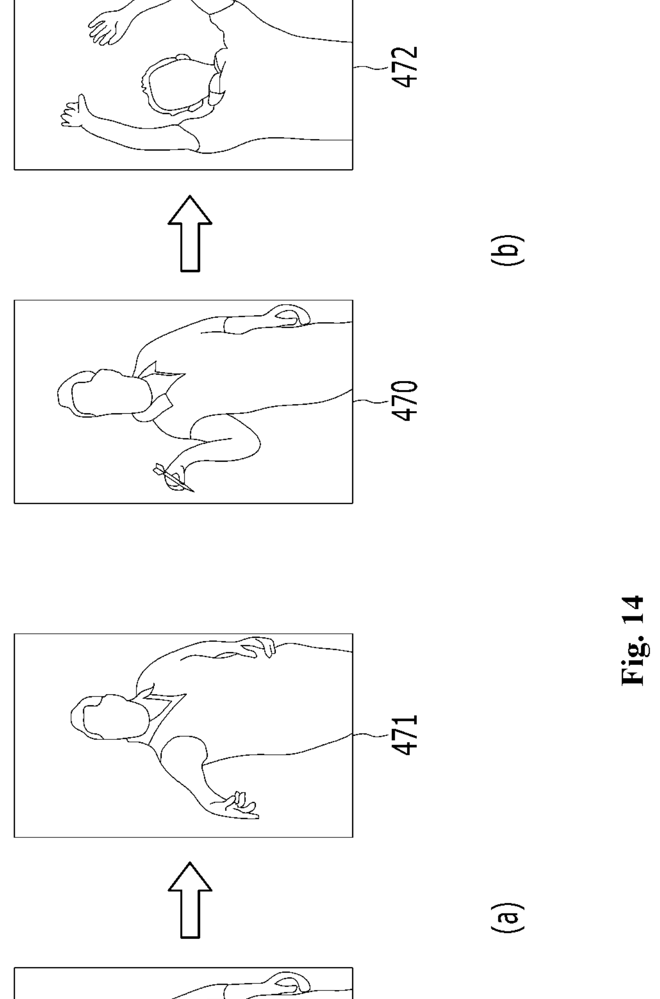
FIG. 14 is a diagram for illustrating an example of a method of determining, by the dart game device, whether to transmit a first play image according to some exemplary embodiments of the present disclosure.

FIG. 14 is a diagram for illustrating an example of a method of determining, by the dart game device, whether to transmit the first play image according to some exemplary embodiments of the present disclosure.

According to some exemplary embodiments of the present disclosure, the control unit 100 of the dart game device 1000 may determine whether to transmit the first play image related to the first player of the dart game device 1000.

Specifically, when the first play image is photographed by the camera unit 140, the control unit 100 may compare the first play image with the previous play image of the first player pre-stored in the storage unit 110. Further, based on the comparison result, the control unit 100 may determine whether to transmit the first play image.

For example, referring to (a) of FIG. 14, when the first play image 471 is photographed by the camera unit 140, the control unit 100 may compare a previous play image 470 and a first play image 471. As the control unit 100 determines that a difference between the previous play image 470 and the first play image 471 is smaller than a predetermined threshold as a result of the comparison, the control unit 100 may determine not to transmit the first play image 471. For example, when the first play image 471 is photographed by the camera unit 140, the control unit 100 may compare the first play image 471 with the previous play image 470 of the first player pre-stored in the storage unit 110 and generate a difference value indicating the difference between the first play image 471 and the previous play image 470. If the difference value generated as a result of the comparison is smaller than a preset threshold, the control unit 100 may determine not to transmit the first play image 471.

For example, referring to (b) of FIG. 14, when the first play image 472 is photographed by the camera unit 140, the control unit 100 may compare the previous play image 470 and the first play image 472. As the control unit 100 determines that there is a difference greater than the preset threshold as a result of the comparison, the control unit 100 may determine to transmit the first play image 472. For example, when the first play image 472 is photographed by the camera unit 140, the control unit 100 may compare the first play image 471 with the previous play image 472 of the first player pre-stored in the storage unit 110 and generate a difference value indicating the difference between the first play image 471 and the previous play image 472. When the difference value generated as a result of the comparison is greater than the preset threshold, the control unit 100 may determine to transmit the first play image 472. That is, the control unit 100 may determine to transmit the newly photographed first play image 472 only when the first play image 472 and the previous play image 470 are different enough to have a difference greater than the preset threshold. However, the present disclosure is not limited thereto.

According to some other exemplary embodiments of the present disclosure, the control unit 100 of the dart game device 1000 may determine whether to re-determine the network rating for the other device 2000 based on comparison between the previous play image 470 and the first play image 472. Here, the network rating may be a rating determined by the control unit 100 for the other device 2000 based on traffic information of a network including devices participating in a play session.

For example, based on the traffic information, the control unit 100 may determine the network rating for the other device 2000 having preset traffic or higher to be the second rating. In this case, the network communication unit 150 may transmit only play-related data to the other device 2000 determined as the second rating, without transmitting the play image related to the dart game device 1000. In this case, when the first play image 472 is photographed by the camera unit 140, the control unit 100 may compare the previous play image 470 and the first play image 472. As the control unit 100 determines that a difference greater than a preset threshold exists as a result of the comparison, the control unit 100 may re-determine the network rating for the other device 2000 to the first rating. The network communication unit 150 may transmit the first play image 472 to the other device 2000 that has been re-determined to the first rating. However, the present disclosure is not limited thereto.

According to the above-described configuration, the control unit 100 of the dart game device 1000 may determine whether to transmit the first play image related to the first player of the dart game device 1000. When the network communication unit 150 transmits the first play-related data including the first play image to the other device 2000 whenever the first play image is photographed by the camera unit 140, problems may arise related to network traffic. Accordingly, the control unit 100 may determine whether to transmit the first play image based on the comparison between the previous play image and the first play image.

According to some exemplary embodiments of the present disclosure, objects related to the other device 2000 may be displayed in the background area 440. Hereinafter, a method of displaying, by the control unit 100 of the dart game device 1000, an object related to the other device in the background area 440 according to the present disclosure will be described with reference to FIG. 15.

Figure 15:
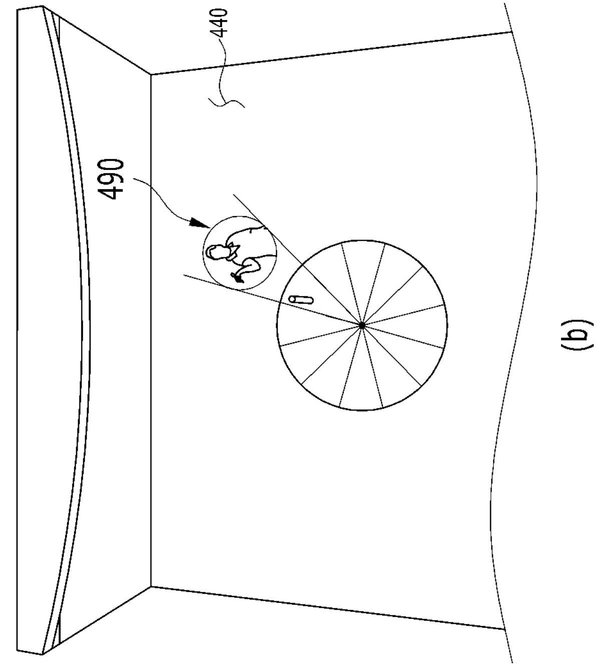
FIG. 15 is a diagram for illustrating a method of displaying, by the dart game device, an object related to the other device in a background area according to some exemplary embodiments of the present disclosure.
Figure 15:
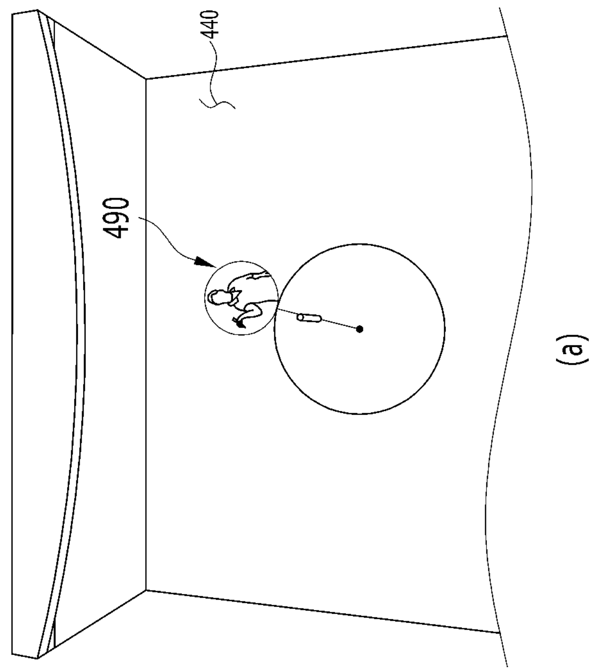

FIG. 15 is a diagram for illustrating a method of displaying, by the dart game device, an object related to the other device in a background area according to some exemplary embodiments of the present disclosure.

According to some exemplary embodiments of the present disclosure, the network communication unit 150 of the dart game device 1000 may receive second play-related data from the other device 2000. In this case, the control unit 100 may determine that an object related to the other device 2000 is displayed in the background area 440 based on the second play-related data.

Specifically, the control unit 100 may acquire information about the position where the dart pin thrown by the player of the other device 2000 reaches the dart target part of the other device 2000, based on the second play-related data. The control unit 100 may determine to display the object related to the other device 2000 in the background area 440 of the dart game device 1000 based on the position where the dart pin thrown by the player of the other device 2000 reaches the dart target part. Additionally, the display unit 120 may display the object related to the other device 2000 in the background area 440 under the control of the control unit 100.

For example, referring to (a) of FIG. 15, the control unit 100 may determine the origin of the dart target part 200 of the dart game device 1000. Further, the control unit 100 may determine the hit position on the dart target part 200 of the dart game device 1000 corresponding to the position where the dart pin thrown by the player of the other device 2000 hits the dart target part of the other device 2000. Additionally, the control unit 100 may determine a line extending from the origin of the dart target part 200 to the hit position. In this case, the control unit 100 may determine a portion adjacent to the point where the outline of the dart target part 200 meets as the position where the object is to be displayed.

Referring to (b) of FIG. 15, the dart target part 200 may be divided into a plurality of fan-shaped areas. In this case, the control unit 100 may determine the hit position on the dart target part 200 corresponding to the position where the dart pin thrown by the player of the other device 2000 hits the dart target part of the other device 2000. Additionally, the control unit 100 may determine a portion adjacent to the arc of the fan-shaped area including the hit position as the position where the object 490 is displayed. However, the present disclosure is not limited thereto.

According to some exemplary embodiments of the present disclosure, the control unit 100 of the dart game device 1000 may determine to display the object related to the other device 2000 in the background area based additionally on the first play-related data of the dart game device 1000. For example, the object related to the other device 2000 displayed in the background area 440 may include a play image of the player related to the other device 2000; a hit image for a dart target related to the other device 2000, or any form of text or image information for identifying the player related to the other device 2000.

According to the exemplary embodiment of the present disclosure, when there are multiple players who hit the corresponding score area (for example, 20 points or 20 point triple), the control unit 100 of the dart game device 1000 may determine to sequentially display the image related to the plurality of players in the display area related to the score area.

For another example, when there are multiple players who hit the corresponding score area (for example, 20 points or 20 point triple), the control unit 100 of the dart game device 1000 may divide the display area related to the score area in the background area 440 and determine to display an image related to the player who hit temporally earlier in the area close to the dart target, and display an image related to the player who hit the dart target subsequently in time in an area far from the dart target.

For another example, when there are multiple players who hit the corresponding score area (for example, 20 points or 20 point triple), the control unit 100 of the dart game device 1000 may divide the display area related to the score area in the background area 440 and determine to display an image related to the player who hit subsequently in time in the area close to the dart target, and display an image related to the player who hit the dart target temporally earlier in an area far from the dart target.

The control unit 100 of the dart game device 1000 may determine the score obtained by the player of the dart game device 1000 based on the hit position of the dart pin recognized through the sensing unit 160. Based on the second play-related data of the other device 2000, the control unit 100 may determine whether there is a second player of the other device 2000 who obtained the score obtained by the first player before the first player. Also, when it is determined that the second player exists, the control unit 100 may display an object related to the second player in the background area 440. However, the present disclosure is not limited thereto.

According to some exemplary embodiments of the present disclosure, the control unit 100 of the dart game device 1000 may prevent cheating by the first player by using facial information. Hereinafter, a method of preventing, by the control unit 100, cheating by the first player according to the present disclosure will be described with reference to FIG. 16.

Figure 16:
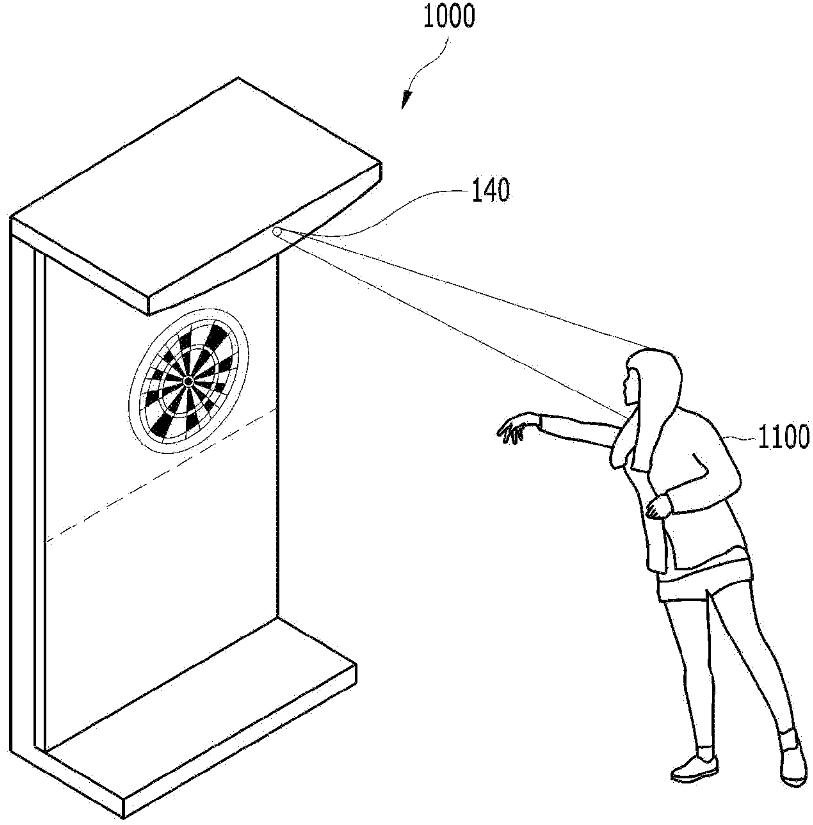
FIG. 16 is a diagram for illustrating an example of a method of preventing, by the dart game device, cheating by a player according to some exemplary embodiments of the present disclosure.

FIG. 16 is a diagram for illustrating an example of a method of preventing, by the dart game device, cheating by a player according to some exemplary embodiments of the present disclosure.

According to some exemplary embodiments of the present disclosure, the control unit 100 of the dart game device 1000 may accept or reject a log-in request of a player 1100 for the dart game device 1000.

For example, the control unit 100 may receive input from a player to log in the dart game device 1000 via the user input unit 170. In this case, the control unit 100 may control the camera unit 140 to capture an image including the player 1100 currently manipulating the user input unit 170. The control unit 100 may accept or reject the login request of the player 1100 based on a comparison between facial information included in the identification information of the player requesting login and facial information recognized from the photographed image.

For example, when a difference between the facial information included in the identification information of the player requesting login and the facial information recognized from the photographed image is smaller than a preset threshold as a result of the comparison, the control unit 100 may accept the log-in request of the player 1100. For example, the control unit 100 may compare the image photographed by the camera unit 140 with the facial information included in the identification information to generate a similarity value indicating the degree of similarity. When the similarity value generated as a result of the comparison is greater than a preset threshold, the control unit 100 may accept the log-in request of the player 1100. When the similarity value generated as a result of the comparison is less than the preset threshold, the control unit 100 may reject the log-in request of the player 1100.

The control unit 100 of the dart game device 1000 may determine whether the player 1100 engages in cheating while participating in a play session and enjoying the dart game. Here, cheating may be an act such as a proxy player playing a dart game rather than the player 1100.

Specifically, when the player 1100 participates in the play session and is playing the dart game, the control unit 100 may control the camera unit 140 to photograph the player 1100 at preset intervals. The control unit 100 may determine whether the player currently playing the dart game is a proxy player by comparing the facial information included in the identification information used when logging in and the image photographed by the camera unit 140.

For example, when a difference between the facial information included in the identification information used when logging in and the image photographed by the camera unit 140 is greater than a preset threshold as a result of comparison, the control unit 100 may determine that the player currently playing the dart game is a proxy player who is cheating. For example, the control unit 100 may compare the image photographed by the camera unit 140 with the facial information included in the identification information to generate a similarity value indicating the degree of similarity. When the similarity value generated according to the result of the comparison is less than a preset threshold, the control unit 100 may determine that the player currently playing the dart game is a proxy player. In this case, the control unit 100 may cause the player of the dart game device 1000 to leave the currently participating play session. Additionally, the control unit 100 may also transmit identification information related to the dart game device 1000 to the dart game server 3000. However, the present disclosure is not limited thereto.

According to some exemplary embodiments of the present disclosure, when the control unit 100 of the dart game device 1000 accepts the player's login request, the control unit 100 may recognize previous play-related data of the player. The control unit 100 may control the sound output unit 190 to output a preset sound or the like based on the previous play-related data. Alternatively, when the control unit 100 accepts the player's login request, the control unit 100 may determine, based on the identification information of the player, whether a pre-stored sound, music, or voice message or the like exists. Further, when it is determined that at least one of the pre-stored sounds, music, or voice messages is present, the control unit 100 may control the sound output unit 190 to output a corresponding sound or the like.

According to the above-described configuration, the control unit 100 of the dart game device 1000 may prevent a player participating in a play session through the dart game device 1000 from cheating by playing a dart game through a proxy player.

According to some exemplary embodiments of the present disclosure, the control unit 100 of the dart game device 1000 may provide a lesson image to the first player of the dart game device 1000 based on play-related data of the other device 2000. Hereinafter, a method of providing, by the control unit 100, a lesson image according to the present disclosure will be described with reference to FIG. 17.

Figure 17:
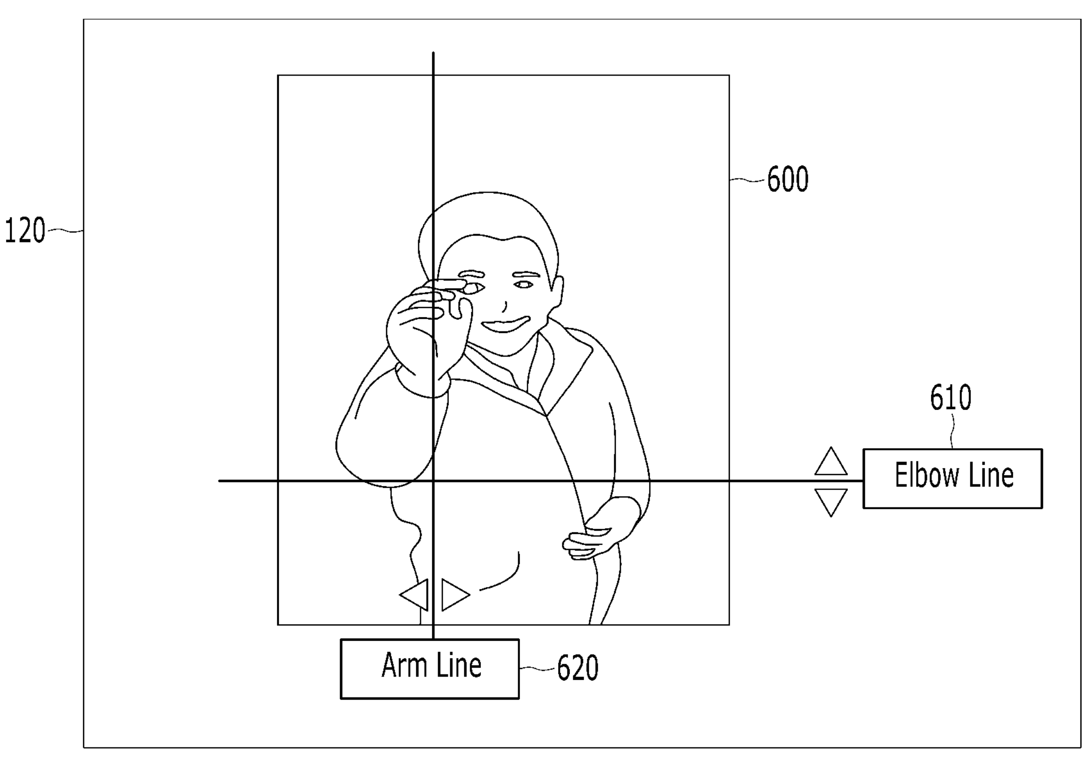
FIG. 17 is a diagram for illustrating a method of providing, by the dart game device, a lesson image according to the present disclosure.

FIG. 17 is a diagram for illustrating a method of providing, by the dart game device, a lesson image according to the present disclosure.

Referring to FIG. 17, the control unit 100 of the dart game device 1000 may provide a lesson image 600 through the display unit 120. Here, the lesson image 600 may be generated based on play-related data of a plurality of the other devices collected as the dart game device 1000 participates in a play session.

For example, the control unit 100 may determine the other device 2000 related to a second player who ranked 1$^{st}$ in at least one play session among a plurality of the other devices. Additionally, the control unit 100 may generate a lesson image 600 including at least one virtual character based on play-related data related to the determined the other device 2000. Here, the virtual character may be a character created based on play-related data of the second player rather than the actual second player.

According to some exemplary embodiments of the present disclosure, when the other device 2000 is determined, the control unit 100 of the dart game device 1000 may determine whether a play image related to the other device 2000 exists in the storage unit 110. For example, as the other device 2000 and the dart game device 1000 participate in the same play session, the network communication unit 150 may have received play-related data including a play image from the other device 2000. Further, when it is determined that the play image received from the other device 2000 exists in the storage unit 110, the control unit 100 may generate a lesson image 600 based on the play image. For example, the control unit 100 may generate the lesson image 600 including an actual play of the second player of the other device 2000. For another example, the control unit 100 may create a virtual character imitating the second player based on the play image of the second player of the other device 2000 and then generate the lesson image 600 including the virtual character. However, the present disclosure is not limited thereto.

When the lesson image 600 is displayed, the control unit 100 of the dart game device 1000 may control the camera unit 140 to photograph the first player of the dart game device 1000. In this case, the image taken of the first player may be displayed overlapping the lesson image 600. However, the present disclosure is not limited thereto.

The lesson image 600 may include an arm line 610 or an elbow line 620.

The arm line 610 may display a line that matches the arm of the first player or the arm of a virtual character created based on the play-related data.

The elbow line 620 may display a line that matches the elbow of the first player or the elbow of a virtual character created based on the play-related data.

According to some exemplary embodiments of the present disclosure, the control unit 100 of the dart game device 1000 may provide a real-time lesson mode through the display unit 120.

For example, while participating in the play session, the control unit 100 may receive a request from the first player of the dart game device 1000 to execute the lesson mode. In this case, the control unit 100 may determine, among the objects displayed on the display unit 120, an object including a second play image of the second player of the other device 2000 throwing a dart pin. Further, the control unit 100 may determine that the first play image of the first player and the second play image of the second player photographed by the camera unit 140 are displayed in relation to each other.

For example, the control unit 100 may provide a lesson mode so that at least a portion of the first play image and the second play image are displayed overlapping each other. However, the present disclosure is not limited thereto.

According to some exemplary embodiments of the present disclosure, the control unit 100 of the dart game device 1000 may provide a lesson mode based on the previous play-related data of the first player.

Specifically, when the control unit 100 receives a request to execute the lesson mode from the first player through the user input unit 170, the control unit 100 may recognize the previous play-related data of the first player. The control unit 100 may determine the play session in which the second player, who has a higher dart game result score on average than the first player, is participating, based on the previous play-related data of the first player. Also, when it is determined to participate in the play session, the control unit 100 may provide a real-time lesson mode to the first player based on the second player participating in the play session.

For example, the control unit 100 may provide a lesson mode so that at least a portion of the first play image of the first player and the second play image of the second player are displayed in an overlapping manner. However, the present disclosure is not limited thereto.

According to some exemplary embodiments of the present disclosure, the dart game server 3000 may provide rewards based on play result information of a play session in which a plurality of players participate. Hereinafter, a method of providing, by the dart game server 3000, rewards according to the present disclosure will be described with reference to FIG. 18.

Figure 18:
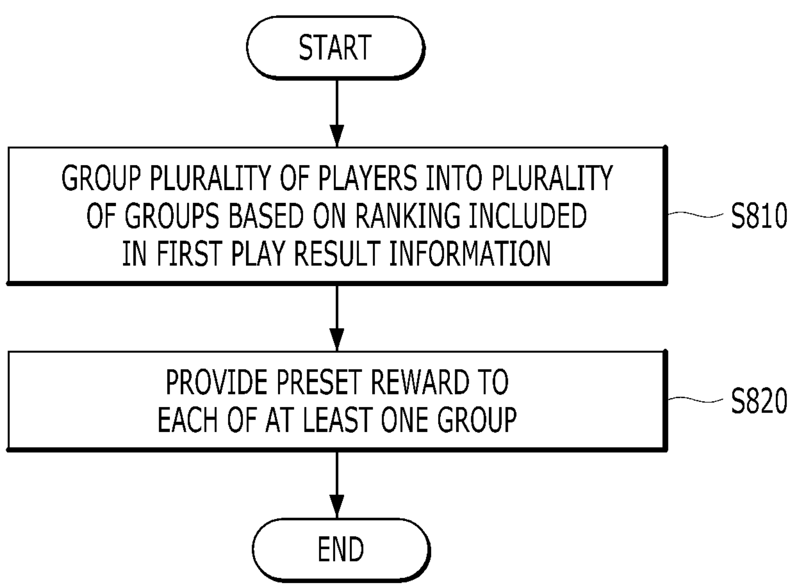
FIG. 18 is a flow diagram for illustrating an example of a method of providing, by the dart game server, rewards according to some exemplary embodiments of the present disclosure.

FIG. 18 is a flow diagram for illustrating an example of a method of providing, by the dart game server, rewards according to some exemplary embodiments of the present disclosure.

Referring to FIG. 18, the dart game server 3000 may group a plurality of players into a plurality of groups based on the ranking included in the first play result information of the play session in which two or more devices participated (S810).

For example, the dart game server 3000 may determine players ranked $4^{th}$ to $10^{th}$ among a plurality of players participating in the play session as a first group, based on the first play result information. Additionally, the dart game server 3000 may determine players ranked $10^{th}$ to $20^{th}$ among the plurality of players as a second group. However, the present disclosure is not limited thereto.

The dart game server 3000 may provide a preset reward to each of at least one group (S820). Here, the reward may be game credit, cryptocurrency, or virtual coin. However, the present disclosure is not limited thereto.

According to some exemplary embodiments of the present disclosure, the dart game server 3000 may provide a reward to at least one player participating in a play session.

Specifically, the dart game server 3000 may determine that a specific event occurs while providing at least one play session to two or more devices. For example, a specific event may be an event in which a specific score is obtained within a preset time. The dart game server 3000 may determine at least one device that satisfies a specific event based on play-related data received from two or more devices. In this case, the dart game server 3000 may provide a reward to at least one device that satisfies the specific event. However, the present disclosure is not limited thereto.

According to FIGS. 1 to 18, the dart game system 10000 may provide the dart game device 1000 with a play session that imposes play time constraints on two or more devices. Additionally, the dart game device 1000 may participate in a play session and provide a real-time online dart game to the player. Additionally, the dart game device 1000 may display information related to a play session in which the dart game device 1000 is participating on the display unit 120 in real time. Thus, the dart game device 1000 may increase the interest of a player participating in the dart game.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

MODE FOR CARRYING OUT THE INVENTION

As the described above, the relevant contents are described in the best mode for implementing the present disclosure.

INDUSTRIAL APPLICABILITY

The present disclosure may be used in dart game devices, programs, and the like that offer a new concept of play.

The invention claimed is:

1. A method of providing a dart game image performed by a dart game device participating in a play session which imposes a play time constraint to two or more devices, the method comprising:

displaying, on a display unit, a first object displaying first information related to a first device among two or more devices participating in the play session and a second object displaying second information related to a second device;

receiving, via a network communication unit, play-related data of the first and second devices participating in the play session from the first and second devices or a dart game server in real-time; and determining, based on the received play-related data, whether to change a relative position of the first object and the second object by:

determining, based on the received play-related data from the first and second devices or the dart game server, first proximity between play-related data related to the first object and play-related data of the first dart game device, and second proximity between play-related data related to the second object and the play-related data of the second dart game device, wherein each proximity indicates how close a ranking of a player associated with the respective object is to a ranking of a player of the other dart game device;

comparing the first proximity and the second proximity to determine whether there is a change in a superiority/inferiority relationship between the first proximity and the second proximity; and changing the relative positions of the first object and the second object when it is determined that there is a change in the superiority/inferiority relationship by performing a spinning operation in which the relative positions of the first object and the second object are repeatedly exchanged a predetermined number of times, by moving the relative positions of the first object and the second object the predetermined number of times;

generating revised first information that includes an image related to a play of a player of the first device or an image generated based on dart game play result information of the first device, and generating revised second information that includes an image related to a play of a player of the second device or an image generated based on dart game play result information of the second device.

2. The method of claim 1, wherein the determining of whether to change the relative position of the first object and the second object includes determining, based on the received play-related data and play-related data related to the play session of the dart game device, whether to change the relative position of the first object and the second object.

3. The method of claim 1, wherein the play session includes a time constraint for a round allowing N times of dart pin throwing, in which N is a natural number, and the determining of whether to change the relative position of the first object and the second object includes determining whether to change the relative positions of the first object and the second object, based on play-related data received in a unit of a round of the play session.

4. The method of claim 1, wherein the play session includes a time constraint for throwing dart pins; and the determining of whether to change the relative position of the first object and the second object includes determining whether to change the relative position of the first object and the second object based on play-related data received in a unit of a dart pin throwing action in the play session.

5. The method of claim 1, wherein the play session includes a time constraint on a set comprising K rounds, in which K is a natural number and the determining of whether to change the relative position of the first object and the second object includes determining whether to change the relative position of the first object and the second object based on play-related data received in a unit of a set of the play session.

6. The method of claim 1, wherein the play-related data includes resultant data that was played via two or more devices over a time period that at least partially overlaps based on time constraints imposed by the play session.

7. The method of claim 1, wherein each of the first object and the second object includes a predetermined display attribute, and the display attribute includes a first attribute indicating an area in which each of the objects is to be displayed, a second attribute indicating a position in which each of the objects is to be displayed, a third attribute indicating a display size for each of the objects, a fourth attribute indicating whether each of the objects is to be displayed, and a fifth attribute indicating a shape of each of the objects to be displayed.

8. The method of claim 1, wherein the displaying of, on the display unit, the first object displaying first information related to the first device among two or more devices participating in the play session and the second object displaying second information related to the second device includes displaying the first object in a first area of the display unit, and displaying the first object and the second object in a second area different from the first area of the display unit.

9. The method of claim 8, wherein the first object displayed in the first area is displayed in a first form, and the first object displayed in the second area is displayed in a second form that is different from the first form.

10. The method of claim 9, wherein a first position of the first object displayed in the second area is determined based on at least one of a score or ranking related to the first object and the second object.

11. The method of claim 10, wherein a position of the first object displayed in the second area is changed based on play-related data received in a unit of a round or a set of the play session, and as the position of the first object is changed, a position of the second object displayed in the second area is changed in conjunction with the changed position of the first object.

12. A dart game device, comprising:

a display unit for displaying, among two or more devices participating in a play session which imposes a play time constraint to two or more devices, a first object displaying first information related to a first device and a second object displaying second information related to a second device;

a network communication unit for receiving play-related data of the first and second devices participating in the play session from the first and second devices or a dart game server in real time; and a control unit for determining, based on the received play-related data from the first and second devices or the dart game server, whether to change a relative position of the first object and the second object by:

determining, based on the received play-related data, first proximity between play-related data related to the first object and play-related data of the first dart game device, and second proximity between play-related data related to the second object and the play-related data of the second dart game device, wherein each proximity indicates how close a ranking of a player associated with the respective object is to a ranking of a player of the dart game device;

comparing the first proximity and the second proximity to determine whether there is a change in a superiority/inferiority relationship between the first proximity and the second proximity; and changing the relative positions of the first object and the second object when it is determined that there is a change in the superiority/inferiority relationship by performing a spinning operation in which the relative positions of the first object and the second object are repeatedly exchanged a predetermined number of times, by moving the relative positions of the first object and the second object the predetermined number of times;

generating revised first information that includes an image related to a play of a player of the first device or an image generated based on dart game play result information of the first device, and generating revised second information that includes an image related to a play of a player of the second device or an image generated based on dart game play result information of the second device.

13. A non-transitory computer readable storage medium including a computer program, the computer program performing following operations for providing a dart game when being executed in one or more control units, the operations comprising:

an operation of displaying, among two or more devices participating in a play session which imposes a play time constraint to two or more devices, a first object displaying first information related to a first device and a second object displaying second information related to a second device;

an operation of receiving, via a network communication unit, play-related data of devices participating in the play session from the first and second devices or a dart game server in real-time; and an operation of determining, based on the received play-related data from the first and second devices or the dart game server, whether to change a relative position of the first object and the second object by:

determining, based on the received play-related data, first proximity between play-related data related to the first object and play-related data of the first dart game device, and second proximity between play-related data related to the second object and the play-related data of the second dart game device, wherein each proximity indicates how close a ranking of a player associated with the respective object is to a ranking of a player of the dart game device;

comparing the first proximity and the second proximity to determine whether there is a change in a superiority/inferiority relationship between the first proximity and the second proximity; and changing the relative positions of the first object and the second object when it is determined that there is a change in the superiority/inferiority relationship by performing a spinning operation in which the relative positions of the first object and the second object are repeatedly exchanged a predetermined number of times, by moving the relative positions of the first object and the second object the predetermined number of times;

generating revised first information that includes an image related to a play of a player of the first device or an image generated based on dart game play result information of the first device, and generating revised second information that includes an image related to a play of a player of the second device or an image generated based on dart game play result information of the second device.

* * * * *